(12) United States Patent
Otsuka et al.

(10) Patent No.: US 7,771,054 B2
(45) Date of Patent: Aug. 10, 2010

(54) DISPLAY SYSTEM AND CAMERA SYSTEM

(75) Inventors: Rieko Otsuka, Fuchu (JP); Takeshi Hoshino, Kodaira (JP); Youichi Horii, Mitaka (JP)

(73) Assignee: Hitachi, Ltd., Tokyo (JP)

( * ) Notice: Subject to any disclaimer, the term of this patent is extended or adjusted under 35 U.S.C. 154(b) by 902 days.

(21) Appl. No.: 11/630,152

(22) PCT Filed: Sep. 10, 2004

(86) PCT No.: PCT/JP2004/013582

§ 371 (c)(1),
(2), (4) Date: Dec. 20, 2006

(87) PCT Pub. No.: WO2006/027855

PCT Pub. Date: Mar. 16, 2006

(65) Prior Publication Data

US 2008/0036969 A1    Feb. 14, 2008

(51) Int. Cl.
*G03B 21/00* (2006.01)
*G03B 21/26* (2006.01)
*G03B 21/28* (2006.01)
*G02B 27/22* (2006.01)
*H04N 13/00* (2006.01)
*H04N 13/04* (2006.01)
*H04N 9/47* (2006.01)

(52) U.S. Cl. .................. 353/7; 353/10; 353/94; 353/99; 359/462; 348/42; 348/51; 348/54

(58) Field of Classification Search ............... 353/7–10, 353/85, 94, 98–99, 119, 122; 348/42, 47, 348/51–52, 54, 59; 352/57; 359/462–466, 359/470–471, 473, 475, 477–479

See application file for complete search history.

(56) References Cited

U.S. PATENT DOCUMENTS 5,148,310 A * 9/1992 Batchko .................. 359/479

(Continued)

FOREIGN PATENT DOCUMENTS

JP    03-048232    7/1989

(Continued)

OTHER PUBLICATIONS

International Search Report of PCT/JP2004/007048 mailed Jul. 13, 2004.

*Primary Examiner*—Georgia Y Epps
*Assistant Examiner*—Jori S Reilly-Diakun
(74) *Attorney, Agent, or Firm*—Stites & Harbison, PLLC; Juan Carlos A. Marquez, Esq.

(57) ABSTRACT

A display apparatus and an imaging apparatus constructed such that a high-resolution clear three-dimensional video image can be viewed from any direction. The display apparatus projects frame images, projected from a projector such as an electronic projector, to a video image projection surface of a three-dimensional screen through a polygonal mirror provided around the three-dimensional screen, thereby providing a polyhedral video image such as a three-dimensional image to a person viewing from around the video image projection surface. The three-dimensional screen has a view field angle limiting filter and a directional reflection screen. The view field angle filter limits the angle of a view field in the left/right direction, the angle being the angle of the projection on the video image projection surface (50) of the screen. The directional reflection screen has two sheets in horizontal and vertical directions. Furthermore, a projection light path between the electronic projector and the polygonal mirror is formed by refracting light through an auxiliary mirror.

14 Claims, 40 Drawing Sheets

U.S. PATENT DOCUMENTS

| | | | |
|---|---|---|---|
| 5,678,910 A * | 10/1997 | Martin | 353/7 |
| 5,695,346 A * | 12/1997 | Sekiguchi et al. | 434/365 |
| 6,183,088 B1 * | 2/2001 | LoRe et al. | 353/7 |
| 6,554,430 B2 * | 4/2003 | Dorval et al. | 353/7 |
| 2003/0086167 A1 * | 5/2003 | Sonehara | 359/471 |

FOREIGN PATENT DOCUMENTS

| | | |
|---|---|---|
| JP | 11-258697 | 3/1998 |
| JP | 2000-056415 | 8/1998 |
| JP | 2000-206459 | 1/1999 |
| JP | 2000-275755 | 3/1999 |
| JP | 2001-036839 | 7/1999 |
| JP | 2001-103515 | 9/1999 |
| JP | 2001-305683 | 4/2000 |
| JP | 2002-027504 | 7/2000 |
| JP | 2002-112094 | 9/2000 |
| JP | 2002-271676 | 3/2001 |
| JP | 2002-271820 | 3/2001 |
| JP | 2004012644 A * | 1/2004 |
| WO | WO 88/09546 | 5/1988 |

* cited by examiner

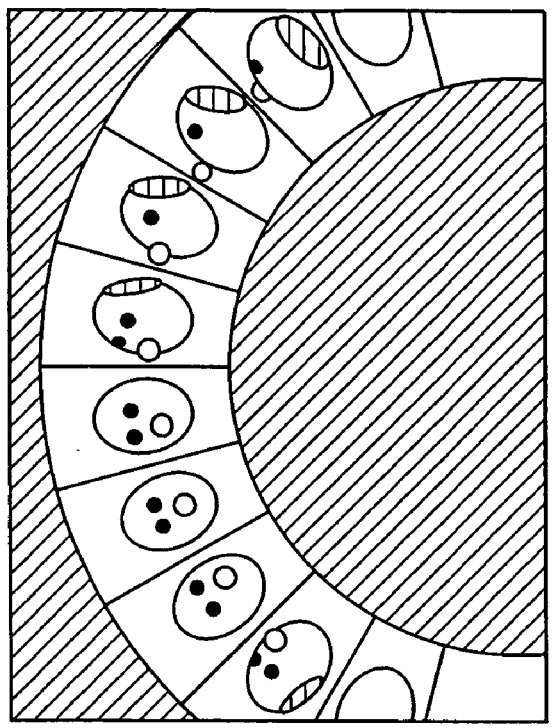
FIG. 26A
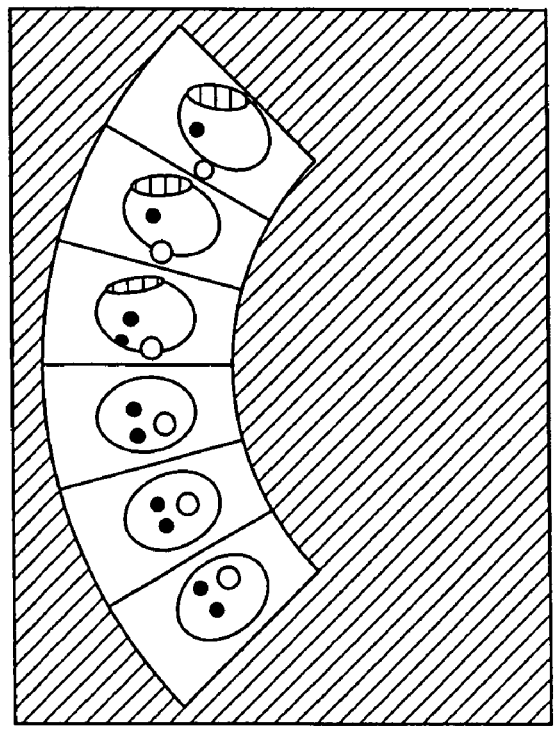
FIG. 26B

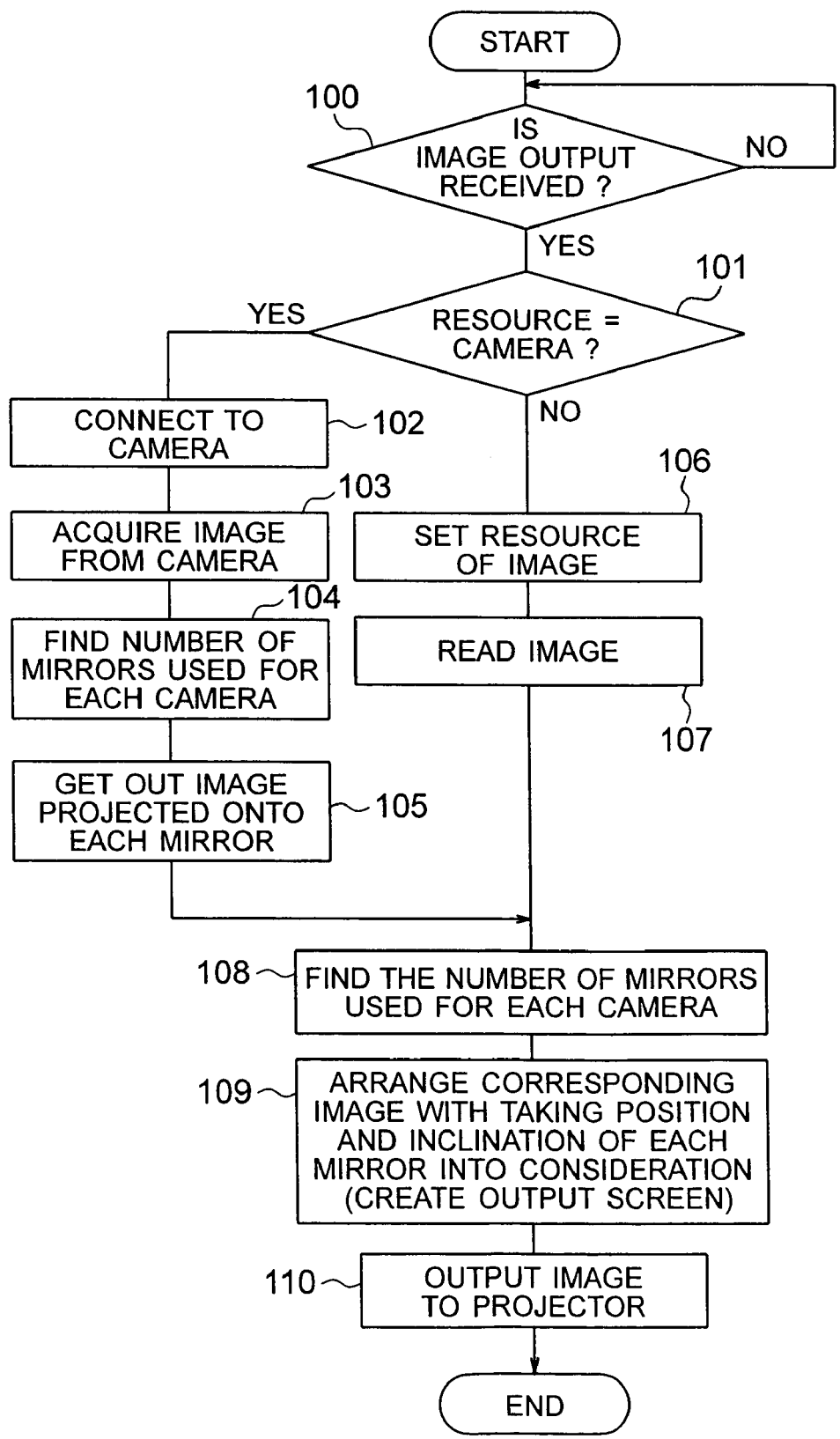

DISPLAY SYSTEM AND CAMERA SYSTEM

TECHNICAL FIELD

The present invention relates to a display system, in which an image conformed to a direction seen from around a stereoscopic screen is displayed, and a camera system.

BACKGROUND ART

Conventionally, a display system has been proposed, in which a rotating screen is used to display a stereoscopic image. As an example thereof, two-dimensional image data of a body when the body is seen in respective surrounding directions are created from three-dimensional image data representative of a three-dimensional body (In addition, when two-dimensional image data are created from such three-dimensional image data, a hidden surface removal processing for removal of data of an unseen part is performed) and projected successively onto a rotating screen, and as the screen is varied in orientation upon rotation, two-dimensional images projected thereonto are changed successively. According to this, in the case where the screen is seen from a certain point, an image displayed thereon is gradually varied by increasing rotation of the screen. Image displaying is performed in this manner whereby the visual after-image causes a projected image on the screen to look to be a three-dimensional image (see, for example, JP-A-2001-103515).

Also, there is proposed a technology, in which in the case where a screen is rotated to project a two-dimensional image to obtain a three-dimensional image as in the technology described in the Patent Document 1, an image projected onto the screen is decreased in illumination with a distance from an axis of rotation of the screen as compared with a region close to the axis of rotation to become non-uniform in distribution of illumination when a two-dimensional image being projected is uniform in distribution of illumination, and in order to prevent such matter, a two-dimensional image being projected is made non-uniform in distribution of illumination so that an image projected onto the screen is made uniform in distribution of illumination (see, for example, JP-A-2002-27504).

Further, there is also proposed a technology providing a construction, in which an object of display is photographed from different view points to create slide images, respectively, and slide images obtained by photographing from the different view points are projected each time a rotating screen faces the view points successively, and in which technology a rotating speed of the screen is increased to around 300 to 600 rpm to induce a visual after-image to form a quasi-three-dimensional image on the screen, or an object of display is photographed continuously by a camera, which moves one revolution therearound, whereby a cylindrical film of camera images is created, images of the cylindrical film are successively read, the images are formed in a spatial position through a mirror, which rotates in synchronism with reading of the cylindrical film, the mirror is adequately increased in rotating speed whereby a visual after-image generates a three-dimensional spatial floating image (see, for example, JP-A-2002-271820).

DISCLOSURE OF THE INVENTION

By the way, since technologies described in JP-A-2001-103515 and JP-A-2002-27504 enable making use of an after-image to provide for stereophonic vision, it is required that slightly different images be displayed substantially at the same time. Therefore, fairly many two-dimensional images are needed to take considerable labor and time, and a high volume memory is needed to hold data of such two-dimensional images. Also, since it is necessary to rotate a screen at high speed, it is required that two-dimensional images corresponding to an orientation of the screen be projected onto the screen with high accuracy and that rotation of the screen and timing of projection of two-dimensional images onto the screen be highly accurately maintained in synchronism with each other.

Also, in the technology described in the JP-A-2002-271820, two-dimensional slide images are projected onto a screen rotating at high speed, or a mirror rotating at high speed forms two-dimensional images, which are read from the cylindrical film, in a surrounding spatial position, whereby a visual after-image is caused to act, thus making the images look to be a three-dimensional image. In the case where the slide images are to be projected onto the screen, it is required like the technologies described in the Patent Documents 1, 2 (JP-A-2001-103515, JP-A-2002-27504) that when the screen is directed toward the view point, a corresponding slide image be projected onto the screen, but a very high accuracy is demanded of timing of projection of a slide image onto the screen since the screen rotates at high speed.

In the technology described in the JP-A-2002-271820, in the case where two-dimensional images read from the cylindrical film are used to display a three-dimensional image, there is a need for complex means that reads images from the cylindrical film successively, and since images read from the cylindrical film are to be formed in a space, a clear three-dimensional image can be seen only in such imaging position, so that a viewing position is very limitative.

Further, since a screen is rotated in the many conventional examples described above, there is caused a problem that an image is low in visibility and becomes dark. Besides, the conventional examples involve a problem that a screen is rotated to meet with air resistance, thus making large-sizing hard.

Here, It is an object of the invention to provide a display system, which enable a clear stereoscopic image of high resolution to be seen in any direction, and a camera system.

An outline and an effect of a typical one of inventions disclosed in the present application are as follows.

According to the invention, image segments projected from a projector such as an electronic projector, etc. is projected onto a projected image surface of a stereoscopic screen through a polygonal mirror arranged around the stereoscopic screen whereby a multi-plane image such as a stereoscopic image, etc. is presented to a viewer around the projected image surface. Here, the stereoscopic screen comprises a visible field angle limiting filter that limits a visible field angle projected onto the projected image surface 50 in a left-right direction, and a directional reflection screen. Here, the directional reflection screen comprises two sheets in a horizontal direction and in a vertical direction. Further, a projection optical path between the electronic projector and the polygonal mirror is refracted and formed through an auxiliary mirror.

BRIEF DESCRIPTION OF THE DRAWINGS

FIG. 26 is a view showing projected images photographed by the camera system in the display system according to the fifth embodiment.

FIG. 36 is a flowchart illustrating processes of creating projected images according to a resource of projected images in the display system according to a further embodiment.

BEST MODE FOR CARRYING OUT THE INVENTION

Figure 1:
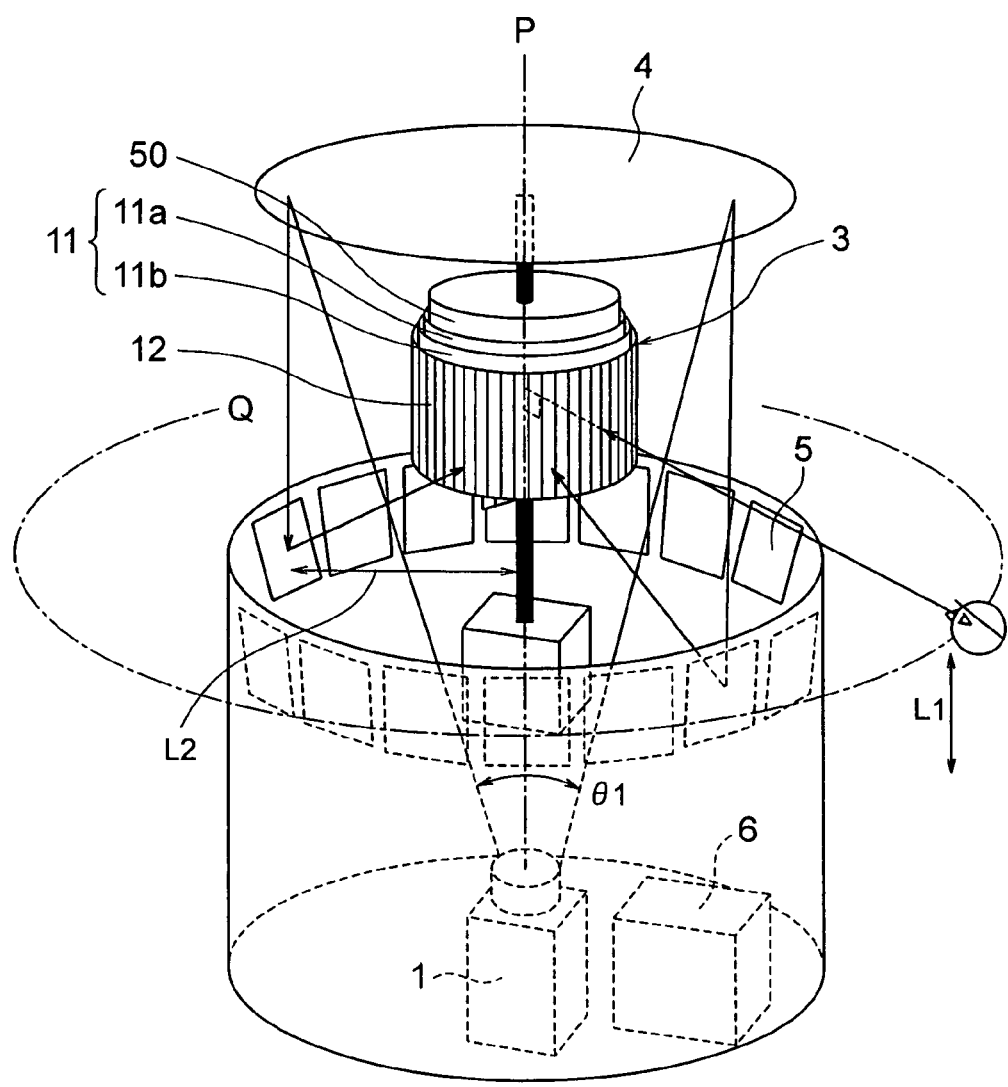
FIG. 1 is a perspective view showing an outward appearance of a display system according to a first embodiment.

Embodiments of the invention will be described below in detail with reference to FIGS. 1 to 40. In addition, the same or similar parts, or arrows are denoted by the same reference numerals and a duplicated explanation therefore is omitted. Also, embodiments described later are typical and not limitative.

First Embodiment

Figure 10A:
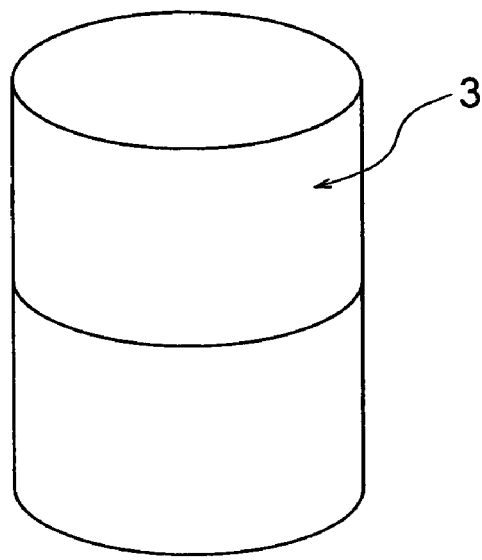
FIG. 10 is a perspective view showing outward appearances of applications of a shape of a stereoscopic screen in the display system according to the first embodiment.
Figure 10B:
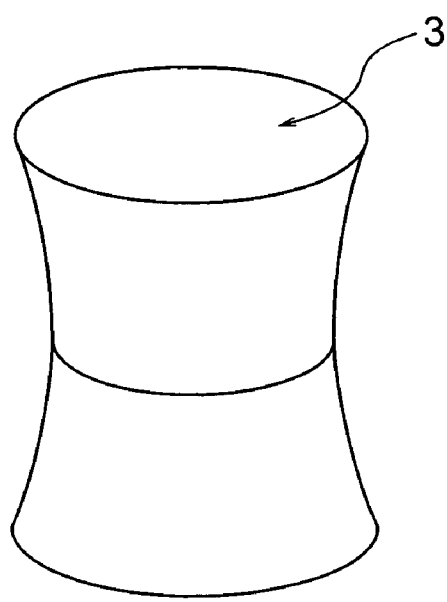
Figure 10C:
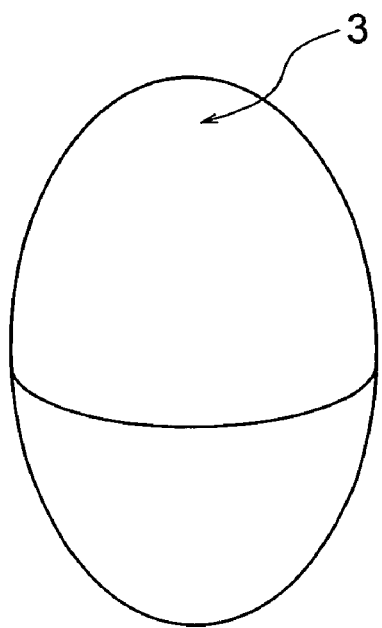
Figure 11:
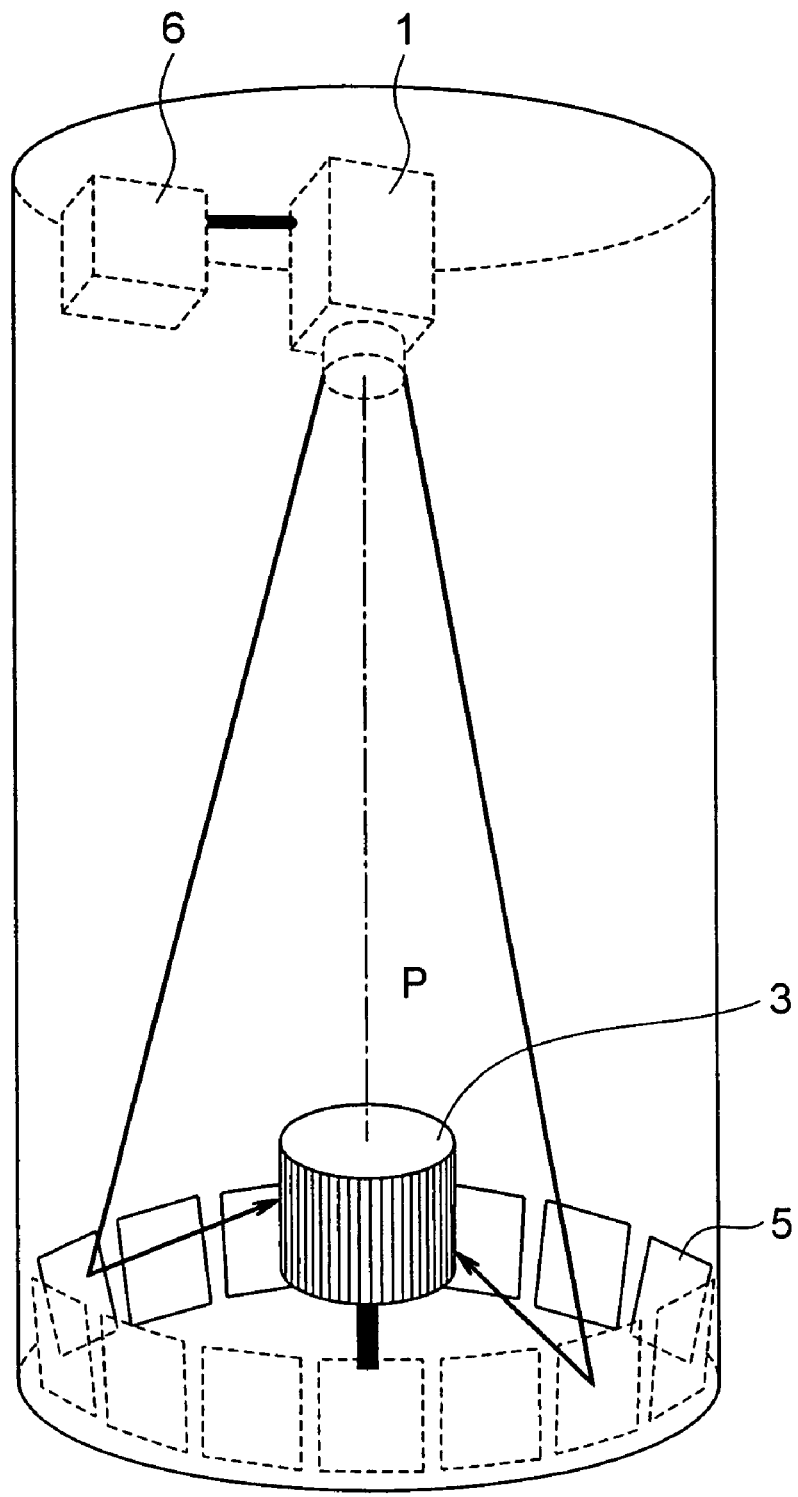
FIG. 11 is a view showing an outline construction of an application of the display system according to the first embodiment.
Figure 12:
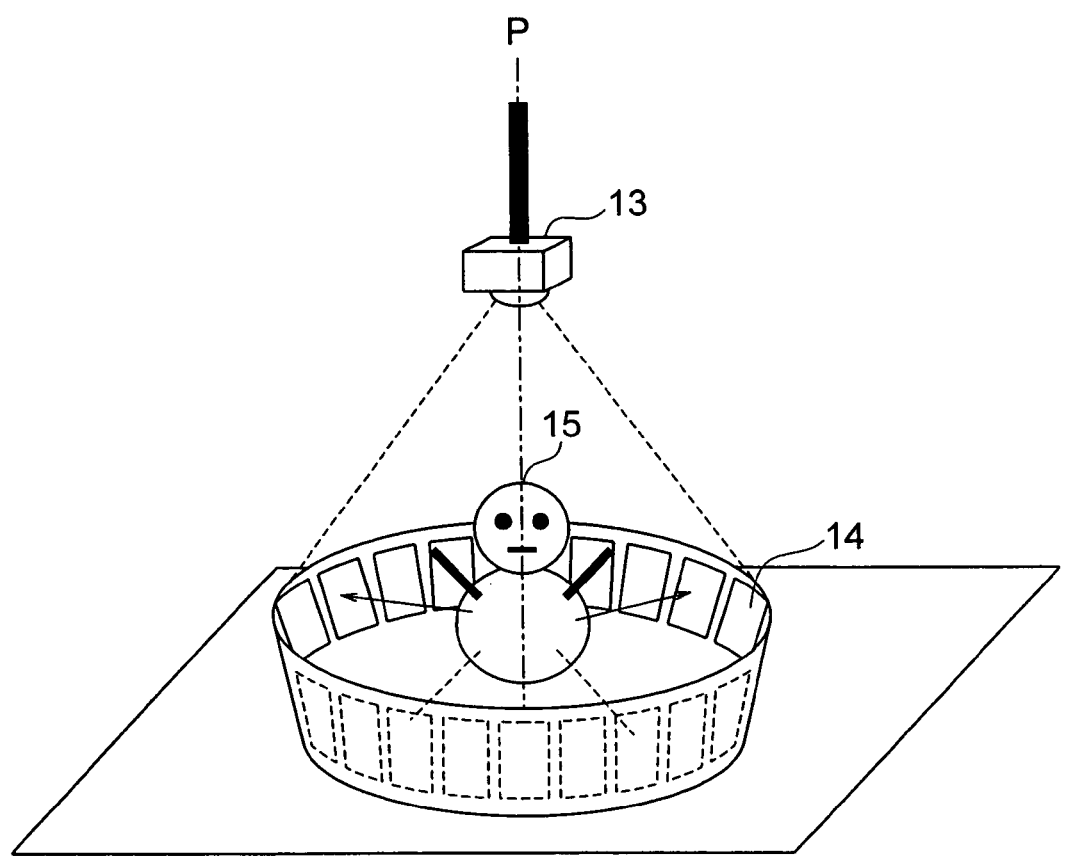
FIG. 12 is a view illustrating a principle of a camera system that forms projected images in the display system according to the first embodiment.
Figure 13:
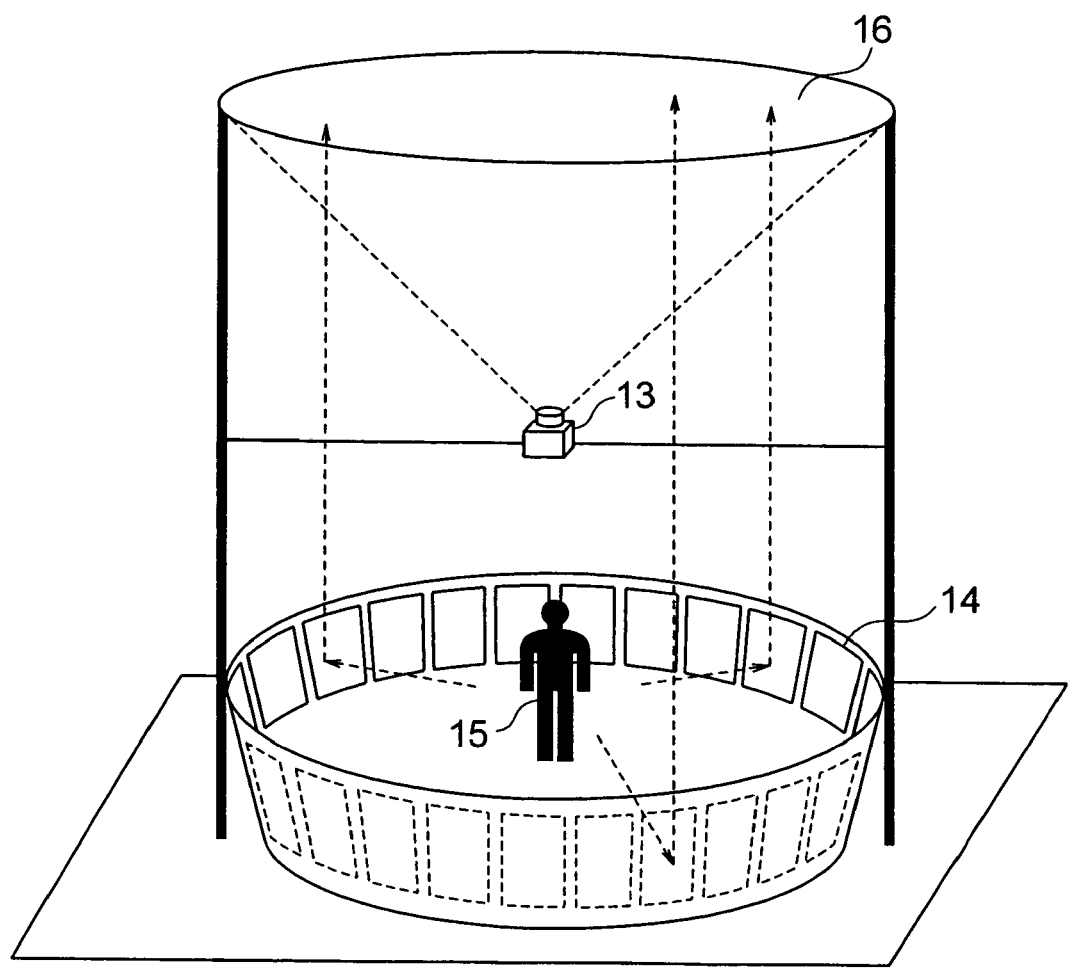
FIG. 13 is a view showing a construction of a camera system in the display system according to the first embodiment.

FIGS. 1 to 13 show a first embodiment. First, an outline construction of a display system according to the first embodiment will be described with reference to FIG. 1. FIGS. 1 to 11 are views illustrating the display system and FIGS. 12 and 13 are views illustrating a camera system.

FIG. 1 is a perspective view showing an outward appearance of the display system according to the first embodiment. In FIG. 1, the display system according to the embodiment comprises an electronic projector 1 that projects various images, a stereoscopic screen 3 that finally receives an image from the electronic projector 1 to display the image, a plurality of polygonal mirrors (mirror groups) 5 arranged around the stereoscopic screen 3, an auxiliary mirror 4 that guides a projected light from the electronic projector 1 to the polygonal mirrors, and a control unit 6 that generally controls the display system.

The stereoscopic screen 3 comprises, on an outer peripheral surface thereof, a projected image surface 50 to display an image, and receives a projected light from the polygonal mirrors (mirror groups) 5 arranged around the projected image surface 50 to enable an image on the projected image surface 50. Accordingly, a user can see an image displayed on the stereoscopic screen 3 from therearound. The embodiment adopts the stereoscopic screen 3, which is columnar (cylindrical)-shaped with a central axis P vertical, but is not limited thereto. It is possible to adopt a stereoscopic screen 3 having a shape of a solid (similarity of rotation), such as cone, sphere, etc., which a plane figure rotates on a single straight line disposed on the same plane, as an axis (central axis P) to generate. Thereby, users around the stereoscopic screen 3 can see images on the same condition. In addition, while images cannot be seen on the same condition, a stereoscopic screen 3 not having the shape of similarity of rotation will do.

Further, the stereoscopic screen 3 comprises, on the projected image surface 50, a visible field angle limiting filter 12 that limits a visible field angle projected onto the stereoscopic screen 3 in a left-right direction, and a directional reflection screen 11 for an improvement in visibility. The directional reflection screen 11 comprises a corner mirror sheet 11a for an improvement in visibility in a horizontal direction, and an anisotropic diffusion sheet 11b for an improvement in visibility in a vertical direction.

The polygonal mirrors 5 comprises mirror groups composed of a plurality of mirrors arranged on concentric circles centering on the stereoscopic screen 3. In order to ensure the visibility of the stereoscopic screen 3, the polygonal mirrors 5 are arranged to be eccentric upward or downward. That is, users who see the stereoscopic screen 3 are positioned such that positions Q1 directly opposed to the stereoscopic screen 3 are favorable in visibility. Accordingly, with the polygonal mirrors 5, a plurality of mirror groups are arranged on a concentric circle of positions Q2 displaced a length L1 upwardly or downwardly of the positions Q1 directly opposed to the stereoscopic screen 3 (see FIG. 3).

Further, since the polygonal mirrors 5 are mounted in positions made eccentric relative to the stereoscopic screen 3, the respective mirrors are arranged at an inclination directed toward the stereoscopic screen 3 relative to a direction, in which they are eccentric. Since according to the embodiment the stereoscopic screen 3 adopts a shape of similarity of rotation, the stereoscopic screen 3 comprises a plurality of mirrors arranged on a ring-shaped conical surface formed on a circular track centered on the central axis P and having the same radius.

Figure 2:
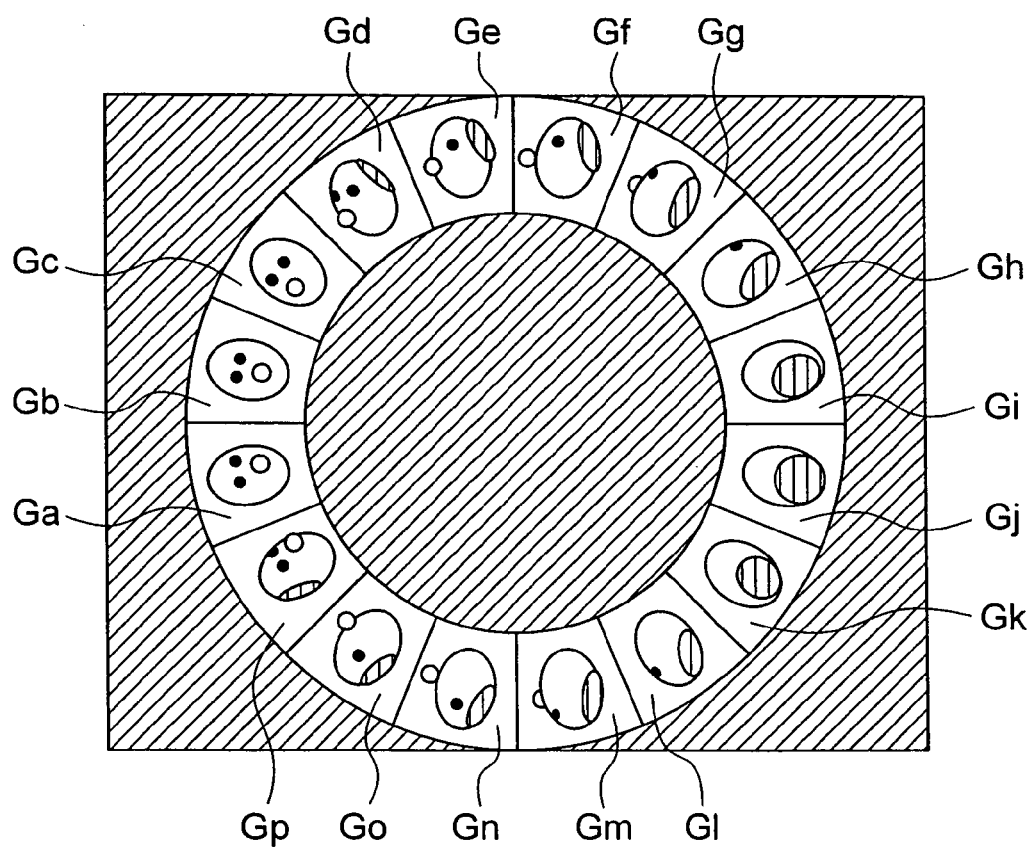
FIG. 2 is a schematic view showing projected images projected by an electronic projector of the display system according to the first embodiment.

The electronic projector 1 uses a liquid crystal and projects image segments of a body corresponding to respective mirrors of the polygonal mirrors 5 (see FIG. 2). The electronic projector 1 is arranged on one side of the central axis P. Since a single electronic projector 1 is adopted in the embodiment, it is arranged on the central axis P. Therefore, projection on the polygonal mirrors 5 on the same condition (optical path length) can be made.

Here, the electronic projector 1 is not limited to one in number. It is possible to adopt, for example, a plurality of the electronic projectors 1, in which case projection on the same condition as that in case of one in number can be made by arranging the electronic projectors on a concentric circle around the central axis P.

The auxiliary mirror 4 is arranged on a projection optical path X of the electronic projector 1 and the polygonal mirrors 5 to cooperate with the electronic projector 1 and the polygonal mirrors 5 constitute a projection optical system. According to the embodiment, the electronic projector 1 and the polygonal mirrors 5 are arranged in a lower region on one side of the central axis P and the auxiliary mirror 4 is arranged in an upper region on the other side thereof. The auxiliary mirror 4 is stuck to a back surface (lower surface) of a roof plate of the display system.

With the display system, a image segment projected from the electronic projector 1 is reflected by the auxiliary mirror 4 to be presented to respective mirrors of the polygonal mirrors 5 arranged around the stereoscopic screen 3. Since the respective mirrors of the polygonal mirrors 5 are mounted to face the stereoscopic screen 3, they reflect the presented image segments toward the projected image surface 50 of the stereoscopic screen 3. Thereby, the image segments can be displayed on the projected image surface 50 of the stereoscopic screen 3. Here, a plurality of image segments displayed on the projected image surface 50 are set so as to display the projected image surface 50 leaving no space between them. Further, the image segments are ones when the same body is seen from different positions therearound. Accordingly, seeing an image displayed on the projected image surface 50 of the stereoscopic screen 3 while going thereround, it is possible to see different sides of a displayed object.

One of important features of the embodiment resides in that since image segments projected from a projector such as the electronic projector 1 are projected onto the projected image surface 50 of the stereoscopic screen 3 through the polygonal mirrors 5 arranged around the stereoscopic screen 3, it is possible to present general purpose images such a stereoscopic image, etc. to users who see from around the projected image surface 50. Thereby, as compared with a conventional arrangement, in which a screen is rotated, miniaturization and large-sizing are made possible since there is no need of rotating a screen.

Also, one of other important features of the embodiment resides in that an improvement in visibility is achieved by applying various contrivances on the projected image surface 50 of the stereoscopic screen 3.

One of the contrivances is provided by the visible field angle limiting filter 12 that limits a visible field angle projected onto the stereoscopic screen 3 in the left-right direction. According to the embodiment, a user will see a image segment, which correspond to a specified direction around the stereoscopic screen 3, from the direction. Here, when an adjacent image segment is seen at the same time, it is not possible to clearly and visually confirm a preceding image segment. Here, according to the embodiment, there is provided the visible field angle limiting filter 12 having limitations so as to have an adjacent image segment unseen. In addition, it is not especially necessary to provide an abstract image segment.

Also, one of other important features resides in the provision of the directional reflection screen 11 for an improvement of a display screen of the stereoscopic screen in visibility. The directional reflection screen 11 comprises two sheets in a horizontal direction and in a vertical direction, the corner mirror sheet 11a, and the anisotropic diffusion sheet 11b.

Since the stereoscopic screen 3 having a shape of similarity of rotation is adopted in the embodiment, the projected image surface 50 defines an arcuate surface, of which a central portion is easy to see and both sides are hard to see. Here, according to the embodiment, the corner mirror sheet 11a that retroreflects a horizontal, incident light is stuck to the projected image surface 50. Thereby, visibility can be heightened by making images displayed on the projected image surface 50 uniform. Further, since it is possible to increase a reflected light presented to users, the whole screen can be made bright.

Also, according to the embodiment, the anisotropic diffusion sheet 11b is stuck to the projected image surface in order to restrict condensing in a vertical direction to have an image seen in a further wide range. Thereby, the whole surface of the stereoscopic screen 3 is seen in uniform brightness in the vertical direction, so that it can be made easy to see.

While the directional reflection screen 11 comprising two sheets in the horizontal direction and in the vertical direction is adopted in the embodiment, at least the corner mirror sheet 11a in the horizontal direction is adopted.

Also, one of other important features of the embodiment resides in that miniaturization is realized by adopting the auxiliary mirror 4. According to the embodiment, the polygonal mirrors 5 arranged around the stereoscopic screen 3 are arranged in positions Q2 displaced toward the central axis P relative to the directly opposed positions Q1, so that it is necessary to increase a distances (radius L2) to the polygonal mirrors 5 from the central axis P. That is, it is necessary to increase a radius L2 to a track, on which the polygonal mirrors 5 are arranged.

In trying to project a projected light of the electronic projector 1 directly onto the polygonal mirrors 5, it is necessary to increase a projection range (projection angle Θ1) of the electronic projector 1, or a distance to the polygonal mirrors 5 from the electronic projector 1. When the projection angle Θ1 is made large, there is caused a problem of distortion in image segments, and when a distance to the polygonal mirrors 5 from the electronic projector 1 is increased, there is caused a problem that the whole system becomes lengthy along the central axis P.

Here, the embodiment adopts the auxiliary mirror 4 to thereby solve the problems. That is, the problems are solved by arranging the electronic projector 1 and the polygonal mirrors 5 on one side of the central axis P and adopting the auxiliary mirror 4, by which a projected light of the electronic projector 1 is refracted to the polygonal mirrors 5, on the other side thereof.

In addition, while the embodiment adopts a single auxiliary mirror 4, a plurality of auxiliary mirrors may be arranged. Exemplarily, by arranging the electronic projector 1 and a second auxiliary mirror on one side of the central axis P and arranging a first auxiliary mirror and the polygonal mirrors 5 on the other side thereof, a projected light of the electronic projector 1 may be refracted successively to the first auxiliary mirror and the second auxiliary mirror to be presented to the polygonal mirrors 5.

The display system according to the embodiment will be described below in further detail with reference to FIGS. 2 to 11.

First, the image segments will be described specifically. FIG. 2 is a schematic view showing projected images projected by the electronic projector. According to the embodiment, a single electronic projector 1 is arranged on the central axis P, so that images projected by the electronic projector 1 comprise a plurality of image segments Ga to Gp arranged in a ring-shaped manner so as to get clear of the stereoscopic screen 3. These image segments Ga to Gp, respectively, are images when the same body is seen from different surrounding positions. Exemplarily, assuming that a image segment Ga is one seen from a front face of the body, a image segment Gi is one when the body is seen from just behind thereof, and positions of the image segments Ga to Gp on the projected image surface correspond to positions, in which the body is seen. These image segments Ga to Gp, respectively, are reflected by separate mirrors of the polygonal mirrors 5 to be projected onto the screen 3 with a visible field angle limiting filter.

Figure 3:
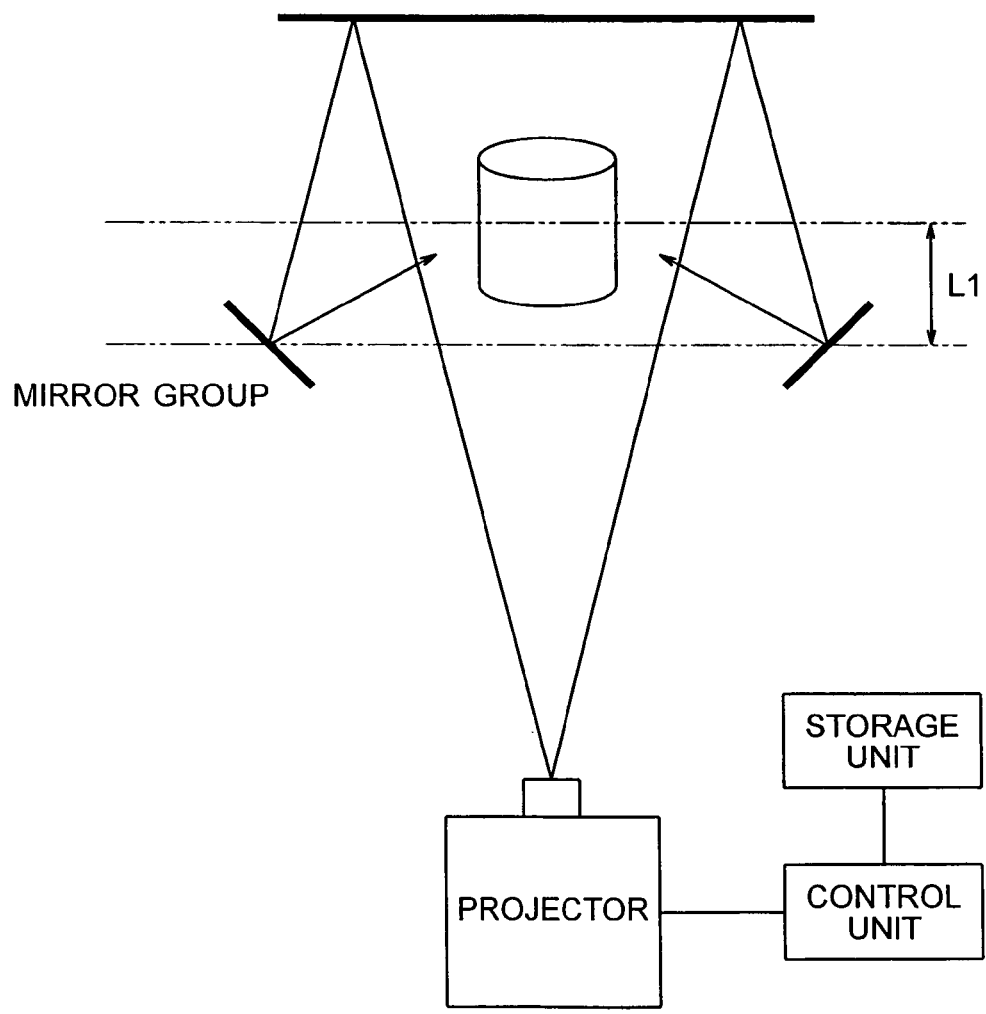
FIG. 3 is a schematic, cross sectional view showing a whole outline construction of the display system according to the first embodiment.
Figure 4:
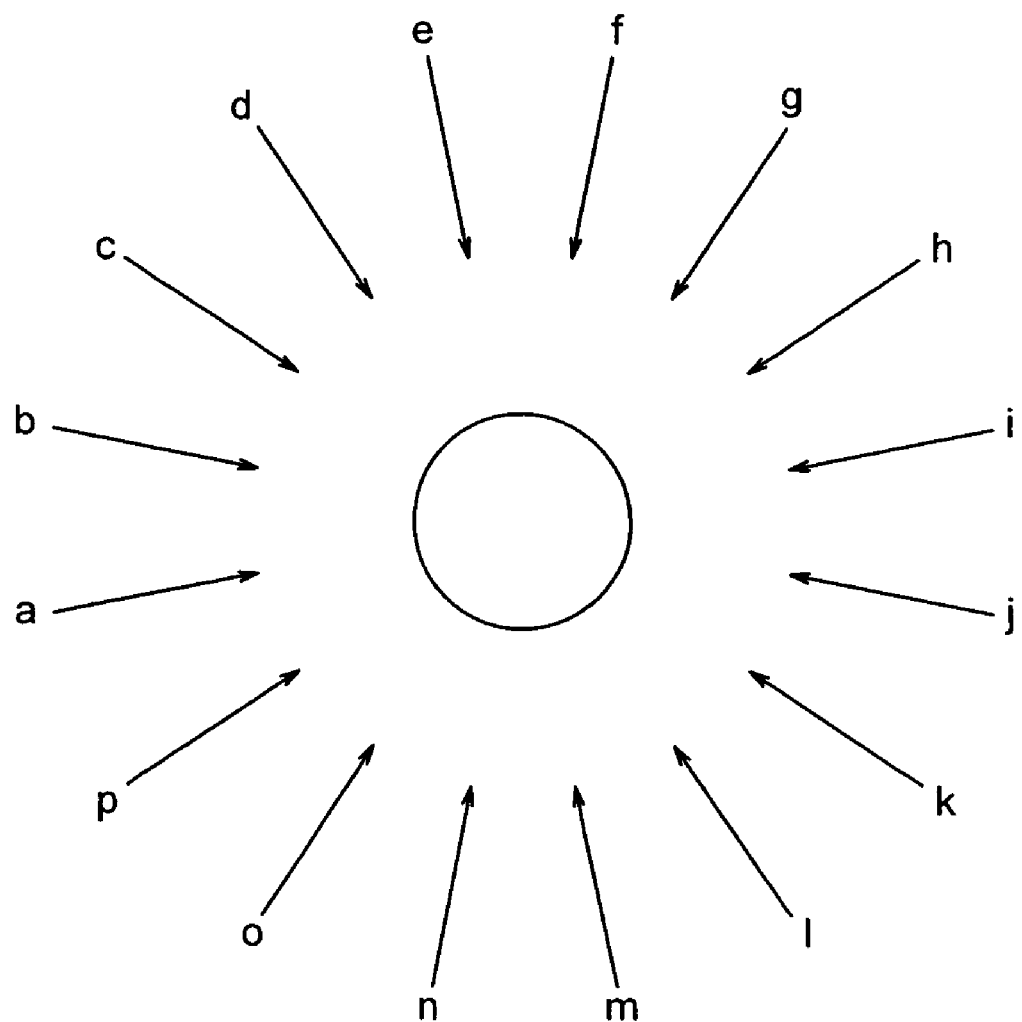
FIG. 4 is a plan view showing the display system according to the first embodiment and viewing angle directions of users in the display system.
Figure 5:
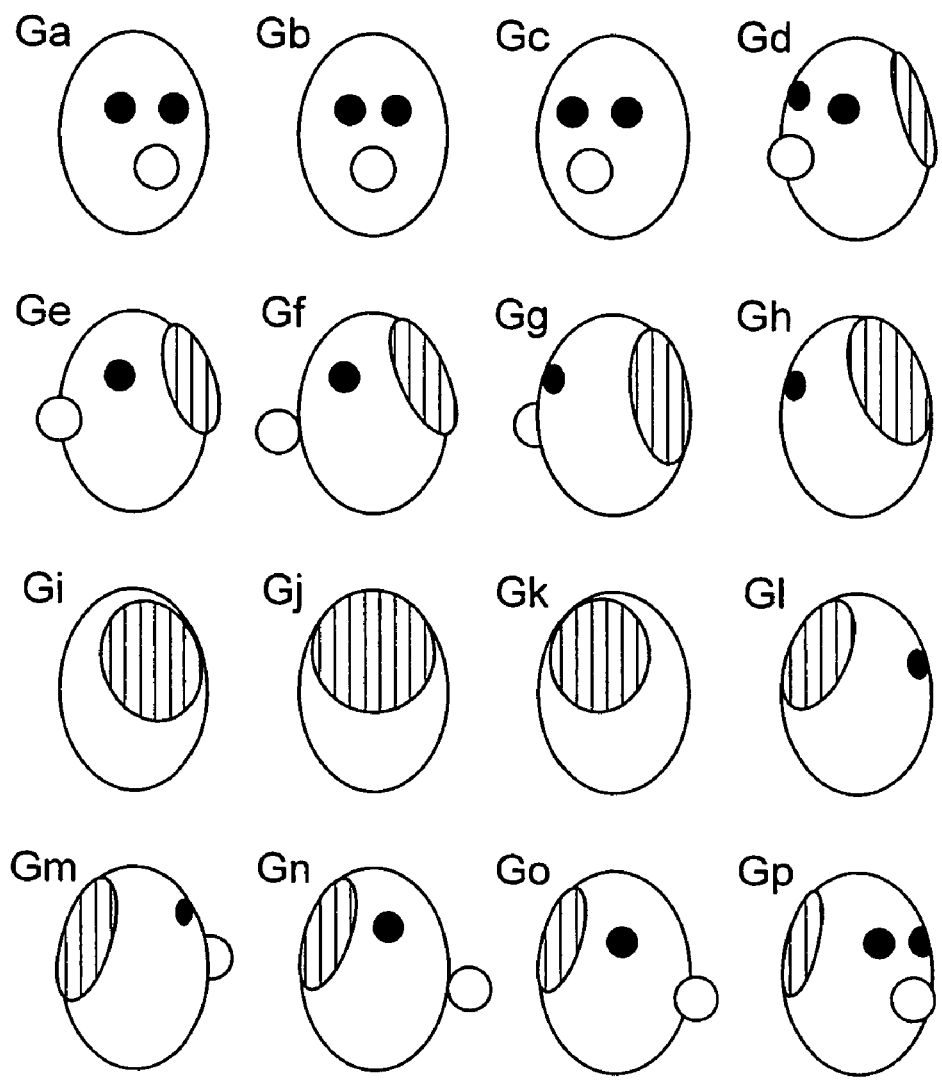
FIG. 5 is a view showing displays in the viewing angle directions shown in FIG. 4.

Subsequently, an outline construction of the display system and images provided by the display system will be described specifically. FIG. 3 is a schematic, cross sectional view showing a whole outline construction of the display system shown in FIG. 1. FIG. 4 is a plan view showing the display system and viewing angle directions of users. FIG. 5 is a view showing displays in the viewing angle directions.

In FIG. 3, according to the embodiment, various image data representative of image segments Ga to Gp shown in FIG. 2 are stored in a storage unit 8 and projected by the electronic projector 1 under control of a control unit 6. The control unit 6 generally controls the display system and reads image data from the storage unit 8 to supply the same to the electronic projector 1, thus projecting images shown in FIG. 2. Projected image composed of such image segments Ga to Gp may be optionally created by means of computer graphics, etc. or may be photographed by a CCD camera to be created as described later. Also, in case of being photographed by a CCD camera to be created, such creation may be made in a remote location and created image data may be received and stored in the storage unit 8.

In FIGS. 4 and 5, with the display system according to the embodiment, the control unit 6 reads image data from the storage unit 8 to supply the same to the electronic projector 1 as described above. The electronic projector 1 uses the received image data to cause images shown in FIG. 2 to outgo. The outgoing images are reflected by the mirror 4, and then reflected every image segments Ga to Gp by different mirrors of the polygonal mirrors 5 to be projected onto the stereoscopic screen 3.

Thereby, assuming that directions, in which the stereoscopic screen 3 is seen from around the stereoscopic screen 3, are denoted by a to p as shown in FIG. 4, image segments Ga to Gp, respectively, are projected onto the stereoscopic screen 3 in the a to p directions. Consequently, different image segments Ga to Gp are displayed on the stereoscopic screen 3 according to those directions, in which the stereoscopic screen 3 is seen from therearound as shown in FIG. 5.

Exemplarily, when the stereoscopic screen 3 is seen in the a direction, a image segment Ga is displayed, and when the stereoscopic screen 3 is seen in the k direction, a image segment Gk is displayed. Accordingly, a stereoscopic image can be seen when seen from around the stereoscopic screen 3.

Figure 6:
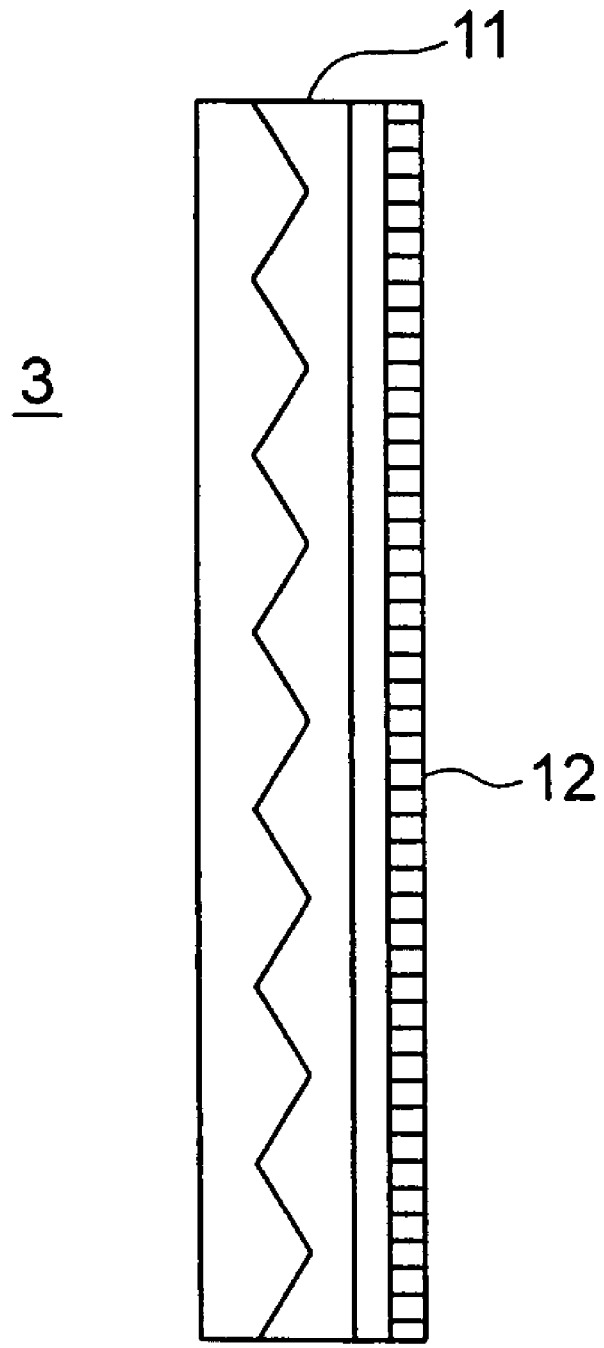
FIG. 6 is a partial, cross sectional view showing a projected image surface of a stereoscopic screen in the display system according to the first embodiment.
Figure 7A:
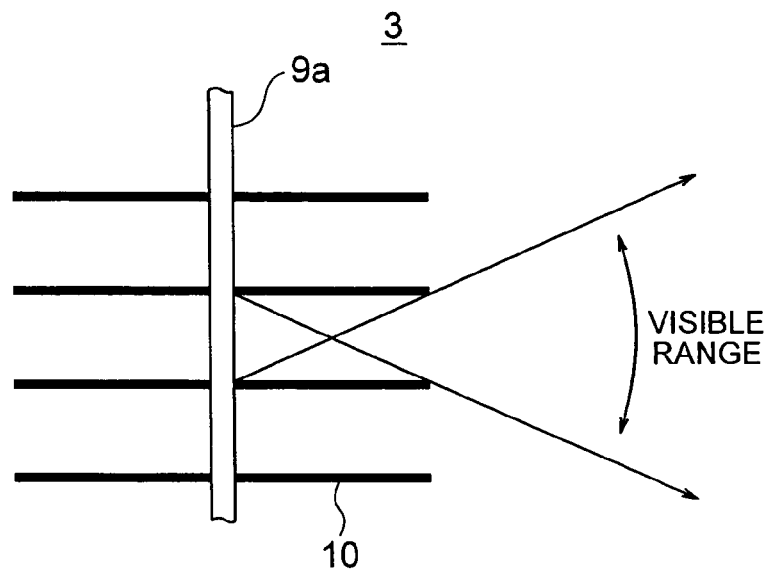
FIG. 7 is a view showing details of a visible field angle limiting filter in the display system according to the first embodiment.
Figure 7B:
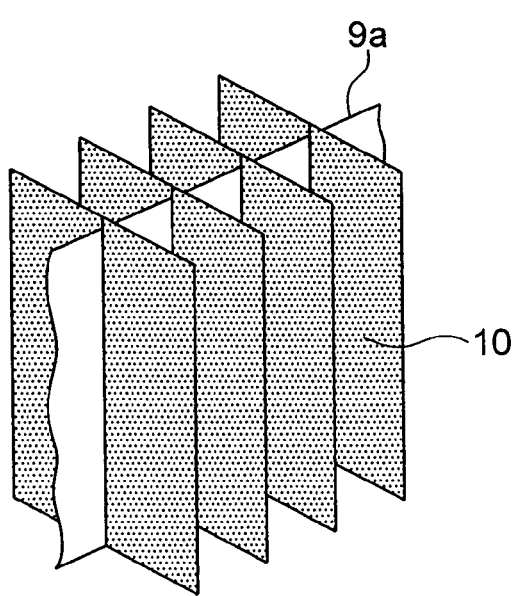
Figure 8:
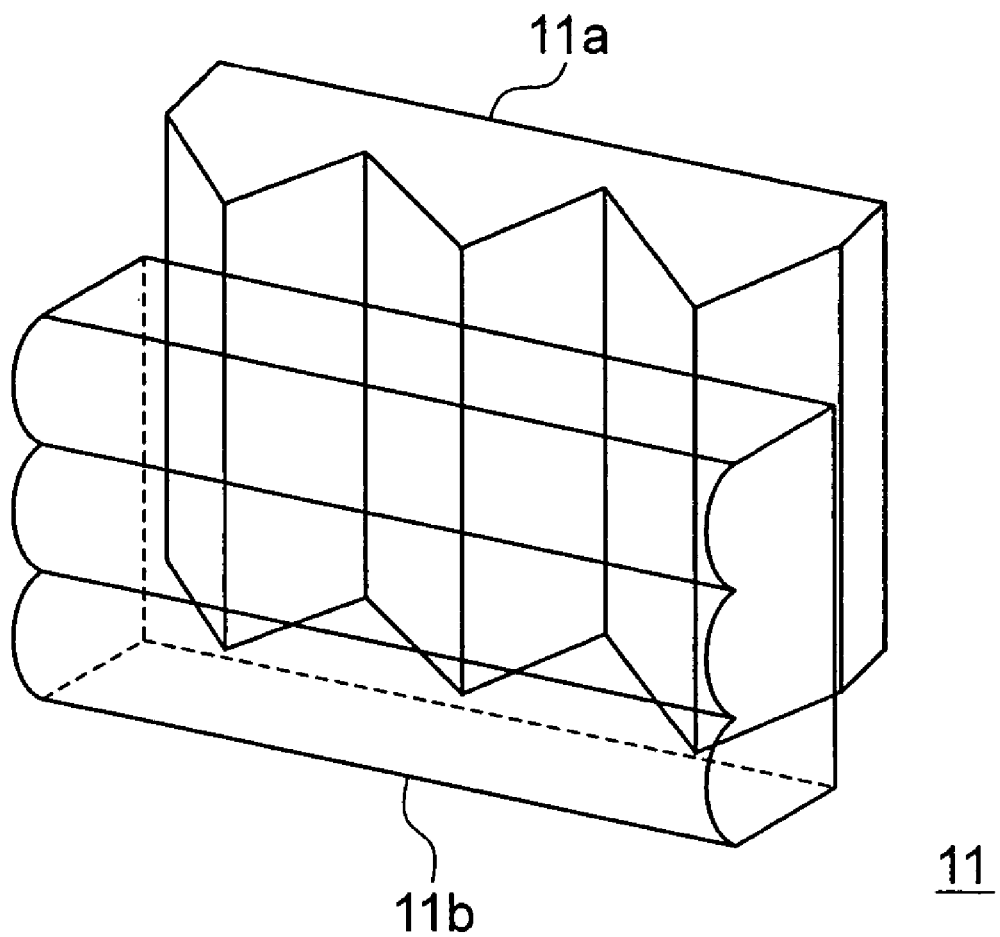
FIG. 8 is a partial, perspective view showing, in enlarged scale, a directional reflection screen in the display system according to the first embodiment.
Figure 9:
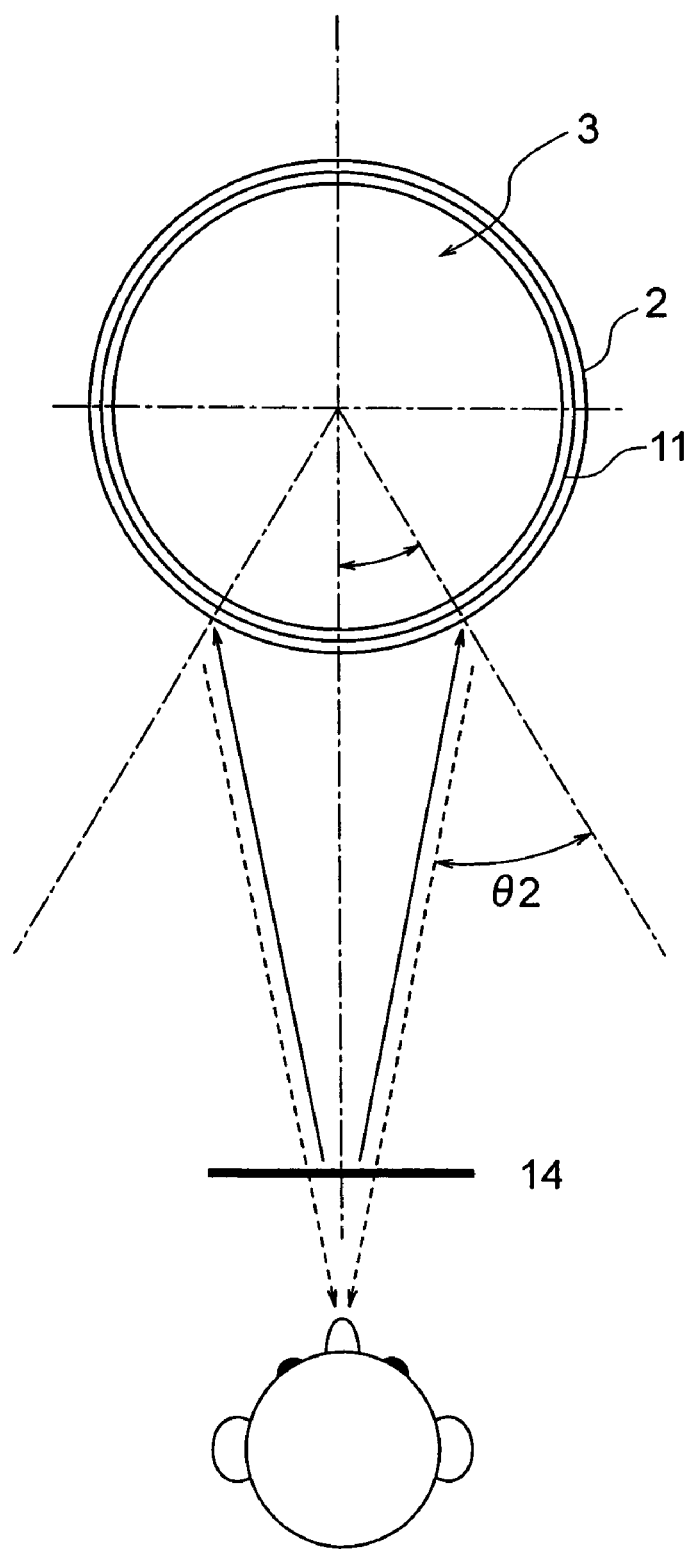
FIG. 9 is a plan view illustrating a range, in which a user can see a displayed image, in the display system according to the first embodiment.

Subsequently, a visible field angle limiting filter and a directional reflection screen will be described specifically with reference to FIG. 6. FIG. 6 is a partial, cross sectional view showing a projected image surface of a stereoscopic screen. FIG. 7 is a view showing details of the visible field angle limiting filter, FIG. 7(a) being a cross sectional view, and FIG. 7(b) being a perspective view. FIG. 8 is a partial, perspective view showing, in enlarged scale, the directional reflection screen. FIG. 9 is a plan view illustrating a range, in which a user can see a displayed image.

In FIG. 6, according to the embodiment, the directional reflection screen 11 is stuck to the projected image surface 50 of the stereoscopic screen 3 and has the visible field angle limiting filter 2 stuck to a surface thereof. Also, the directional reflection screen 11 is structured such that the anisotropic diffusion sheet 11b overlaps a surface of the corner mirror sheet 11a. According to the embodiment, by arranging the visible field angle limiting filter 2 on the surface, an adjacent image segment does not obstruct a final image reflected toward a user from the directional reflection screen 11.

In FIG. 7, the stereoscopic screen 3 comprises a screen sheet-shaped member 9, which makes a base of the visible field angle limiting filter 2, and a plurality of shielding fins 10 arranged at equal intervals on both surfaces of the screen sheet-shaped member 9. The fins 10 have a thickness of, for example, around 100 to 200 μm and are provided at a pitch in the order of a dimension of pixels on the stereoscopic screen 3, for example, 0.5 to 2 mm, whereby when images shown in FIG. 2 are projected, image segments (adjacent image segments) projected by adjacent mirrors of the polygonal mirrors 5 are shielded and only a image segment projected by a corresponding mirror can be seen every direction even when the stereoscopic screen 3 is seen from any direction.

The visible field angle limiting filter 2 has the fins 10 restricting a visible field angle so as to make adjacent image segments invisible, and the fins 10 are set in height according to a visible field angle limiting angle (visible range). Here, the visible field angle limiting angle in the order of ±360°/(number of image segments in one circumference×4) is given. In the case where the number of image segments of a projected image is, for example, 16 as shown in FIG. 2, a visible field angle limiting angle (visible range) is in the order of ±5.6° (=±360°/(16×4)) and the fins 10 therefore have a height in the order of 5 to 20 mm. Also, in case of 10 image segments, a visible field angle limiting angle is around ±9.0° (=±360°/(10×4)) and the fins 10 therefore have a height in the order of 3.2 to 13 mm.

Alternatively, a construction can do, in which shielding partitions (not shown) acting in the same manner as the fins 10 and having a thickness in the order of 50 to 200 μm are inserted at a pitch of around 0.3 to 2 mm into a transparent film or a transparent substrate (not shown) having a thickness of around 3 to 20 mm in the case where a visible field angle limiting angle is around ±5.6° (in case of 16 image segments), and having a thickness of around 1.9 to 13 mm in the case where a visible field angle limiting angle is around ±9.0° (in case of 16 image segments). Also, except the construction, a construction may do, in which a cylindrical lens for condensing in a visible field angle limiting direction is arranged.

A directional reflection screen material as described in JP-A-11-258697 may be used as a further specific example of the stereoscopic screen 3 provided with the visible field angle limiting filter 2 in FIG. 1.

In FIG. 8, according to the embodiment, the directional reflection screen 11 comprises the corner mirror sheet 11a and the anisotropic diffusion sheet 11b. In addition, the embodiment adopts a lenticular sheet as the anisotropic diffusion sheet 11b. The directional reflection screen 11 possesses a property of retroreflection of an incident light in a horizontal direction and diffuse reflection in a vertical direction, and reflects a light, which is incident at an incident angle within ±45°, in a direction of incidence. That is, a user opposed directly to the projected image surface 50 can see an image in the left and right range of ±45°. Accordingly, since the stereoscopic screen 3 using such directional reflection screen 11 is wide in the range of an input angle, which enables reflection in a predetermined direction, as compared with the stereoscopic screen 3 not using the directional reflection screen 11, the quantity of reflected light is much with the result that a bright image is obtained.

In the case where only the directional reflection screen 11 is used, however, a light is in some cases reflected in a different direction from a direction of incidence depending upon an angle, at which the light is incident, with the result that image segments from a plurality of directions are seen overlapping one another depending upon a direction, in which the image segments are seen. Here, the visible field angle limiting filter 12 shown in FIG. 7 is also provided in order to prevent such reflected light from other directions to enable a viewer to see only a image segment corresponding to a direction.

In FIG. 9, the visible field angle limiting filter 12 is structured such that the fins are arranged at a small pitch as shown in FIG. 7. The visible field angle limiting filter (visible field angle limiting optical system) 12 having a visible field angle limit (visible range) of, for example, about ±24 degrees to a normal line to a surface of the directional reflection screen 11 is stuck to the surface whereby a reflected light of neighbouring image segments is shielded and only a image segment from a correct direction is displayed as shown in FIG. 9 and can be seen in the a to p directions (FIG. 4). Consequently, when a direction seen when going around the stereoscopic screen 3 is changed to a, b, c, . . . , p, only a image segment Ga to Gp (see FIG. 5) of the body corresponding to a viewing direction can be seen every viewing direction, thus producing an effect that a plurality of people can enjoy images at the same time in optional directions.

Subsequently, an explanation will be given to applications of an external shape of the stereoscopic screen 3. FIG. 10 are perspective views showing outward appearances of applications of a shape of the stereoscopic screen 3, FIG. 10(a) being a perspective view showing a columnar shape shown in FIG. 1, FIG. 10(b) being a perspective view showing a stereoscopic screen, in which a circumferential surface of a columnar shape is defined by a concave arc, and FIG. 10(c) being a perspective view showing a stereoscopic screen in the form of a vertically long sphere.

As described above, the stereoscopic screen 3 according to the embodiment produces the same function and effect as those illustrated in FIG. 1 when it assumes a shape of similarity of rotation. Accordingly, the columnar shape is not limited to the columnar shape as shown in FIG. 10(a).

Exemplarily, FIG. 10(b) shows a stereoscopic screen 3, of which a circumferential surface is defined by a concave arc so that the circumferential surface of a columnar shape is thin at a center thereof and becomes gradually thick as it goes in a vertical direction. Since the stereoscopic screen 3 is curved toward a center thereof in the vertical direction, the same function and effect as those in case of adopting the anisotropic diffusion sheet 11b can be obtained even when the anisotropic diffusion sheet 11b is not adopted.

On the other hand, it is preferable to adopt the corner mirror sheet 11a also in the vertical direction in a shape defined by a convex arc, which gradually retreats toward the rear in a horizontal direction and in a vertical direction.

Also, as described above, according to the embodiment, the stereoscopic screen 3 is not necessarily limited to a shape of similarity of rotation. For example, respective image segments may be changed conformed to an external shape of the stereoscopic screen 3. Alternatively, a decorative effect is produced in case of displaying an abstract pattern, etc.

A modification of the first embodiment will be described with reference to FIG. 11. FIG. 11 is a view showing an outline construction of an application of the first embodiment shown in FIG. 1. In FIG. 11, the embodiment comprises a display system not adopting the auxiliary mirror 4. That is, with the modification, an electronic projector 1 is fixed to a ceiling, a stereoscopic screen 3 is mounted downwardly vertically of the electronic projector, and image segments outgoing from the electronic projector 1 are reflected by polygonal mirrors 5 in the form of a conical surface to be projected onto the stereoscopic screen 3 in the a to p directions shown in FIG. 4. Thereby, image segments Ga to Gp as shown in FIG. 5 are displayed on the stereoscopic screen 3 according to directions (that is, viewing directions).

With the display system, according to the first embodiment, illustrated in FIGS. 1 to 11, a plurality of people can enjoy a stereoscopic image at the same time in optional directions, it is not necessary to regulate respective mirrors of the polygonal mirrors 5, and it is possible to lessen an error in positions and orientations of such mirrors due to fine deviation. Besides, since the polygonal mirrors 5 can be arranged close to the stereoscopic screen 3 provided with the visible field angle limiting filter 2, it is possible to make the whole system small in size and to see a stereoscopic image in a position near to the stereoscopic screen 3.

Also, since projected images including all image segments as shown in FIG. 2 can outgo from the electronic projector 1 at all times, it is not necessary to take account of an outgoing timing every image segment, and since image segments outgoing from the electronic projector 1 are projected onto the stereoscopic screen 3 and people see the projected image segments, a sharp stereoscopic image can be seen in any direction and in any position.

In addition, while it has been described that projection is performed upward by mounting the electronic projector 1 downward along the central axis P of the stereoscopic screen 3 provided with the visible field angle limiting filter 2, such definition of upper and lower positions is used in relation to positions, in which the central axis P and images are formed, for the purpose of easy understanding and is not limited to, for example, the positional relationship of a floor and a ceiling, on which the display system is mounted, and upside down positions will do.

Subsequently, a camera system for formation of the image segments will be described with reference to FIGS. 12 and 13. FIG. 12. is a view illustrating a principle of a camera system that creates projected images shown in FIG. 2. FIG. 13 is a view showing a construction of the first embodiment of a camera system using the principle illustrated in FIG. 12.

In FIG. 12, the embodiment adopts the same construction as that of the display system, that is, a camera system provided with a CCD camera 13 in place of the electronic projector 1. According to the first embodiment of the camera system, the polygonal mirrors 14 comprise a plurality of mirrors arranged on a conical surface in the same manner as the polygonal mirrors 5 shown in FIG. 1. Also, the downwardly directed CCD camera 13 is provided upward along a central axis P of the conical surface. The whole of the polygonal mirrors 14 is included in a visible field of imaging of the CCD camera 13. Respective mirrors of the polygonal mirrors 14 correspond to the a to p directions in FIG. 4.

In photographing, a body 15 being an object of photographing is arranged on the central axis P of the conical surface. An image of the body 15 is reflected by the respective mirrors of the polygonal mirrors 14 and photographed as image segments by the CCD camera 13. Thereby, for example, images shown in FIG. 2 are obtained. In addition, images photographed by the CCD camera 13 may be still pictures or dynamic pictures.

While the embodiment of FIG. 12 assumes that construction, in which the polygonal mirrors 14 are photographed, this is not limitative. For example, as shown in FIG. 13, the same auxiliary mirror 16 as that in the display system of FIG. 1 may be provided between the CCD camera 13 and the polygonal mirrors 14. This will be further described with reference to 13.

In FIG. 13, according to the embodiment, the object 15 of photographing is a person and a full-length image of the person 15 is obtained. The auxiliary mirror 16 is mounted to a back surface of a ceiling disposed above the CCD camera 13 and the CCD camera 13 is directed toward the auxiliary mirror 16. Respective auxiliary mirrors of the polygonal mirrors 14 are arranged on a conical surface in the same manner as the respective auxiliary mirrors of the polygonal mirrors 5 shown in FIG. 12.

Images of the person 15 seen in the a to p directions (FIG. 4), respectively, are reflected by mirrors, which correspond to the polygonal mirrors 14, and further reflected by the auxiliary mirror 16 on the ceiling to be photographed by the CCD camera 13. Thereby, images as shown in FIG. 2 are obtained. In this case, provided that the polygonal mirrors 14 reflect a light toward the auxiliary mirror 16, there is no limitation on an object of photographing and a plurality of objects of photographing may be included.

According to the embodiment, the whole of the camera system can be restricted to be small in height owing to the same function and effect as those of the auxiliary mirror 4.

Second Embodiment

Figure 14:
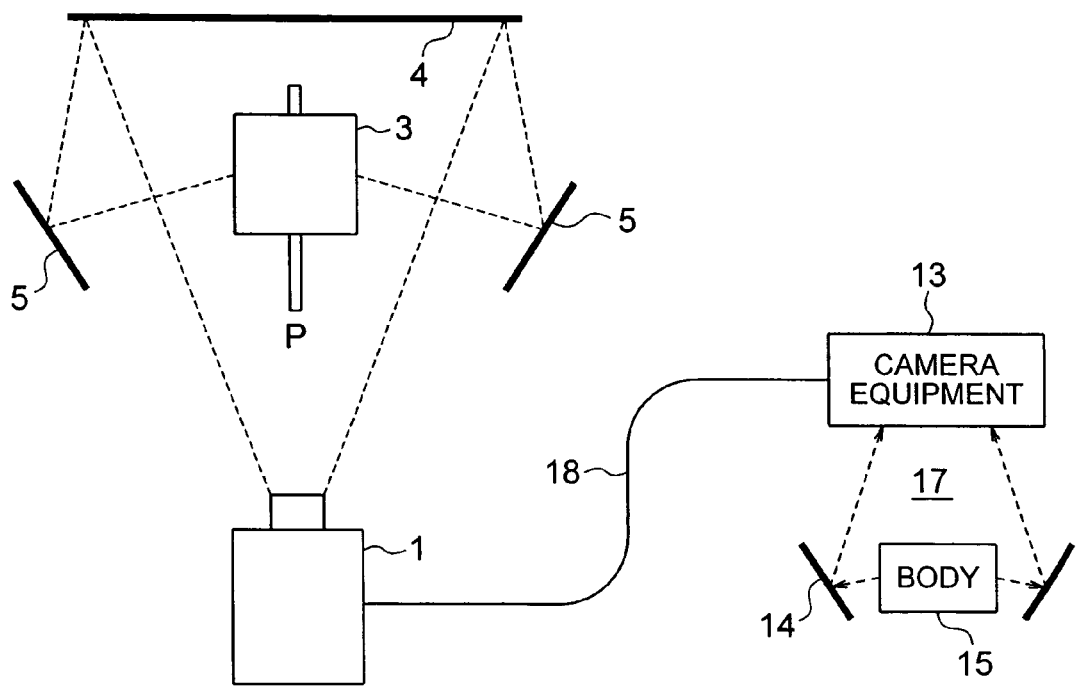
FIG. 14 is a view showing a construction of a display system according to a second embodiment.

FIG. 14 is a view showing a construction of a display system according to a second embodiment. In FIG. 14, according to the second embodiment, the display system is connected to a camera system 17 through a communication path 18. With the camera system 17, when a projected image is obtained by a CCD camera 13 in the way illustrated in FIG. 12, the projected image is processed to create an image signal such as NTSC/PAL to transmit the same to the display system via the communication path 18. In the display system, when the image signal is received, it is converted into an original projected image and fed to an electronic projector 1. Thereby, image segments of the body 15 obtained in the camera system are displayed on a stereoscopic screen 3 in the same manner as in the preceding first embodiment and besides, a stereoscopic image can be displayed in real time together with creation of the projected image.

Here, the communication path 18 may be a wire path or wireless. Also, the camera system 17 may transmit a projected image as obtained to a display system in a remote location via a network, in which case the projected image may be transmitted as data of digital image format such as MPEG, etc. Thereby, the display system enables seeing a stereoscopic image of the body 15 in a remote location.

Further, by making use of the principle of the camera system shown in FIG. 12, it is possible to form a camera system sized corresponding to an object of photographing. That is, a camera system conformed to an object of photographing can be formed by setting dimensions of respective mirrors of polygonal mirrors, which are arranged on a conical surface, and a magnitude of a circle, on which the mirrors are arranged, in conformity to a size of a subject (object of photographing). Also, a position, in which a CCD camera is mounted, is also regulated in level so that a whole of polygonal mirrors having an inner surface in the form of a conical surface is included in a visible field of photographing and image segments from all mirrors of the polygonal mirrors can be photographed.

Third Embodiment

Figure 15:
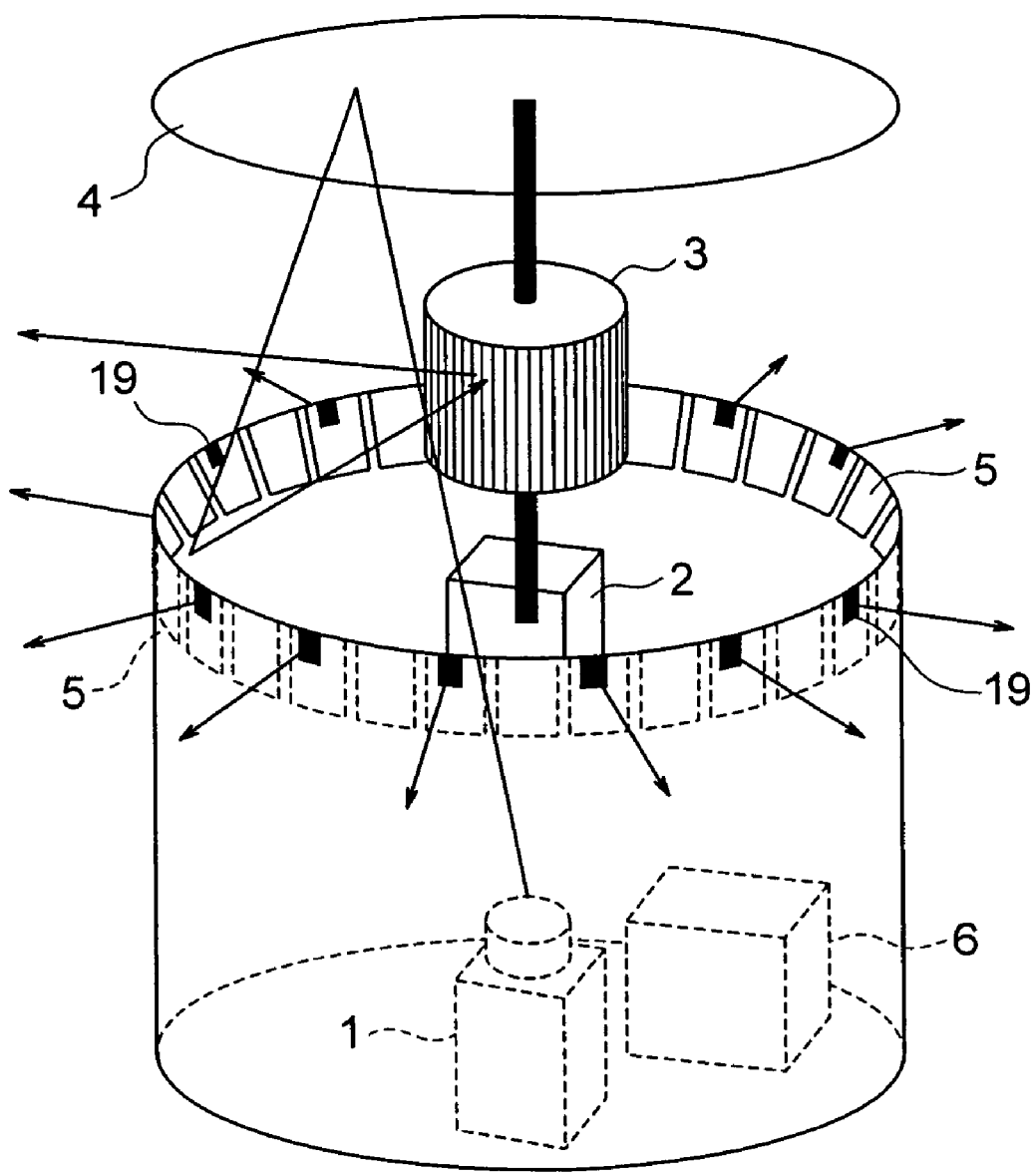
FIG. 15 is a view showing a construction of a display system according to a third embodiment.

FIG. 15 is a view showing a construction of a display system according to a third embodiment. In FIG. 15, according to the third embodiment, the display system is mounted in the street and detects people who approach from four quarters to visually inform the approaching people of various guides.

According to the embodiment, approach of a person can be detected by using a method, in which sensors 19 are provided in a plurality of locations around the display system as shown in FIG. 15, or a mat switch is laid on a floor surface while not shown. Also, as measures of detecting directions a to p (FIG. 4) related to viewers, it suffices to use infrared rays, proximity switches, and microphones, of which number (for example, 16 in the a to p directions) corresponds to that of directions being desired to detect. At this time, it is possible to detect general movements of viewers on the basis of changes in signals, which are obtained from adjacent sensors.

Presently, assuming that the sensors 19 are provided in the manner as shown, signals obtained in the sensors 19 are processed in a control unit 6. The control unit 6 transmits images, which are conformed to movements of viewers, to an electronic projector 1. A direction, in which a person approaches, is detected on the basis of changes in signals of the sensors 19, and a character projected onto the stereoscopic screen 3 is displayed on the stereoscopic screen 3 in a predetermined direction so that the character is opposed directly to the person who is approaching. At this time, a method of creating images so that the character is rotated comprises storing the image segments Ga to Gp as shown in FIG. 5 in the control unit 6 and projecting images, in which the image segments Ga to Gp are displaced one coma or several comas circumferentially, when, for example, the images as shown in FIG. 2 are projected by the electronic projector 1 whereby it is possible to make movements, in which the character looks to rotate. Control may be exercised so that information of directions, which indicates whether any one of the image segments is present at the front, is beforehand stored and a front image is formed in a direction, in which presence of a person is detected.

Also, changes in signals of adjacent sensors 19 enable an interaction, in which a direction of the character is changed in conformity to, for example, an orientation, in which a human hand moves, and movements of a human hand. Further, a plurality of sensors 19 are mounted whereby approach and motions of a plurality of persons are detected and images can be formed corresponding thereto.

Fourth Embodiment

Figure 16:
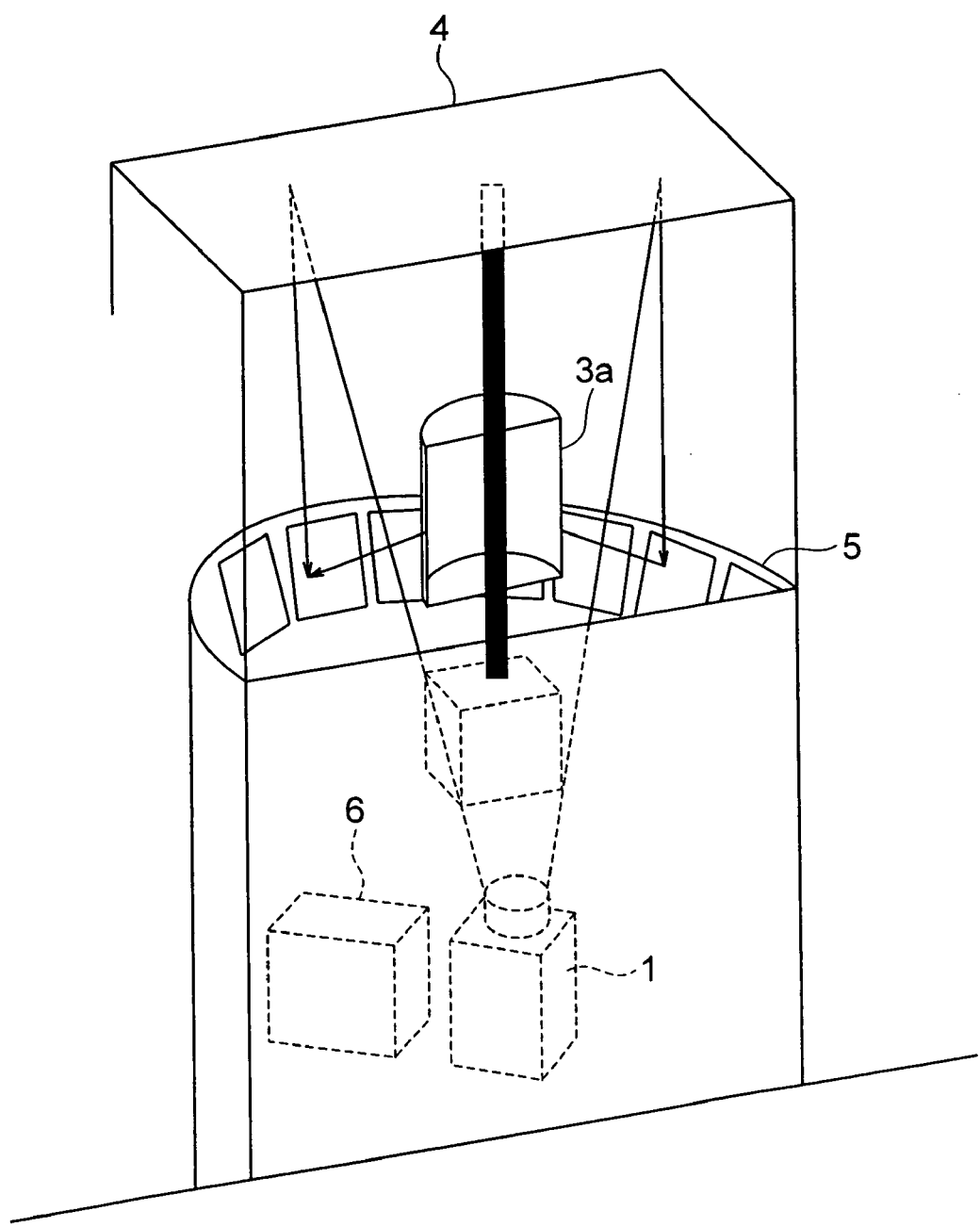
FIG. 16 is a view showing a construction of a display system according to a fourth embodiment.
Figure 17:
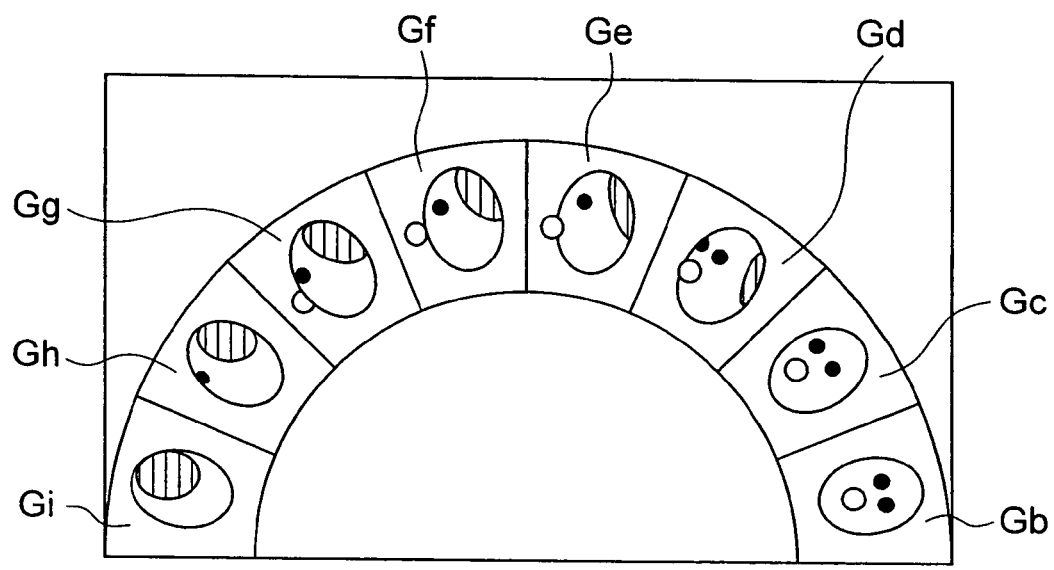
FIG. 17 is a schematic view showing projected images projected by an electronic projector of the display system according to the fourth embodiment.
Figure 18:
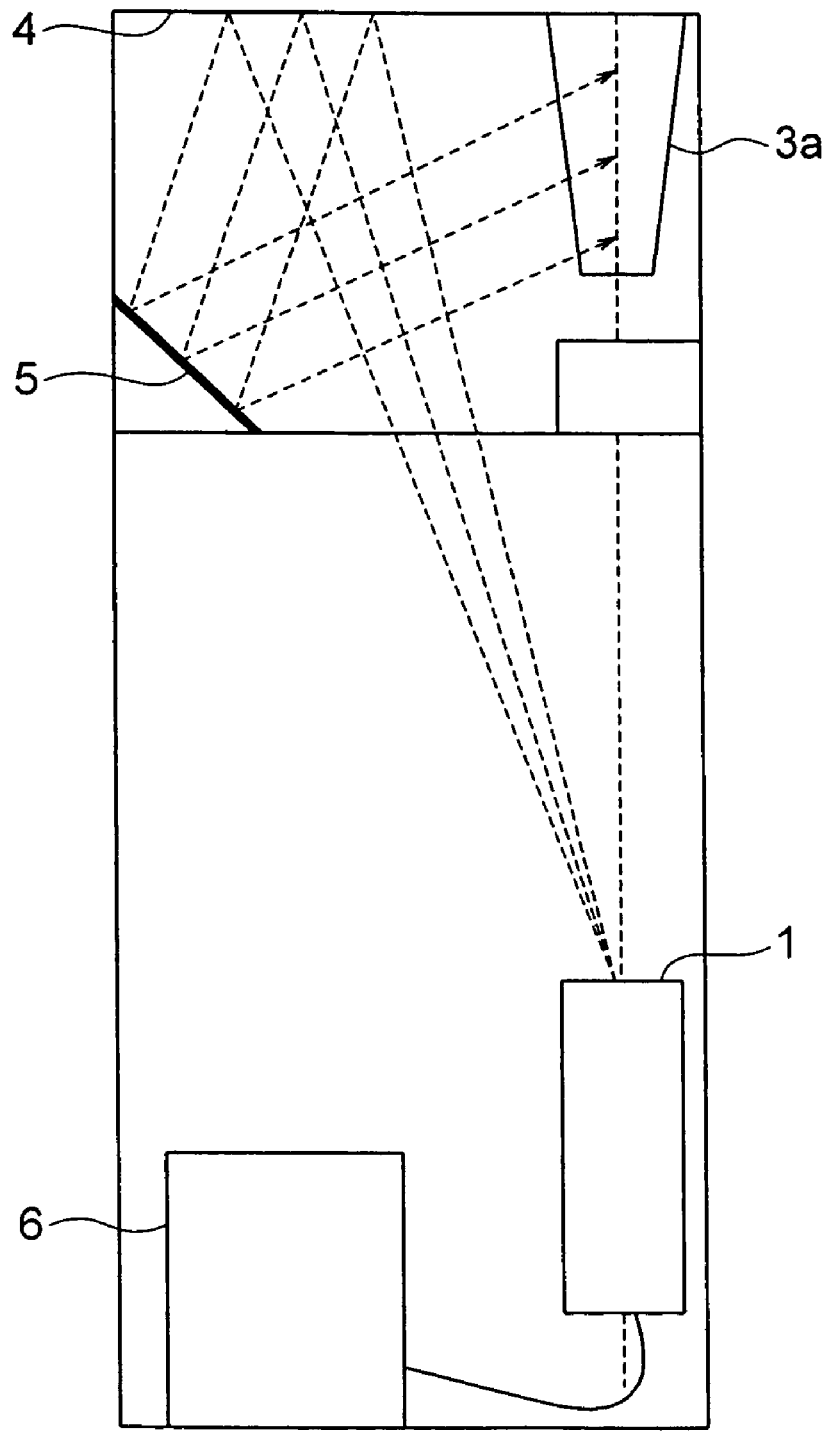
FIG. 18 is a vertical, cross sectional view showing the display system according to the fourth embodiment.

Subsequently, a display system according to a fourth embodiment will be described with reference to FIGS. 16 to 18. FIG. 16 is a view showing a construction of the display system according to the fourth embodiment. FIG. 17 is a schematic view showing projected images projected by an electronic projector 1. FIG. 18 is a vertical, cross sectional view showing the fourth embodiment shown in FIG. 15.

In FIG. 16, the fourth embodiment has a semi-cylindrical shape and polygonal mirrors 5 comprise a plurality of mirrors arranged on a semi-conical surface as shown in FIG. 16. An auxiliary mirror 4 is stuck to a back surface of a ceiling. The polygonal mirrors 5 and the auxiliary mirror 4 form a projection optical system. The electronic projector 1 causes projected images, in which image segments Ga to Gi are arranged on a semi-circle, to outgo as shown in, for example, FIG. 17. A control unit 6 stores such projected images to supply the same to the electronic projector 1.

In FIG. 18, projected images supplied from the control unit 6 and shown in FIG. 17 are caused by the electronic projector 1 to outgo. The images are reflected by the mirror 4 disposed at the back of the ceiling and respective image segments Ga to Gi of the images are further reflected by respective mirrors of the polygonal mirrors 5 to be projected onto a stereoscopic screen 3a.

The projected images outgoing from the electronic projector 1 comprise images, in which divided image segments Ga to Gi (the same as those in FIG. 5) when a body is seen from around in a ring region are aligned on a semi-circle in a circumferential direction as shown in FIG. 17. Such images may be created optionally by means of computer graphics, or may be created by photographing of a CCD camera with the use of the method illustrated in FIG. 12.

With the display system, according to the fourth embodiment, the control unit 6 in the construction reads image data shown in FIG. 16 to supply the same to the electronic projector 1. Projected images of the image data as supplied are caused by the electronic projector 1 to outgo. Light of those respective image segments Ga to Gi of the outgoing projected images, which are divided in the ring region, are reflected by the mirror 4 disposed at the back of the ceiling and then further reflected by respective mirrors of the polygonal mirrors 5 arranged on a semi-conical surface, so that the image segments Ga to Gi are projected onto the stereoscopic screen 3a in, for example, b to i directions shown in FIG. 4.

The stereoscopic screen 3a is one possessing a property that an image projected from a back side transmits therethrough. A screen is desired, which limits a visible field angle in a horizontal direction so as to permit different images to be seen according to a direction of viewing and has a wide range of visible field angle in a vertical direction. Here, a semitransparent diffusion film or the like used for back projection type displays is made use of.

A method of using a Fresnel lens is conceivable as one of methods, which realize the screen described above. A Fresnel lens is one, in which a lens curved surface is made not continuous but stepwise, and has a feature in that light is refracted on stepwise portions and transmitted light is condensed in the same direction as a direction, in which light is incident. Also, a Fresnel lens is different in visible field angle depending on existing products such that there are lenses having a wide visible field angle of about ±60 degrees. When such Fresnel lens is used, light transmits therethrough in the same direction as a direction, in which the light is incident, and is condensed in a certain position, so that a viewer can see an image reflected just on a mirror from a position on a straight line, which connects between each mirror of the polygonal mirrors arranged on the semi-conical surface and a Fresnel lens screen. That is, the use of a Fresnel lens can realize an effect that it is possible to see an image corresponding to a direction of viewing in the same manner as in retroreflection. Also, as far as an angle of a Fresnel lens is present in a predetermined range (in a range of visible field angle) from an angle opposed directly to a viewer, an image projected to a screen can be seen. Also, when a Fresnel lens having stepwise cuts only in a horizontal direction is used, light is condensed only in the horizontal direction, so that the Fresnel lens is thought to be appropriate as a material of the screen.

Also, in order to inhibit light from being condensed in a vertical direction and to have an image seen in a further wide range, it suffices that working be made to provide for diffused reflection in the vertical direction. In order to have a Fresnel lens making diffused reflection in the vertical direction, it suffices to stick a lenticular sheet to a surface of the Fresnel lens. Thereby, a whole screen surface is seen in a further brightness in the vertical direction and made easy to see.

In the method, according to the fourth embodiment, described above, it is not possible to go round a whole circumference but viewing is instead possible approaching from a side, on which inner-surface polygonal mirrors are not mounted. Therefore, viewing while approaching a screen is possible as compared with a whole-circumference type system. Further, while a cylindrical-shaped display system of whole-circumference type is required to be made large in size in order to enlarge a screen and an image reflected on the screen, there is involved a problem that a distance between a viewer and the screen is also increased. With the method according to the fourth embodiment, however, a distance between a screen and a viewer is not affected even when the system itself is enlarged.

Also, according to the first embodiment of the display system, projected images, in which image segments Ga to Gp (in case of 16 comas) are arranged in a ring-shaped manner as shown in FIG. 2, are projected from the electronic projector 1. According to the fourth embodiment, however, projected images, in which image segments Ga to Gi (in case of 8 comas) are arranged on a semi-circle as shown in FIG. 16, are projected from the electronic projector 1. In the case where projected images projected from the electronic projector 1 are the same in resolution, necessary image segments in the fourth embodiment of the display system become half those in the first embodiment. Therefore, respective image segments projected from the electronic projector 1 of the fourth embodiment become four times in resolution image segments projected from the electronic projector 1 of the first embodiment, so that projected image segments are improved in expressive power.

In addition, while polygonal mirrors are semi-circular in the fourth embodiment of the display system, a cylinder, on which the mirrors are arranged, can be made a half or more, or a half or less, in which case an angular direction, in which an image can be enjoyed, is determined by a range of an angular direction, in which the mirrors are arranged on a conical surface.

Fifth Embodiment

Figure 23:
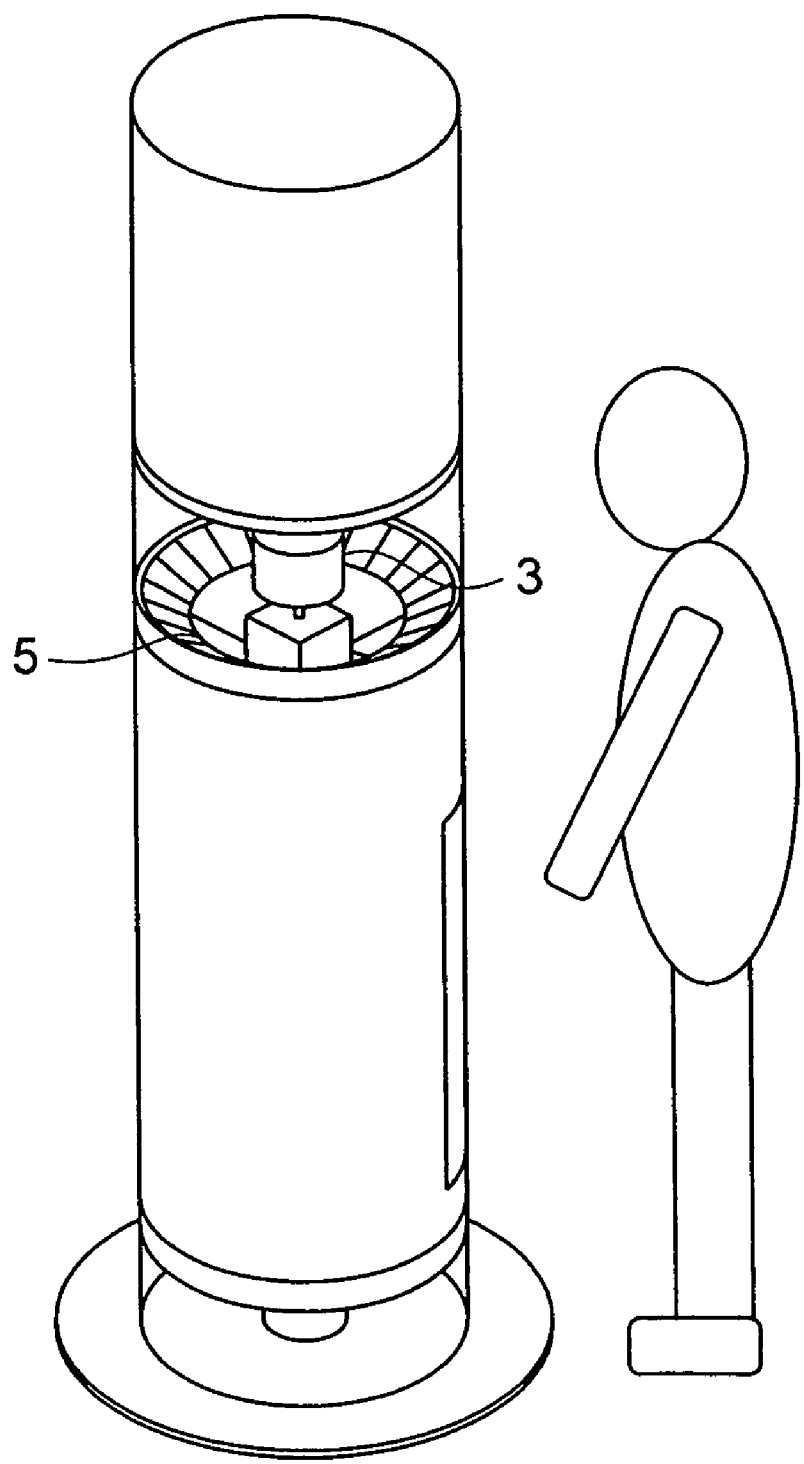
FIG. 23 is a perspective view showing an outward appearance of the display system according to the fifth embodiment.
Figure 24:
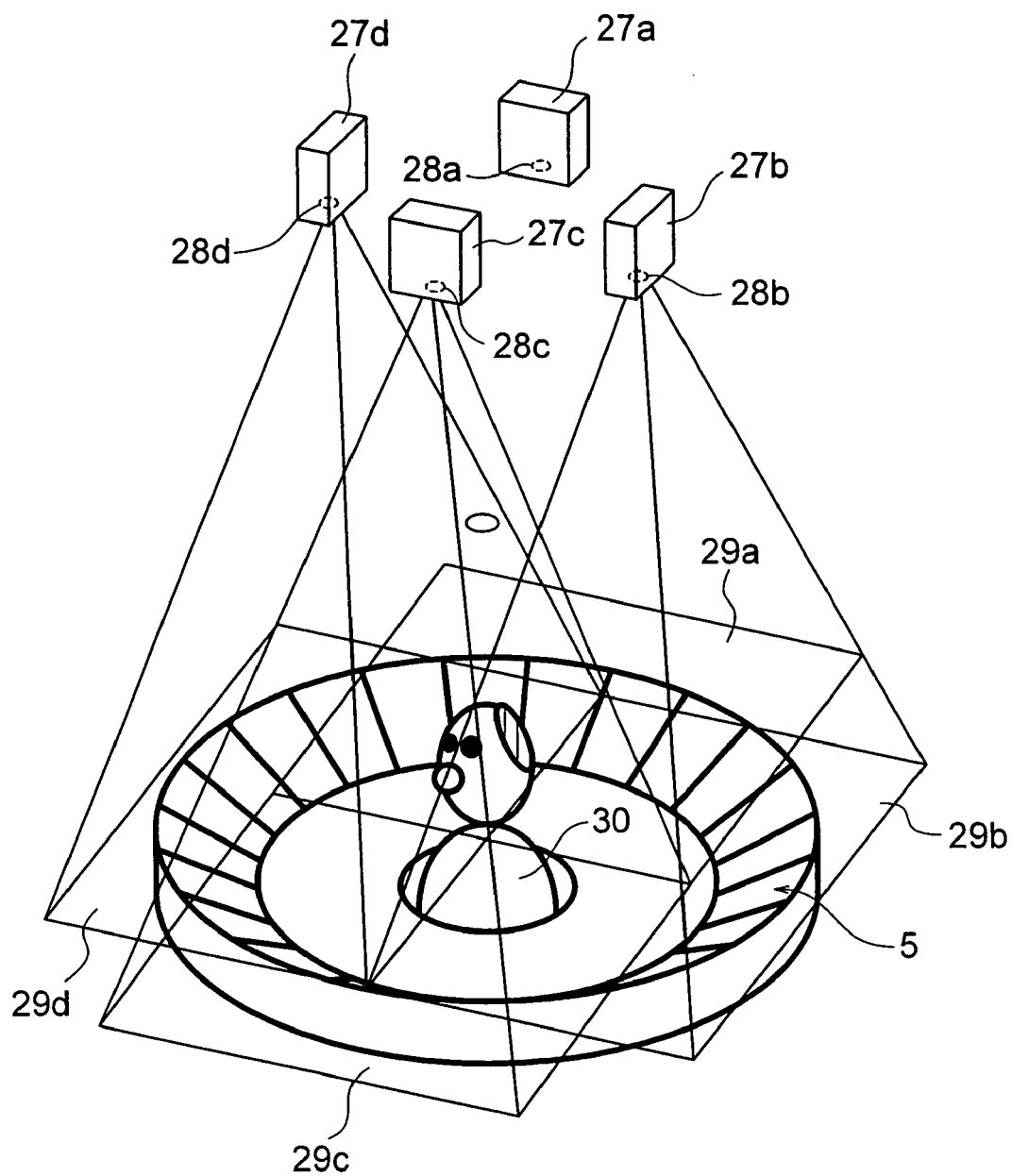
FIG. 24 is a configuration illustrating a further embodiment of a camera system in the display system according to the fifth embodiment.
Figure 25:
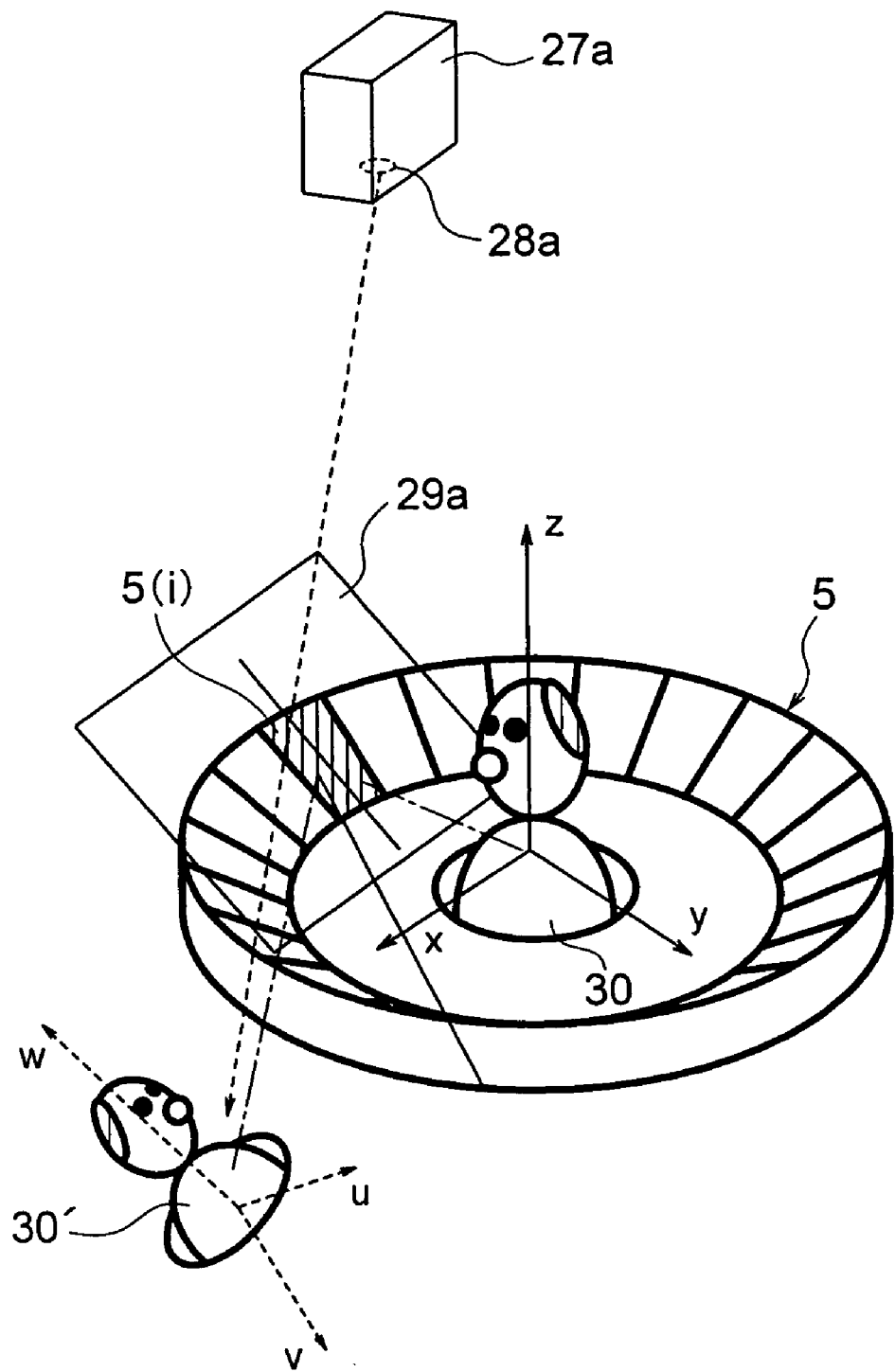
FIG. 25 is a conceptual view showing an image in the camera system in the display system according to the fifth embodiment.

Subsequently, a display system and a camera system, according to a fifth embodiment, and a displaying system using the same will be described with reference to FIGS. 19 to 32. FIGS. 19 to 32 show the display system according to the embodiment, FIGS. 24 to 25 show the camera system, and FIGS. 27 to 32 show the displaying system, in which a plurality of the display systems (including the camera system) are controlled by a network.

Figure 19:
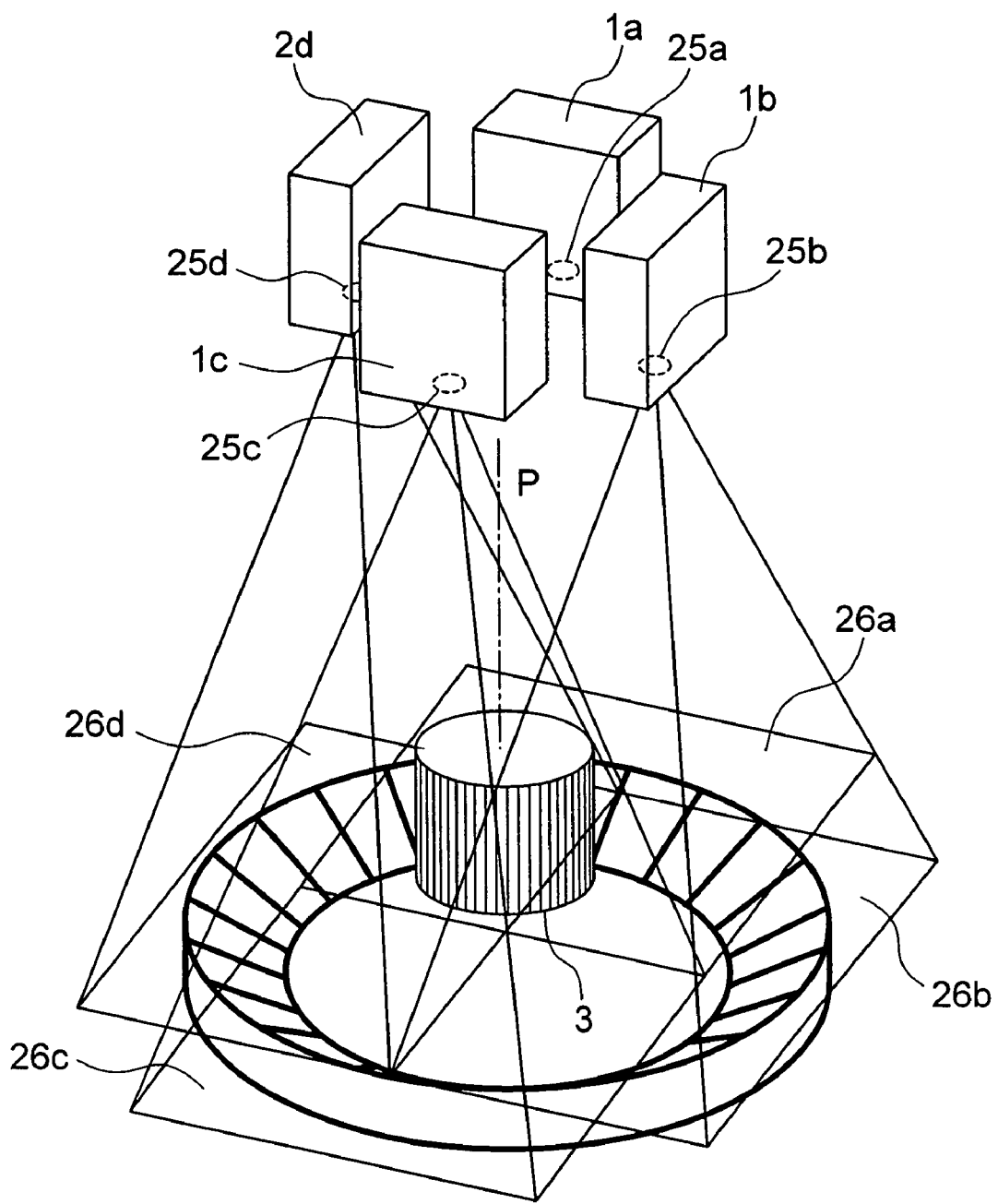
FIG. 19 is a view showing a construction of an essential part of a display system according to a fifth embodiment.
Figure 20:
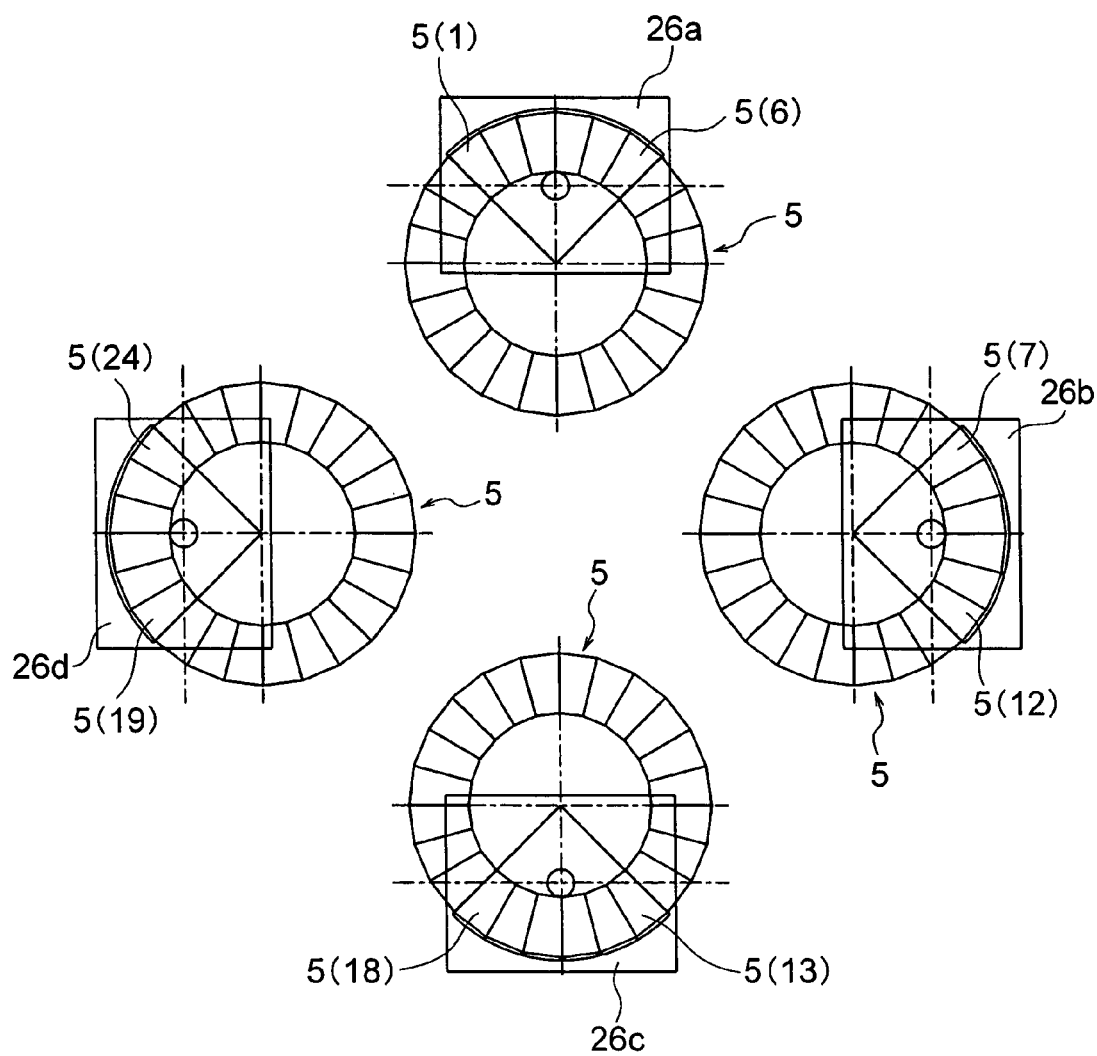
FIG. 20 is a plan view showing projection regions of electronic projectors in the display system according to the fifth embodiment.
Figure 21:
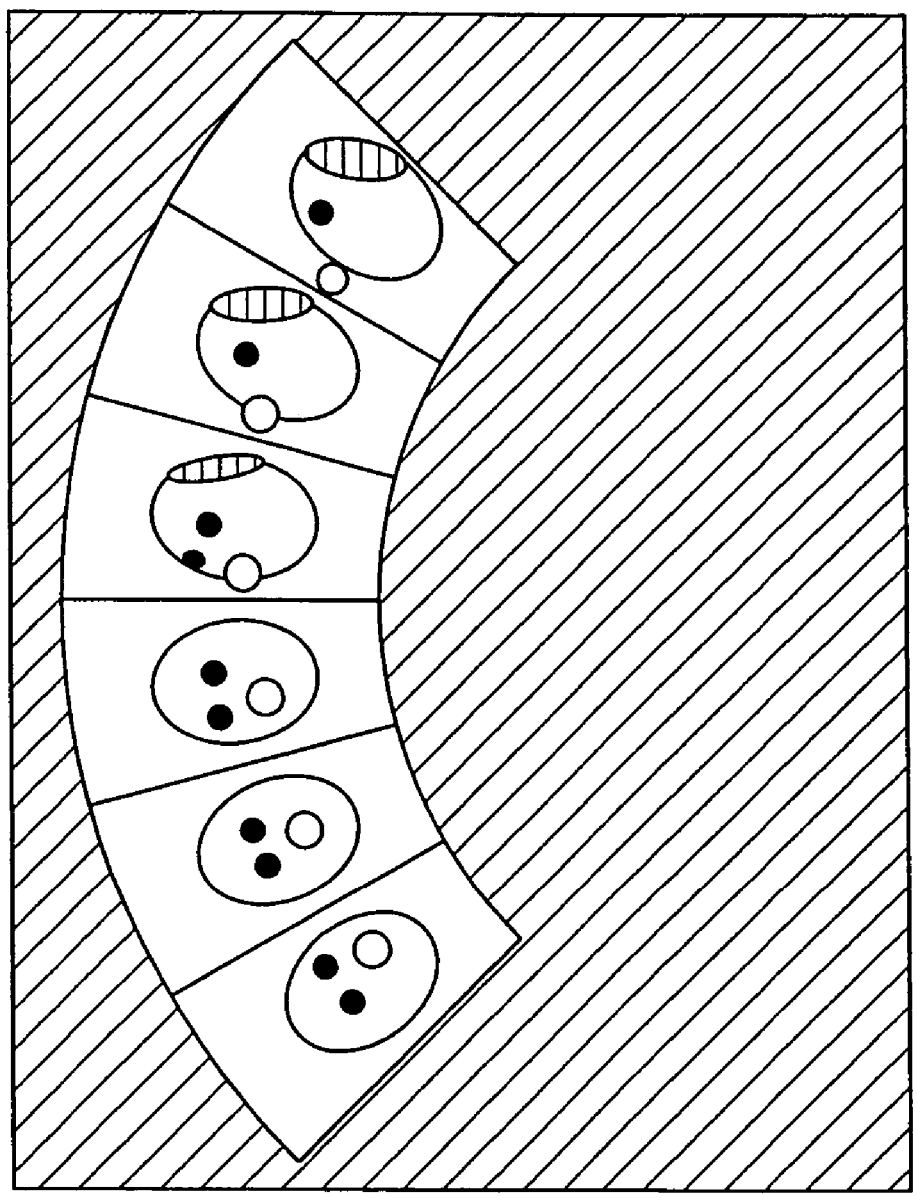
FIG. 21 is a schematic view showing projected images of the electronic projectors in the display system according to the fifth embodiment.
Figure 22:
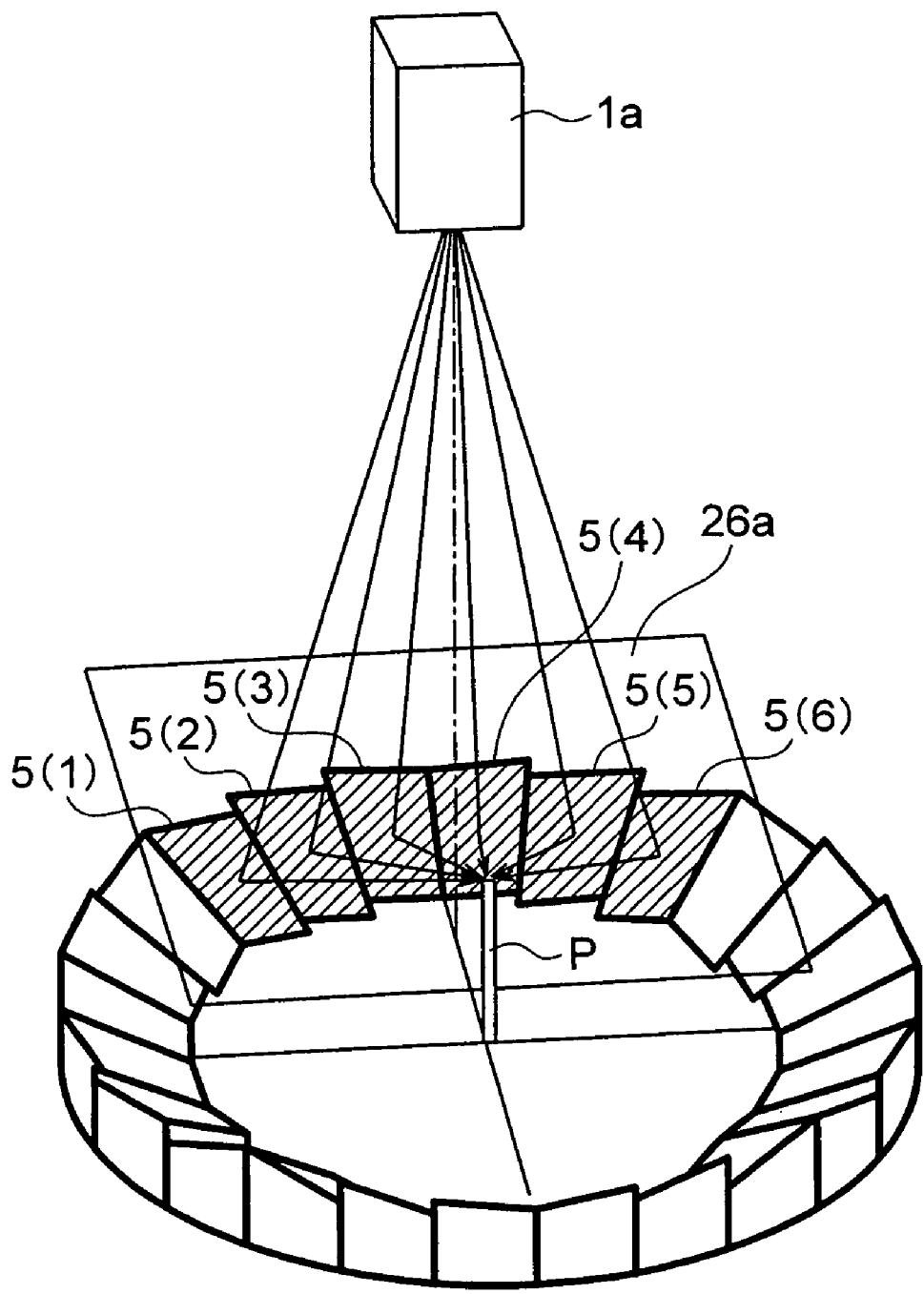
FIG. 22 is a configuration illustrating an arrangement of respective mirrors of polygonal mirrors in the display system according to the fifth embodiment.

First, the display system will be described with reference to FIGS. 19 to 26. FIG. 19 is a view showing a construction of an essential part of the display system according to the fifth embodiment. FIG. 20 is a plan view showing projection regions of respective electronic projectors. FIG. 21 is a schematic view showing projected images of the electronic projectors. FIG. 22 is a configuration illustrating an arrangement of respective mirrors of polygonal mirrors. FIG. 23 is a perspective view showing an outward appearance of the display system according to the fifth embodiment. FIG. 24 is a configuration illustrating a further embodiment of the camera system, which creates projected images. FIG. 25 is a conceptual view showing an image on the camera system. FIG. 26 is a view showing projected images photographed by the camera system.

In FIG. 19, the fifth embodiment uses a plurality of electronic projectors and here it is assumed that four electronic projectors 1a to 1d are used. The electronic projectors 1a to 1d are arranged above polygonal mirrors (mirror groups) 5, and furthermore, the electronic projectors 1a to 1d are arranged so that centers of projection optical systems 25a to 25d of the electronic projectors 1a to 1d are disposed on a circumference having the same radius, which centers on an extension of a central axis P of a stereoscopic screen 3, and space at equal intervals (intervals of 90 degrees as viewed from the central axis P).

The electronic projectors 1a to 1d, respectively, arranged in this manner make projection on the polygonal mirrors 5 part by part. A projection region 26a is one, onto which images outgoing from the electronic projector 1a are projected, and at least mirrors (the number of mirrors, which constitute the polygonal mirrors 5)÷(the number of electronic projectors) out of the polygonal mirrors 5 are completely and fully included in the projection region 26a. Here, assuming that the number of mirrors, which constitute the polygonal mirrors 5, is 24, the number of mirrors completely included in the projection region 26a is at least 6 since the number of electronic projectors is 4.

A projection region 26b is one, onto which images outgoing from the electronic projector 1b are projected, and 6 mirrors continuing to 6 mirrors completely included in the projection region 26a are completely and fully included in the projection region 26b. Likewise, a projection region 26c is one, onto which images outgoing from the electronic projector 1c are projected, and 6 mirrors continuing to 6 mirrors completely included in the projection region 26b are completely and fully included in the projection region 26c. A projection region 26d is one, onto which images outgoing from the electronic projector 1d are projected, and 6 mirrors between 6 mirrors and 6 mirrors, which are completely included in the projection regions 26c, 26a, respectively, are completely and fully included in the projection region 26d. In addition, this is also the same as in specific examples described later.

This will be described with reference to FIG. 20. Now, assuming that the polygonal mirrors 5 comprise 24 mirrors composed of a mirror 5(1) to a mirror 5(24), the mirror 5(1) to the mirror 5(6) are completely included in the projection region 26a, the mirror 5(7) to the mirror 5(12) are completely included in the projection region 26b, the mirror 5(13) to the mirror 5(18) are completely included in the projection region 26c, and the mirror 5(19) to the mirror 5(24) are completely included in the projection region 26d.

According to the fifth embodiment of the display system, since the polygonal mirrors 5 comprise the mirror 5(1) to the mirror 5(24), which are 24 in number, projected images including 24 image segments arranged in a ring-shaped manner as shown in FIG. 2 are used and the respective electronic projectors 1a to 1d share image segments six by six to project the same onto those mirrors, which are completely included in corresponding projection regions. FIG. 21 show projected images, which outgo from, for example, the electronic projector 1d, and the projected images include 6 image segments in an arrangement corresponding to an arrangement of the mirror 5(19) to the mirror 5(24) in the projection region 26d. Such 6 image segments are projected onto the mirror 5(19) to the mirror 5(24) and an opening 25d (FIG. 19) of the electronic projector 1d is set in position and orientation so that projection is made with centers of the image segments in agreement with centers of corresponding mirrors. This is the same as for the remaining electronic projectors 1a to 1c.

Image segments for those projected images, which outgo from the respective electronic projectors 1a to 1d, respectively, are reflected by corresponding mirrors of the polygonal mirrors 5 to be projected onto the stereoscopic screen 3. Here, in the case where a projection port of an electronic projector 1 is disposed on an extension of a central axis P of a stereoscopic screen 3 as in the preceding first to fourth embodiments of the display system, image segments are favorably projected onto the stereoscopic screen 3 by arranging surfaces of respective mirrors of polygonal mirrors 5 on the same conical surface, but in the case where projection ports 25a to 25d of the electronic projectors 1a to 1d are offset from an extension of a central axis P as in the fifth embodiment, image segments reflected by the respective mirrors of the polygonal mirrors 5 are projected onto offset positions on the stereoscopic screen 3 provided that surfaces of the respective mirrors of the polygonal mirrors 5 are arranged on the same conical surface. In the case where offset is generated in projected positions, projected images are positionally varied according to a position of viewing to lead to an unnatural display when a viewer sees projected images on the stereoscopic screen 3 while moving around the stereoscopic screen 3. For example, assuming that projected images as displayed are ones of a stationary body, the projected images look to move up and down and left and right in case of seeing the projected images while moving around the stereoscopic screen 3.

In order to eliminate such unnatural motions of projected images displayed on the stereoscopic screen 3, respective sets of 6 mirrors of the polygonal mirrors 5, onto which the electronic projectors 1a to 1d project image segments, are regulated in mirror orientation every set in the fifth embodiment.

That is, the respective mirrors are regulated so as to be put in appropriate positions angles on optical paths of optical systems, which are formed among an electronic projector 1, an auxiliary mirror 4, and the stereoscopic screen 3, when image segments projected from corresponding electronic projectors are reflected by mirror surfaces to be projected onto the stereoscopic screen 3.

That is, stated with respect to the electronic projector 1a with reference to FIG. 22, polygonal mirrors 5(1), 5(2), 5(3), 5(4), 5(5), 5(6) are set in inclination so that central light rays of respective image segments for projected images outgoing from the electronic projector 1a are reflected at centers of respective corresponding polygonal mirrors 5(1), 5(2), 5(3), 5(4), 5(5), 5(6) among the polygonal mirrors 5 and then condensed at the central axis P of the stereoscopic screen 3 and more specifically, condensed in a central position of the stereoscopic screen 3.

Here, when central positions of the polygonal mirrors 5(1) to 5(6), that is, a conical surface having an inclination of a boundary between the polygonal mirror 5(3) and the polygonal mirror 5(4) is assumed and a mirror is arranged in a position of the boundary of the conical surface, the conical surface is assumed to be inclined so that a central one of light outgoing from the electronic projector 1a is reflected at a center of the mirror to be irradiated on a center of the stereoscopic screen 3, so the polygonal mirrors 5(1) to 5(6) are inclined to the assumed conical surface. While specific numerical values are omitted since they can be found by means of calculation, the polygonal mirror 5(3) and the polygonal mirror 5(4) are inclined at equal angles relative to the assumed conical surface in mutually opposite directions with the boundary of the polygonal mirror 5(3) and the polygonal mirror 5(4) as a center, the polygonal mirror 5(2) and the polygonal mirror 5(5) are inclined at equal angles relative to the assumed conical surface in mutually opposite directions, and the polygonal mirror 5(1) and the polygonal mirror 5(6) are inclined at equal angles relative to the assumed conical surface in mutually opposite directions. In this case, inclinations of the polygonal mirrors 5(2), 5(5) are made larger than those of the polygonal mirrors 5(3), 5(4) and further inclinations of the polygonal mirrors 5(1), 5(6) are made larger than those of the polygonal mirrors 5(2), 5(5).

In this manner, by setting the polygonal mirrors 5(1) to 5(6) in an inclined state to the assumed conical surface, central light rays of respective image segments outgoing from the electronic projector 1a, respectively, are reflected at the central positions of the polygonal mirrors 5(1) to 5(6), and then condensed in the central position of the stereoscopic screen 3. Consequently, image segments reflected and projected by the respective mirrors of the mirrors 5 are displayed in correct positions on the stereoscopic screen 3, so that when seeing a stereoscopic image displayed on the stereoscopic screen 3 while going round the system as shown in FIG. 23, unnatural motions and fluctuation of the stereoscopic image do not appear and a favorable stereoscopic image can be seen.

According to the fifth embodiment of the display system, since the plurality (4 in this case) of electronic projectors 1a to 1d share a plurality of image segments representative of a stereoscopic image to display the same, the number of displayed image segments for the respective electronic projectors 1a to 1d is small as compared with the preceding first to fourth embodiments and respective image segments when outgoing from the electronic projectors 1a to 1d can be correspondingly enlarged, so that it is possible to project respective image segments as images of high resolution. Consequently, a stereoscopic image projected onto the stereoscopic screen 3 makes a highly fine picture image, which is high in resolution.

Subsequently, a photographing system, which creates projected images displayed by the display system according to the fifth embodiment, will be described with reference to FIGS. 24 to 26.

In FIG. 24, in creating projected images for the electronic projectors 1a to 1d illustrated in FIG. 19, the stereoscopic screen 3 is removed from a position of the central axis P (FIG. 22) in the display system shown in FIGS. 19 and 23 and a camera object 30 making an object of an projected image is mounted. That is, a position, in which the stereoscopic screen 3 has been mounted in FIGS. 19 and 23, makes a region, in which a camera object is mounted.

Also, together with this, the electronic projectors 1a to 1d (FIG. 19) are removed and camera devices 27a to 27d are mounted instead. The electronic projectors 27a, 27b, 27c, 27d, respectively, photograph camera regions 29a, 29b, 29c, 29d for the polygonal mirrors 5, a position of the camera device 27a and an inclination of an optical axis (accordingly, an orientation of the camera device 27a) of an optical system 28a are set so that the camera region 29a agrees with the projection region 26a of the electronic projector 1a in FIGS. 19 and 20 (in this case, while complete agreement is not necessary, a plurality of mirrors for photographing as image segments in the camera region 29a are fully disposed in the camera region 29a in terms of resolution described later. This is the same as for the remaining camera regions 29b to 29d and for a sixth embodiment of the display system described later), a position of the camera device 27b and an inclination of an optical axis (accordingly, an orientation of the camera device 27b) of an optical system 28b are likewise set so that the camera region 29b agrees with the projection region 26b of the electronic projector 1b in FIGS. 19 and 20, a position of the camera device 27c and an inclination of an optical axis (accordingly, an orientation of the camera device 27c) of an optical system 28c are likewise set so that the camera region 29c agrees with the projection region 26c of the electronic projector 1c in FIGS. 19 and 20, and a position of the camera device 27d and an inclination of an optical axis (accordingly, an orientation of the camera device 27d) of an optical system 28d are likewise set so that the camera region 29d agrees with the projection region 26d of the electronic projector 1d in FIGS. 19 and 20.

According to this, as shown in FIG. 26, for example, the camera device 27a photographs a virtual camera object 30', which is disposed in a position symmetric with respect to a camera object 30 about one mirror 5(i) of the polygonal mirrors 5 in the camera region 29a, for the mirror 5(i). A system of three-dimensional coordinates of u(length), v(breadth), w(height) for the virtual camera object 30' is turned relative to a system of three-dimensional coordinates of x(length), y(breadth), z(height) for the camera object 30 according to an inclination of a surface of the mirror 5(i) in the x, y, z coordinates. Thereby, the camera device 27a can see the same side of the virtual camera object 30' as that side of the camera object 30, which is seen through the mirror 5(i), in the same size, so that it is possible to photograph the side of the camera object 30, which can be seen through the mirror 5(i).

This is the same with remaining mirrors of the polygonal mirrors 5 in the camera region 29a, and the camera device 27a photographs sides of the camera object 30 seen from respective mirrors included in the camera region 29a at the same time. This is the same with the remaining camera devices 27b to 27d.

In this manner, the respective camera devices 27a to 27d photograph the camera object 30 (In this case, the camera devices 27a to 27d may make photographing at the same time, or may make photographing in separate timings), whereby images shown in FIG. 26(a) are obtained. That is, for the camera device 27a, there are obtained photographed images including side images of the camera object 30 reflected by all the mirrors of the polygonal mirrors 5, which are included in the camera region 29a (FIG. 24) of the camera device 27a.

Such photographed images are processed, and projected images, in which only necessary side images are extracted as image segments, are created as shown in FIG. 26(b). In this case, as shown in FIG. 20, projected images are created, in which side images from the mirrors 5(1) to 5(6) in the projection region 26a (equal to the camera region 29a) are extracted and made image segments. This is the same with camera images obtained from the remaining camera devices 27b to 27d, and projected images being projected from the respective electronic projectors 1a to 1d in FIG. 19 are created.

In addition, a method of removing images reflected by unnecessary mirrors from camera images of the camera devices 27a to 27d may comprise providing masks, which shield image light from such unnecessary mirrors, on the optical systems 28a to 28d of the camera devices 27a to 27d, or removing signal components caused by images from such unnecessary mirrors as by gating output image signals of the camera devices 27a to 27d, or the like.

Subsequently, a displaying system, in which a plurality of the display systems (including the camera systems) according to the fifth embodiment are controlled by a network, will be described with reference to FIGS. 27 to 32.

Figure 27:
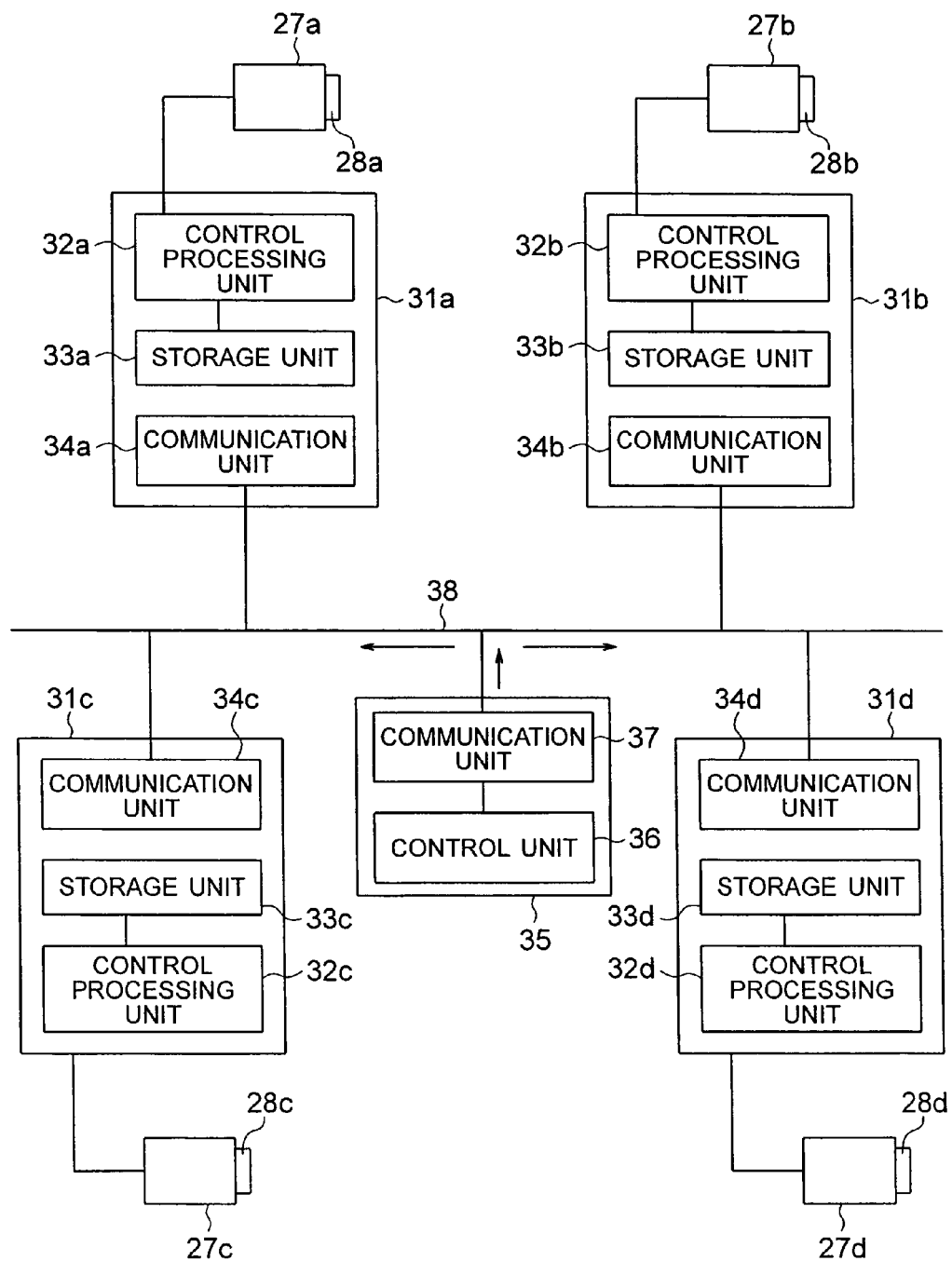
FIG. 27 is a block diagram for creation of projected images of a displaying system according to the fifth embodiment.
Figure 28:
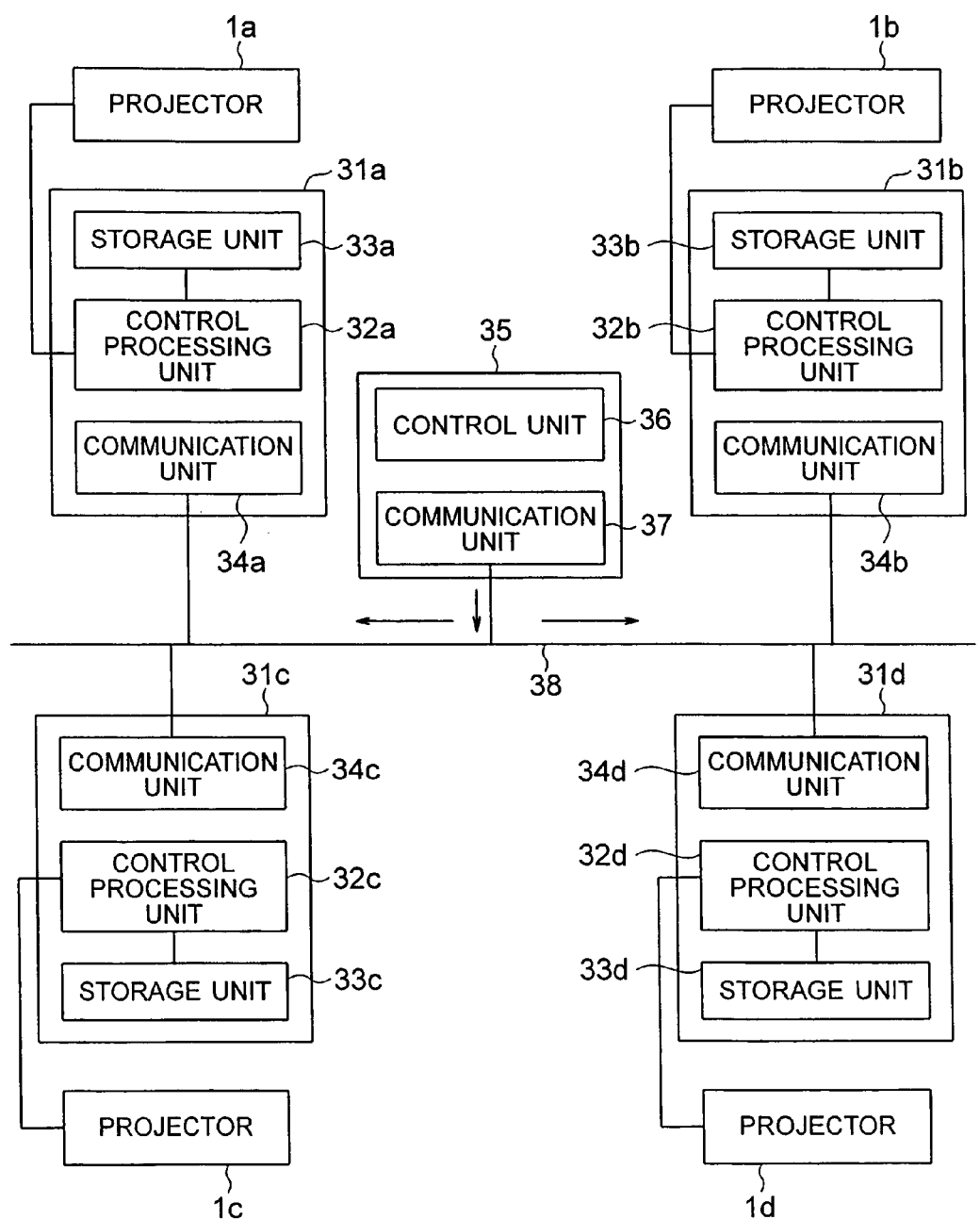
FIG. 28 is a block diagram for displaying in the displaying system according to the fifth embodiment.
Figure 29:
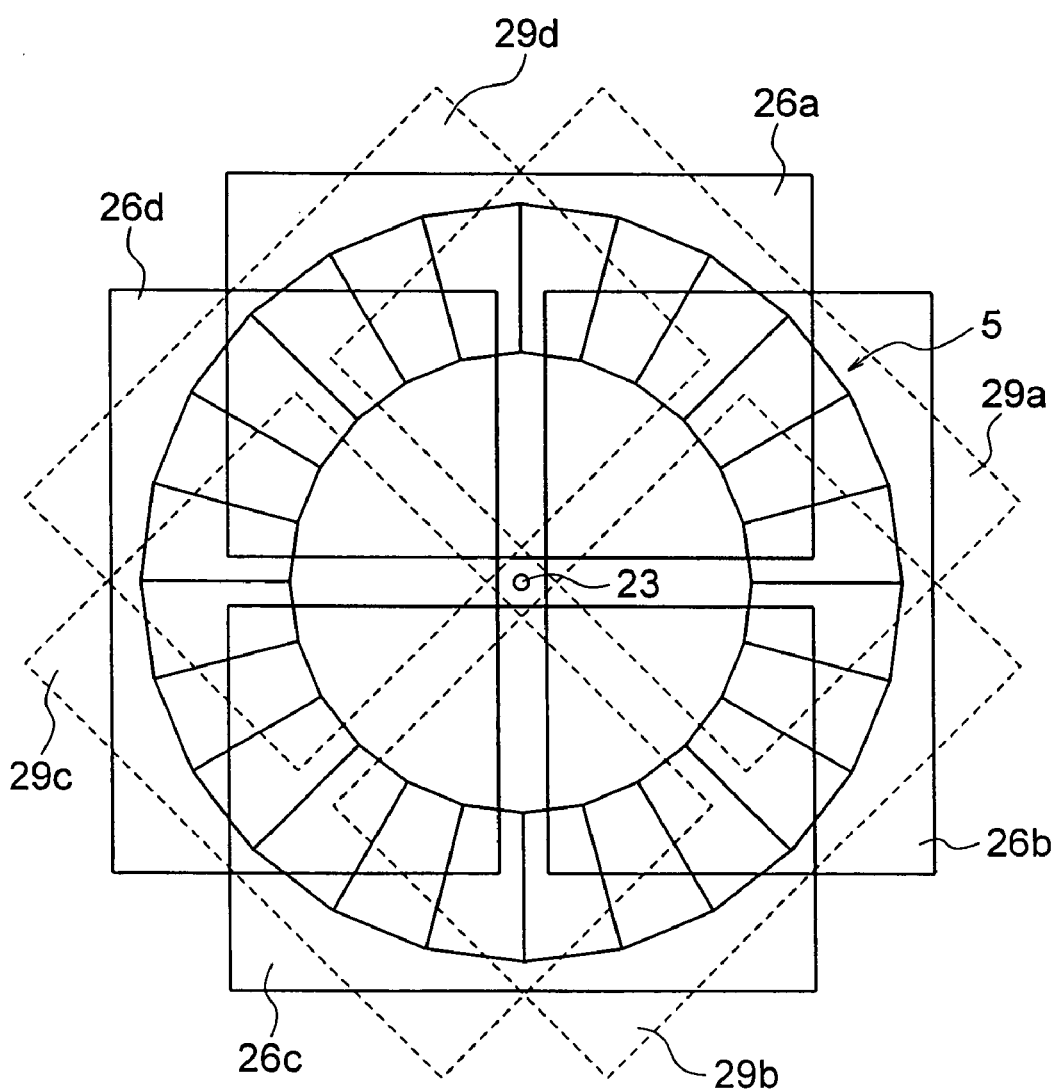
FIG. 29 is a view showing the relationship between camera regions of camera devices and projection regions of electronic projectors in the displaying system according to the fifth embodiment.
Figure 30:
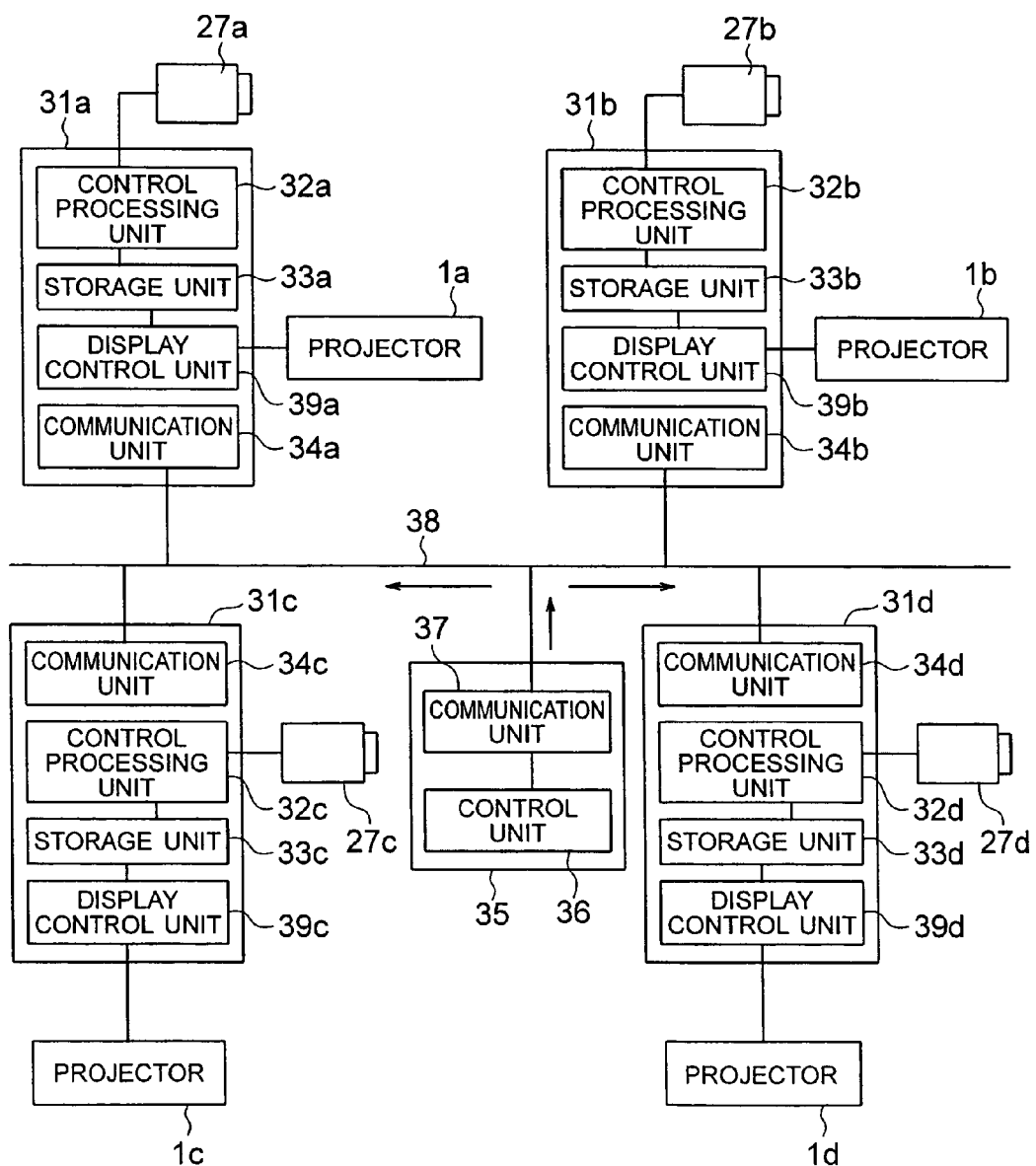
FIG. 30 is a block diagram of the displaying system in FIG. 29.
Figure 31:
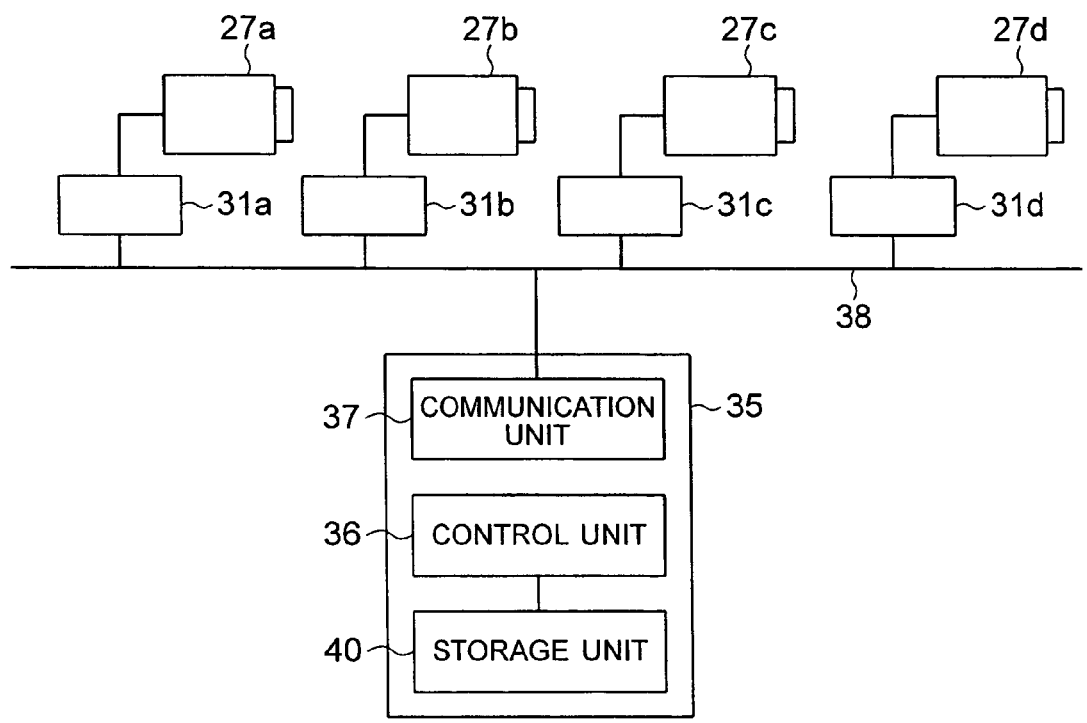
FIG. 31 is a block diagram showing a further specific example of the displaying system according to the fifth embodiment.

FIG. 27 is a block diagram, in which the displaying system according to the fifth embodiment create projected images. FIG. 28 is a block diagram, in which the displaying system according to the fifth embodiment displays. FIG. 29 is a view showing the relationship between camera regions of camera devices and projection regions of electronic projectors in the displaying system according to the fifth embodiment, which comprises camera devices and electronic projectors together. FIG. 30 is a block diagram of FIG. 29. FIG. 31 is a block diagram showing a further specific example of the displaying system according to the fifth embodiment. FIG. 32 is a view showing a projection region, in the case where electronic projectors as used are different in number, in the displaying system according to the fifth embodiment.

First, in FIG. 27, the displaying system is one, in which a plurality of display systems serving also as photographing devices are controlled through a network by a server. Respective clients 31a to 31d are connected via a communication path 38 to a communication unit 37 of a server 35 by communication units 34a to 34d thereof. Also, the respective clients 31a to 31d are provided with control processing units 32a to 32d and storage units 33a to 33d. Also, the server 35 is provided with a control unit 36, which generates various command signals according to an operation of an operation unit (not shown). Here, since projected images of the respective electronic projectors 1a to 1d (FIG. 19) are to be created, the camera devices 27a to 27d, respectively, are connected to the control processing units 32a to 32d of the clients 31a to 31d. The camera devices 27a to 27d, respectively, are arranged in a manner illustrated in FIG. 24.

Now, when a user of the display system uses operation means (not shown) to perform a command operation for creation of projected images in the server 35, the control unit 36 generates a command signal to transmit the same to the communication path 38 from the communication unit 37. The command signal is transmitted by the communication path 38 and received by the communication units 34a of the clients 31a to 31d. In the client 31a, the command signal received by the communication unit 34a causes the control processing unit 32a to have the camera device 27a beginning photographing. An image signal output from the camera device 27a by such photographing is processed in the control processing unit 32a and then stored in the storage unit 33a as an image signal of projected images, which are used in the electronic projector 1a (FIG. 19). In this case, the control processing unit 32a may perform a processing, of removing signal components caused by reflected images from unnecessary mirrors of the polygonal mirrors 5 (FIG. 24). Thereby, projected images, which are used in the electronic projector 1a (FIG. 19), are stored in the storage unit 33a.

In the clients 31b to 31d, projected images, which are used in the electronic projectors 1b to 1d (FIG. 19), are stored in the storage units 33b, 33c, 33d in the same manner as described above.

In addition, in displaying a stereoscopic image of a still picture, image data of 1 field or 1 frame period are sufficient as data of projected images stored in the storage units 33a to 33d, and in displaying a stereoscopic image of a camera object 30, which moves (FIG. 24), projected images in a predetermined necessary period of time are stored in the storage units 33a to 33d at need. From the above, a starting command from the server 35 by an operation of a user of the display system may cause the camera devices 27a to 27d to start photographing, when the user performs a command operation of photographing a still picture, output image signals of the camera devices 27a to 27d may be extracted 1 field or 1 frame period to be stored as data of projected images of the electronic projectors 1a to 1d in the storage units 33a to 33d, and when a command operation of photographing a dynamic picture is performed (issuance of a recording starting command and a recording termination command via the storage units 33a to 33d), camera image signals in a period of time conformed to the command may be stored as data of projected images in the storage units 33a to 33d.

Referring to FIG. 28, an explanation will be given to the case where after data of projected images are recorded in the storage units 33a to 33d of the respective clients 31a to 31d in this manner, such projected images are used to display a stereoscopic image.

In FIG. 28, the camera device 27a is removed and the electronic projector 1a is mounted in the client 31a, and likewise the camera devices 27b to 27d are removed and the electronic projectors 1b to 1d are mounted in the clients 31b to 31d. At this time, the electronic projectors 1a to 1d are arranged as illustrated in FIG. 19.

After being constructed in this manner, a user of the display system uses operation means (not shown) of the server 35 to perform a display command operation, the control unit 36 generates a display command signal to transmit the same to the communication path 38 from the communication unit 37.

The display command signal is received by the communication units 34a to 34d in the respective clients 31a to 31d and supplied to the control processing units 32a to 32d. Receiving the display command signal, the control processing units 32a to 32d start the electronic projectors 1a to 1d and take in data of projected images from the storage unit 33a to supply the same to the electronic projectors 1a to 1d. Thereby, the electronic projectors 1a to 1d project respective projected images with the result that a stereoscopic image is displayed by the stereoscopic screen 3 (FIG. 19).

Subsequently, an embodiment, in which a work of exchanging the camera devices 27a to 27d and the electronic projectors 1a to 1d is omitted, will be described with reference to FIGS. 29 and 30.

In the embodiment illustrated in FIGS. 27 and 28, the camera devices 27a to 27d and the electronic projectors 1a to 1d are exchanged in the same clients 31a to 31d to create projected images and project the projected images. However, as shown in FIG. 24, the camera devices 27a to 27d may be arranged in the relationship of arrangement obtained by turning that relationship of arrangement, in which the electronic projectors 1a to 1d shown in FIG. 19 are arranged, a predetermined angle about the central axis P.

More specifically, in FIG. 19, the work of exchanging the camera devices 27a to 27d and the electronic projectors 1a to 1d can be omitted by arranging the camera device 27a between the electronic projectors 1a, 1b, arranging the camera device 27b between the electronic projectors 1b, 1c, arranging the camera device 27c between the electronic projectors 1c, 1d, and arranging the camera device 27d between the electronic projectors 1d, 1a.

In this case, as shown in FIG. 29, the projection regions 26a to 26d (indicated by solid lines) of the electronic projectors 1a to 1d shown in FIG. 19 are turned an amount corresponding to an integral number of mirrors of the polygonal mirrors 5 about the central axis P to provide for positions (indicated by broken lines) of the camera regions 29a to 29d of the camera devices 27a to 27d shown in FIG. 24.

FIG. 30 shows a configuration of a displaying system free of the exchanging work shown in FIG. 29. In FIG. 30, the embodiment comprises camera devices and electronic projectors in the clients according to the embodiment shown in FIG. 28. In this case, a camera device 27a and an electronic projector 1a, which projects projected images created by the camera device, can be connected to the same client 31a, likewise, a camera device 27b and an electronic projector 1b, which projects projected images created by the camera device, can be connected to a client 31b, a camera device 27c and an electronic projector 1c, which projects projected images created by the camera device, can be connected to a client 31c, and a camera device 27d and an electronic projector 1d, which projects projected images created by the camera device, can be connected to a client 31d.

In the clients 31a to 31d, respectively, data of projected images obtained by photographing of the camera devices 27a to 27d and stored in the storage units 33a to 33d are read under the control of display control units 39a to 39d to be supplied to the electronic projectors 1a to 1d, so that respective projected images are projected.

In this case, while a stereoscopic image displayed by the stereoscopic screen 3 is one turned the predetermined angle about the central axis P relative to an original camera object photographed by the camera devices 27a to 27d, this does not concern a viewer. In addition, it goes without saying that the server 35 issues a command to have the camera devices 27a to 27d photographing a camera object and a command to have the electronic projectors 1a to 1d projecting projected images.

Also, FIG. 31 shows an embodiment, in which a storage unit 40 of a server 35 control data of projected images collectively. While the storage units 33a to 33d are provided every the clients 31a to 31d in the systems shown in FIGS. 27, 28, and 30, the common storage unit 40 may be provided in the server 35 as shown in FIG. 31 to store data of projected images created by the clients 31a to 31d together.

In displaying a stereoscopic image, it suffices that corresponding data of projected images read from the storage unit 40 be supplied to respective electronic projectors (not shown). In addition, while camera devices 27a to 27d and the electronic projectors are exchanged in the respective clients 31a to 31d in FIG. 31, camera devices and electronic projectors may be connected together as shown in FIG. 30.

Also, FIG. 32 shows an embodiment, in which electronic projectors are small in number. In the preceding descriptions, the electronic projectors as used are four in number, this is not limitative such that the number of electronic projectors as used is not limited to four provided that respective electronic projectors project equal, integral numbers of image segments and the electronic projectors project image segments onto those mirrors, which constitute polygonal mirrors, without overage and shortage (that is, the number m of electronic projectors, in which m÷n is an integral number, where m indicates the number of those mirrors, which constitute polygonal mirrors, and n indicates the number of electronic projectors as used).

Figure 32A:
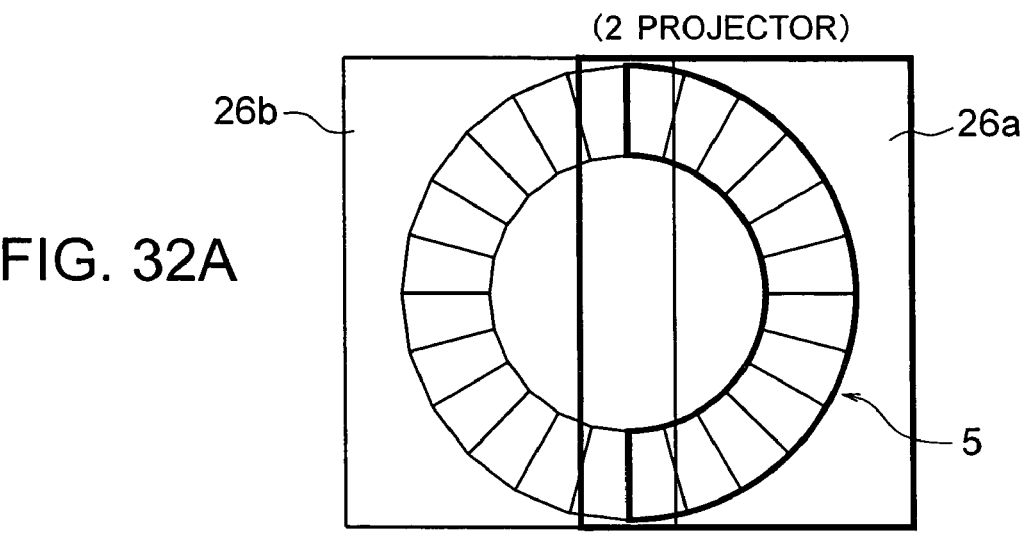
FIG. 32 is a view showing a projection region, in the case where electronic projectors as used are different in number, in the displaying system according to the fifth embodiment.
Figure 32B:
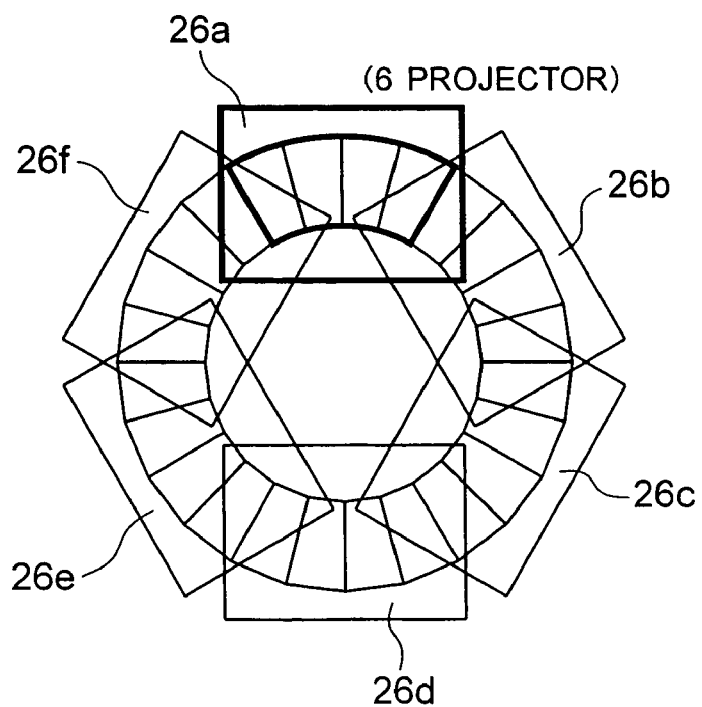

FIG. 32(a) shows the case where two electronic projectors are used, in which case projection regions 26a, 26b are set for the respective electronic projectors and the respective electronic projectors share projection of image segments half by half (here, it is assumed that the polygonal mirrors 5 comprise 24 mirrors, and so 12 by 12) of mirrors forming the polygonal mirrors 5. Also, FIG. 32(b) shows the case where six electronic projectors are used, in which case projection regions 26a, 26b, 26c, 26d, 26e, 26f are set for the respective electronic projectors and the respective electronic projectors share projection of image segments ⅙ by ⅙ (here, it is assumed that the polygonal mirrors 5 comprise 24 mirrors, and so 4 by 4) of the number of mirrors forming the polygonal mirrors 5.

In addition, while the display system according to the fifth embodiment uses the polygonal mirrors 5 for creation of projected images by the camera devices 27a to 27d and for projection of projected images by the electronic projectors 1a to 1d, camera devices for creation of projected images used for the respective electronic projectors may be provided separately and the created projected images may be transmitted to the respective electronic projectors.

Sixth Embodiment

Subsequently, a display system according to a sixth embodiment will be described with reference to FIGS. 33 to 35. FIG. 33 is a view showing a process of creating projected images in the display system according to the sixth embodiment. FIG. 34 is a view showing a process of creating projected images in the display system according to the sixth embodiment. FIG. 35 is a view illustrating a concept of a method of creating projected image in the display system according to the sixth embodiment.

While according to the fifth embodiment of the display system described above the camera devices, as used, for creation of projected images and the electronic projectors as used are made the same in number, the both as used are made different in number from each other in the display system according to the sixth embodiment. That is, a configuration, in which the electronic projectors in the sixth embodiment of the display system are used to display a stereoscopic image, is fundamentally the same as that shown in FIG. 19, and the camera devices for creation of projected images used for the electronic projectors are fundamentally the same in configuration as that shown in FIG. 24 but the camera devices and the electronic projectors, respectively as used are made different from each other as described above.

In FIG. 33, the embodiment uses six camera devices as the camera devices and four electronic projectors as the display systems. FIG. 33(a) show camera regions of the respective camera devices for polygonal mirrors 5 in case of being constructed as camera devices, and here the number of mirrors, which constitute the polygonal mirrors 5, is 24. Here, the polygonal mirrors may be the polygonal mirrors 5 used for displaying of a stereoscopic image as shown in FIG. 19. In this case, the camera devices and the electronic projectors are exchanged and used. Alternatively, they may be provided on camera devices exclusively used for creation of projected images.

In addition, camera regions by the camera devices are assumed to be camera regions 29a, 29b, 29c, 29d, 29e, 29f in this order. Camera devices for the camera regions 29a, 29b, . . . 29f are assumed to be camera devices 27a, 27b, . . . , 29f. Also, four electronic projectors used when being constructed as the display systems are assumed to be electronic projectors 1a, 1b, 1c, 1d.

Figure 33A:
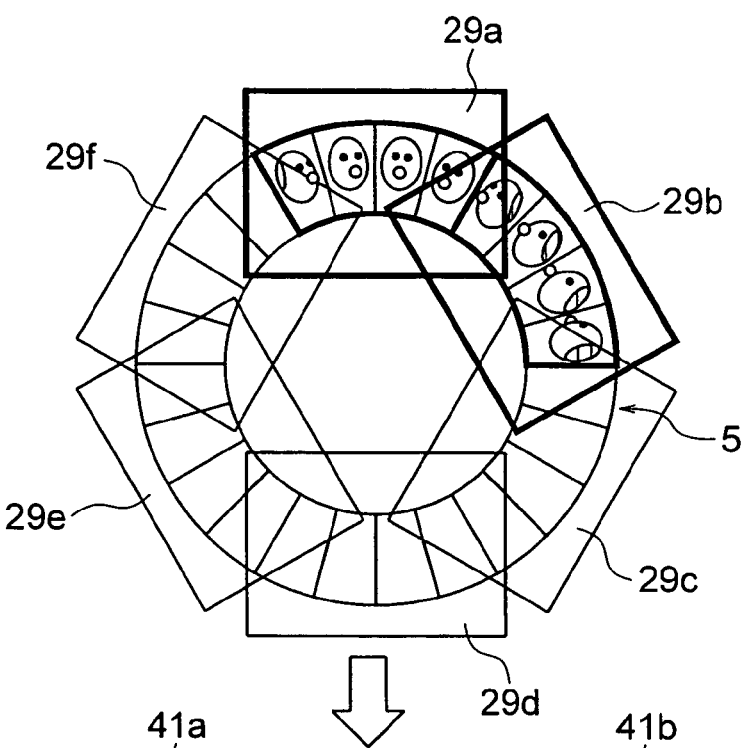
FIG. 33 is a view showing a process of creating projected images in a display system according to a sixth embodiment.

As shown in FIG. 33(a), a camera region 29a of a camera device 27a is set in a region completely including four mirrors of the polygonal mirrors 5 in the same manner as in the fifth embodiment, and a camera region 29b of a succeeding camera device 27b is set in a region completely including four succeeding mirrors. Likewise, camera regions 29c, 29d, 29e, 29f, respectively, are set in sequential regions completely including four mirrors by four mirrors. In this case, four mirrors are preferably included in the respective camera regions 29a to 29f as fully as possible.

Figure 33B:
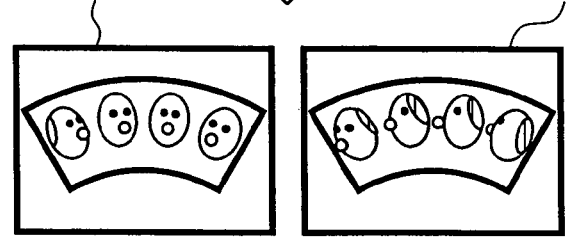

Thereby, as shown in FIG. 33(b), a camera image 41a including four complete image segments is obtained from the camera device 27a, and a camera image 41b including succeeding four complete image segments is obtained from the camera device 27b. Likewise, camera images including four by four complete image segments are obtained from the camera devices 27c, 27d, 27e, 27f while not shown. Of course, these image segments are images when a camera object (not shown) is seen from separate directions.

Figure 33C:
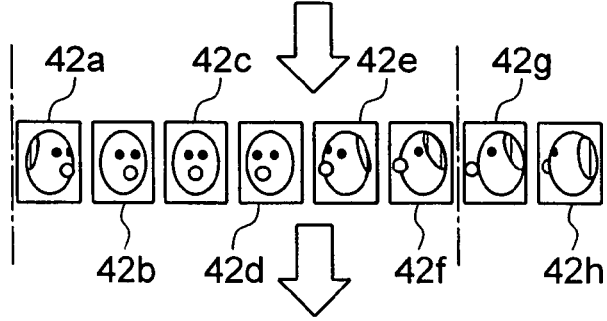
Figure 33D:
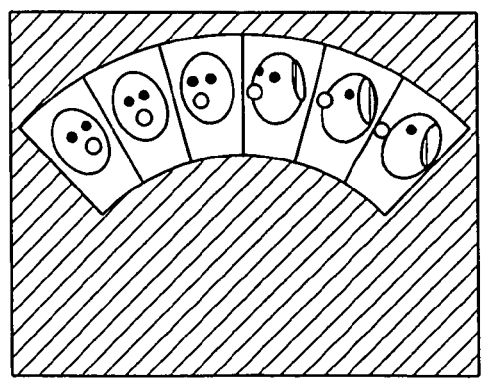

As shown in FIG. 33(c), image segments are extracted from the camera images 41a, 41b obtained in this manner. Six image segments 42a, 42b, 42c, 42d, 42f in this order are selected out of such image segments 42a, 42b, 42c, 42d, 42f, 43g, 42h, 42i and images, in which the selected image segments are arranged in an arcuate manner as shown in FIG. 33(d), are created. These make projected images used for one of the electronic projectors, that is, the electronic projector 1a.

Also, four image segments are extracted from those camera images, which the camera device 27c photographs the camera region 29c to provide, and images, in which the four image segments are arranged in an arcuate manner together with the remaining image segments 42g, 42h (FIG. 33(c)) of those image segments, which are extracted from the projected image 41b by the camera device 27b, are created. These make projected images used for the electronic projector 1b. In this manner, projected images used for the two electronic projectors 1a, 1b are obtained from those camera images, which are obtained from the three camera devices 27a to 27c. Likewise, projected images used for the electronic projector 1c are created from four image segments obtained by photographing of the camera region 29d and two image segments obtained by photographing of the camera region 29e, and projected images used for the electronic projector 1d are created from the remaining two of image segments obtained by photographing of the camera region 29e and four image segments obtained by photographing of the camera region 29f.

In this manner, six camera devices are used to create projected images used for four electronic projectors, so that image segments for camera images by the respective camera devices can be photographed large as compared with the case where camera devices, the number of which is equal to that of electronic projectors, are used, with the result that image segments are heightened in resolution. Accordingly, in the case where six camera devices are used, highly fine stereoscopic image, which is high in resolution, is obtained as compared with the case where camera devices, the number of which is equal to that of electronic projectors, are used, and also, assuming that a stereoscopic image being the same in resolution as that in the case where camera devices, the number of which is equal to that of electronic projectors, are used, is to be obtained, the resolution of respective camera devices can be made lower than that in the case where camera devices, the number of which is equal to that of electronic projectors, are used, and so it is possible to use camera devices, which are low in resolution and inexpensive. This is not limited to the case where the number of camera devices as used and the number of electronic projectors as used are as the above example but applies to the case where the number of camera devices as used is larger than the number of electronic projectors as used.

Subsequently, FIG. 34 shows an embodiment, in which one camera device is used in case of being constituted as a camera system and four electronic projectors are used in case of being constituted as a display system.

Figure 34A:
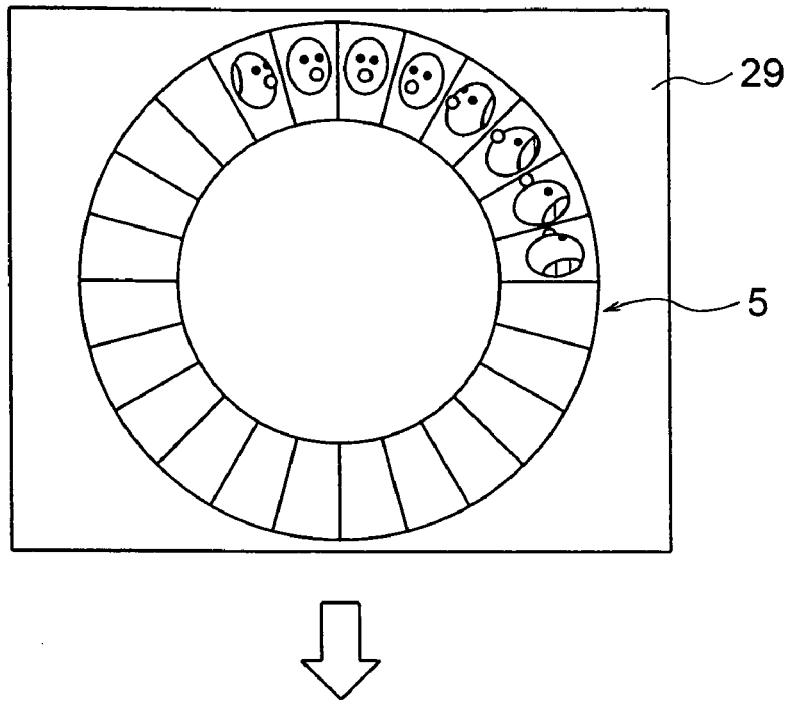
FIG. 34 is a view showing a process of creating projected images in the display system according to the sixth embodiment.

FIG. 34(a) shows a camera region of a camera device for polygonal mirrors 5 and the number of mirrors, which constitute the polygonal mirrors 5, is 24. Also, in this case, the polygonal mirrors 5 may comprise polygonal mirrors 5 used when a stereoscopic image is displayed as shown in FIG. 19. In this case, camera devices and electronic projectors may be exchanged and used. Alternatively, an arrangement at a center of four electronic projectors as arranged will do (on the central axis P in FIG. 19). Also, provision on camera devices exclusively used for creation of projected images will do. In addition, it is assumed that a camera region of the camera device is a camera region 29. It is assumed that a camera device for the camera region 29 is a camera device 27 and four electronic projectors as used are electronic projectors 1a, 1b, 1c, 1d.

As shown in FIG. 34(a), the camera region 29 of the camera device 27 includes a whole of the polygonal mirrors 5 completely. In this case, the whole is preferably included in the camera region 29 fully. Accordingly, camera images obtained by the camera device 27 make those, in which all image segments are arranged in a ring-shaped manner.

Figure 34B:
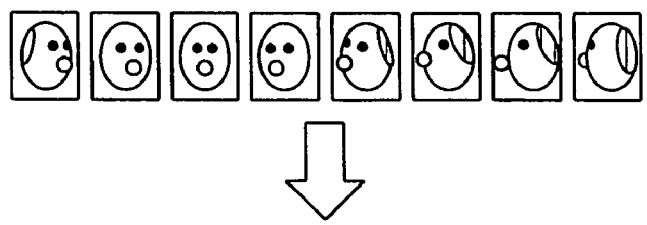
Figure 34C:
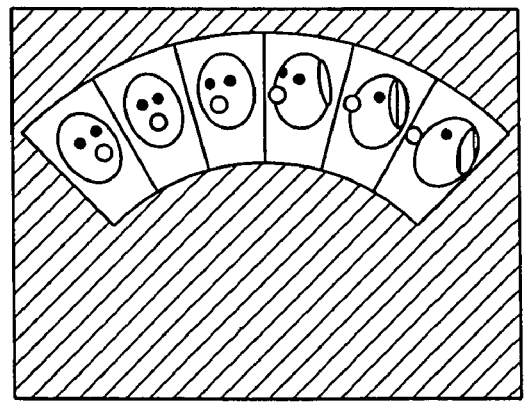

Respective image segments are extracted from camera images obtained in this manner (FIG. 34(b)), and sorted in order of this arrangement corresponding to the number of electronic projectors as used (that is, sorted by 24÷4=6 image segments), and projected images, in which 6 image segments are arranged in an arcuate manner, are created every section according to an arrangement of mirrors in the polygonal mirrors 5 as shown in FIG. 34(c). In this manner, projected images used for the respective electronic projectors 1a to 1d are created.

In this manner, in the case where one camera device 29 is used, image segments in projected images become small, so that image segments are lowered in resolution as compared with the case where a plurality of camera devices are used as in a specific example shown in FIG. 33, but image segments being fair in resolution are obtained in the case where the camera device 29 is high in resolution, so that a highly fine stereoscopic image is obtained. This can be also said in the case where two or more camera devices are used, and the number of camera devices as used can be made less than the number of electronic projectors as used in the case where camera devices being high in resolution are used.

Figure 35A:
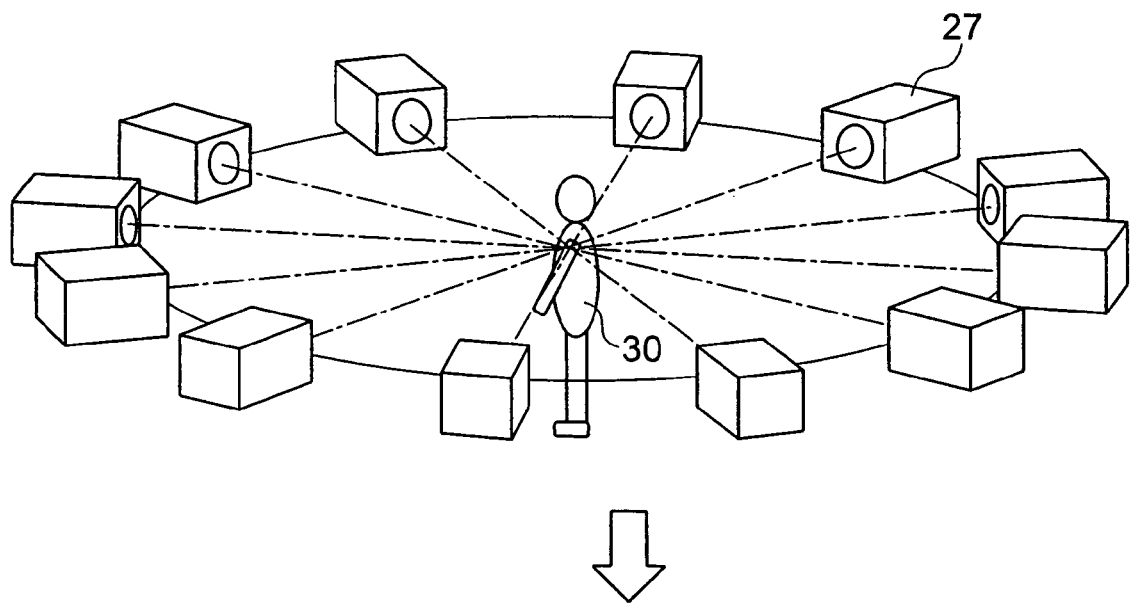
FIG. 35 is a view illustrating a concept of a method of creating projected image in the display system according to the sixth embodiment.
Figure 35B:
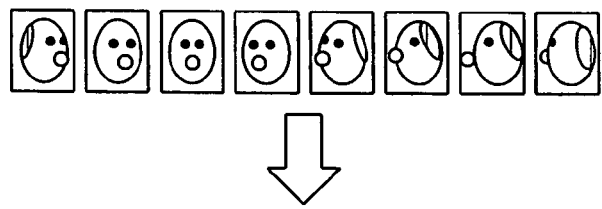

FIG. 35 is a conceptual view showing a further embodiment for creation of projected images. In this specific example, as shown in FIG. 35(a), a plurality of camera devices 27 are arranged around a camera object 30 and respectively photograph sides of the camera object 30 in mutually different directions. Here, the number of camera devices 27 as used is equal to the number of image segments when a stereoscopic image is displayed by electronic projectors, that is, the number of mirrors, which constitute the polygonal mirrors 5.

Accordingly, assuming that the number of mirrors, which constitute the polygonal mirrors, is, for example, 24, camera devices 27 being 24 in number are used and arranged at equal intervals around the camera object 30 so that respective camera directions are directed toward the same point on the camera object 30. The camera devices 27, respectively, correspond to each one of mirrors, which constitute the polygonal mirrors, and directly and simultaneously photograph the same side of the camera object 30 in mutually different directions. In this manner, a camera image making a image segment irradiated on the corresponding mirror of the polygonal mirrors is obtained from each of the camera devices 27.

Image segments used in stereoscopic display are extracted from camera images from the respective camera devices 27 as shown in FIG. 25(b), an arrangement of image segments as shown in FIG. 34(a) is assumed corresponding to an order, in which the camera devices 27 are arranged when the camera object 30 is photographed, and image segments are distributed every electronic projector, which is used in stereoscopic display, in this order of arrangement. For example, assuming that the polygonal mirrors comprise 24 mirrors, the camera devices 27 are 24 in number (Accordingly, 24 image segments are obtained), and the number of electronic projectors as used is four, 24 image segments as obtained are sorted six by six and the sorted groups of six image segments, respectively, are in turn allotted to the electronic projectors.

Figure 35C:
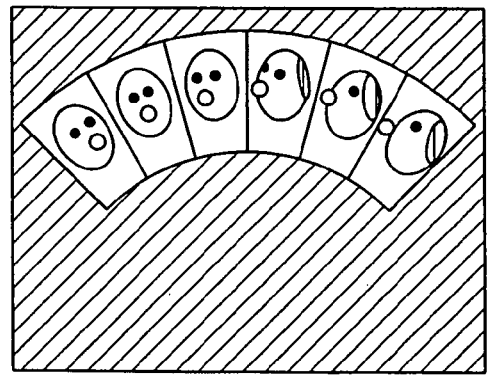

Six image segments allotted in this manner are arranged in an arcuate manner as shown in FIG. 35(c) to correspond an arrangement of mirrors in the polygonal mirrors, and projected images of the electronic projectors, which comprise such arrangement of image segments, are created.

In this manner, in this specific example, the camera devices 27 directly photograph the camera object 30 without the use of polygonal mirrors, so that it is possible to meet a large camera object 30, which is high in freedom, and to obtain image segments being high in resolution to obtain a stereoscopic image being high in resolution.

In this manner, the display system according to the sixth embodiment enables obtaining a stereoscopic image being further high in resolution as compared with the display system according to the fifth embodiment illustrated in FIGS. 19 to 32, and reducing the number of camera devices as used.

Seventh Embodiment

By the way, while projected images outgoing from electronic projectors can be created from camera images obtained from camera devices of a camera system according to the fifth and sixth embodiments, they can be created by means of computer graphics, etc. FIG. 36 is a flowchart illustrating processes of creating projected images according to a resource (supply source) of projected images.

In FIG. 36, when a request for outputting an image is received from a user of a display device (STEP 100), it is determined whether a resource of the image is a camera (camera device) (STEP 101). Now, assuming that a camera image of a camera is used, the camera is connected (started) (STEP 102) and a camera image is acquired from the camera (STEP 103). The number of mirrors, which are in charge (that is, photographing for image segments), in polygonal mirrors is found every camera (STEP 104) and image segments from such number of mirrors are gotten out (STEP 105). Also, the number of mirrors, which are in charge, in polygonal mirrors is found every electronic projector (STEP) and projected images, in which corresponding image segments are arranged, are created every mirror in charge taking into consideration a position and an arrangement of the mirror (STEP 109). The created projected images, respectively, are supplied to the corresponding electronic projectors to outgo therefrom (STEP 110). Thereby, a stereoscopic image is formed and displayed on the stereoscopic screen.

Also, in the case where a resource is computer graphics, etc. other than a camera (STEP 101), a resource of an image is selected-set (STEP 106) and images, that is, image segments are taken from the resource (STEP 107). By performing the processings of STEP 108 and STEP 109 on the image segments as taken, projected images are created every electronic projector and projected, thereby displaying a stereoscopic image, for example, animation, or the like (STEP 110).

Eighth Embodiment

Figure 37:
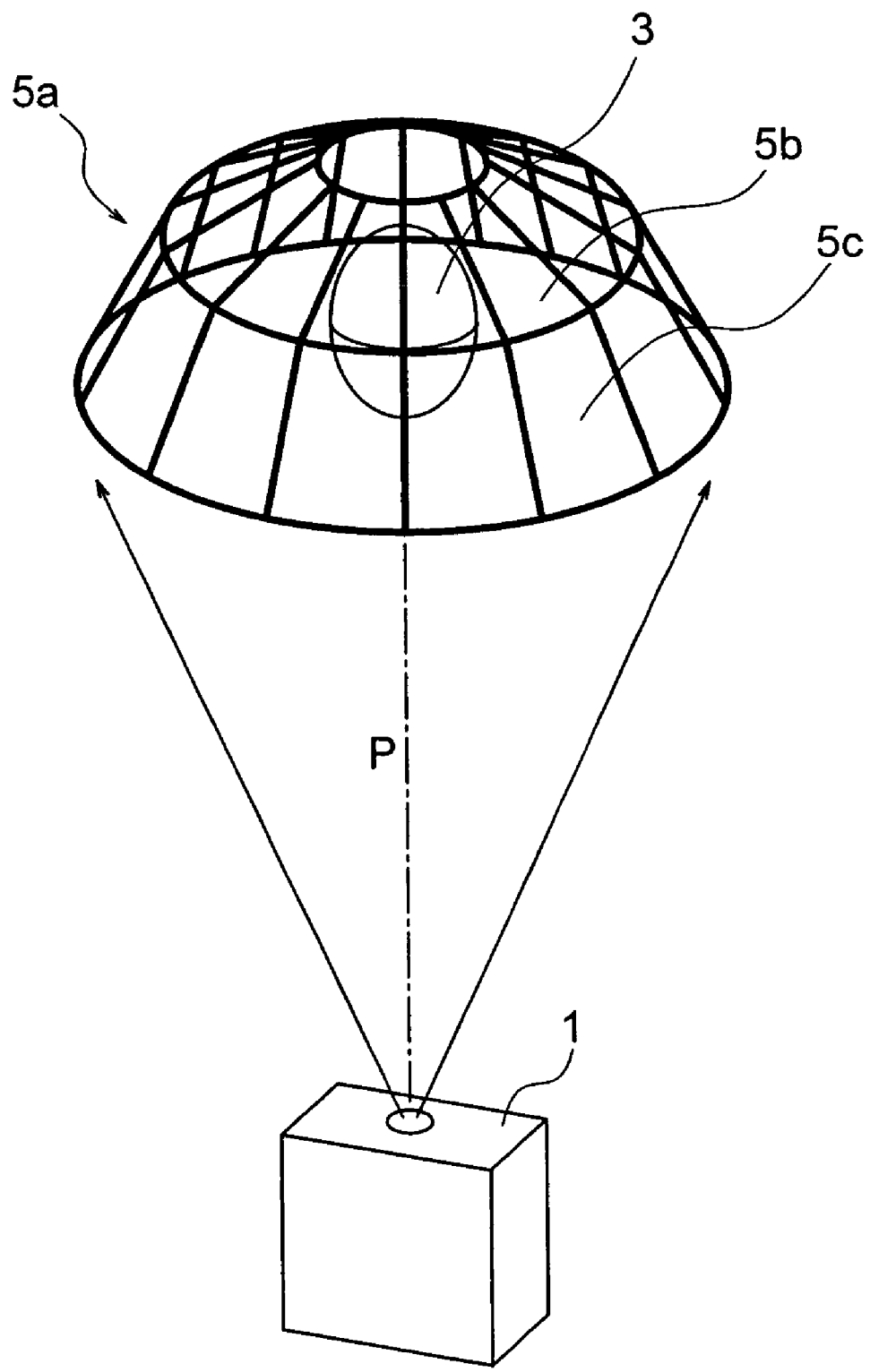
FIG. 37 is a perspective view showing an outline construction of a display system according to an eighth embodiment.
Figure 38:
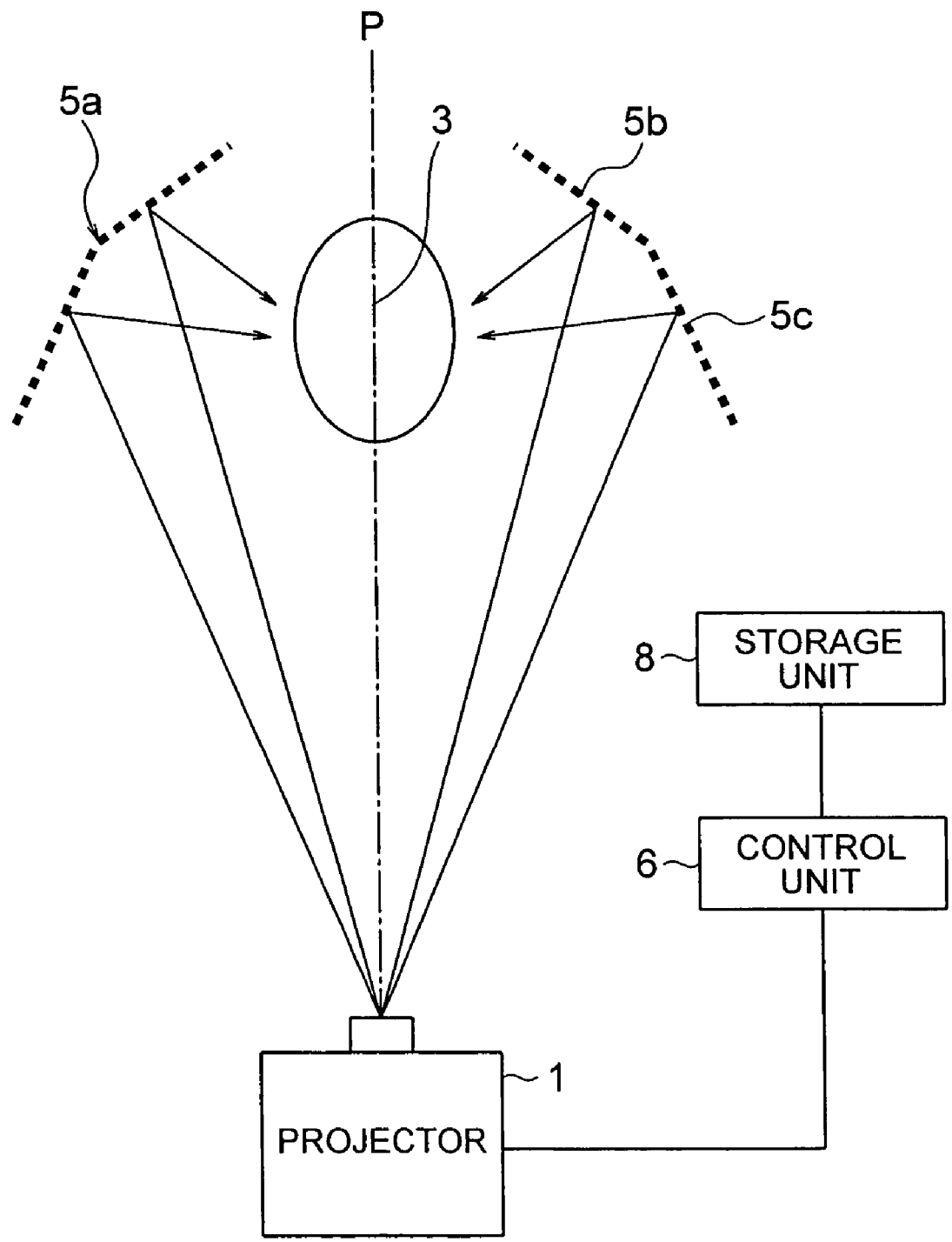
FIG. 38 is a view showing a system configuration of the display system according to the eighth embodiment.
Figure 39:
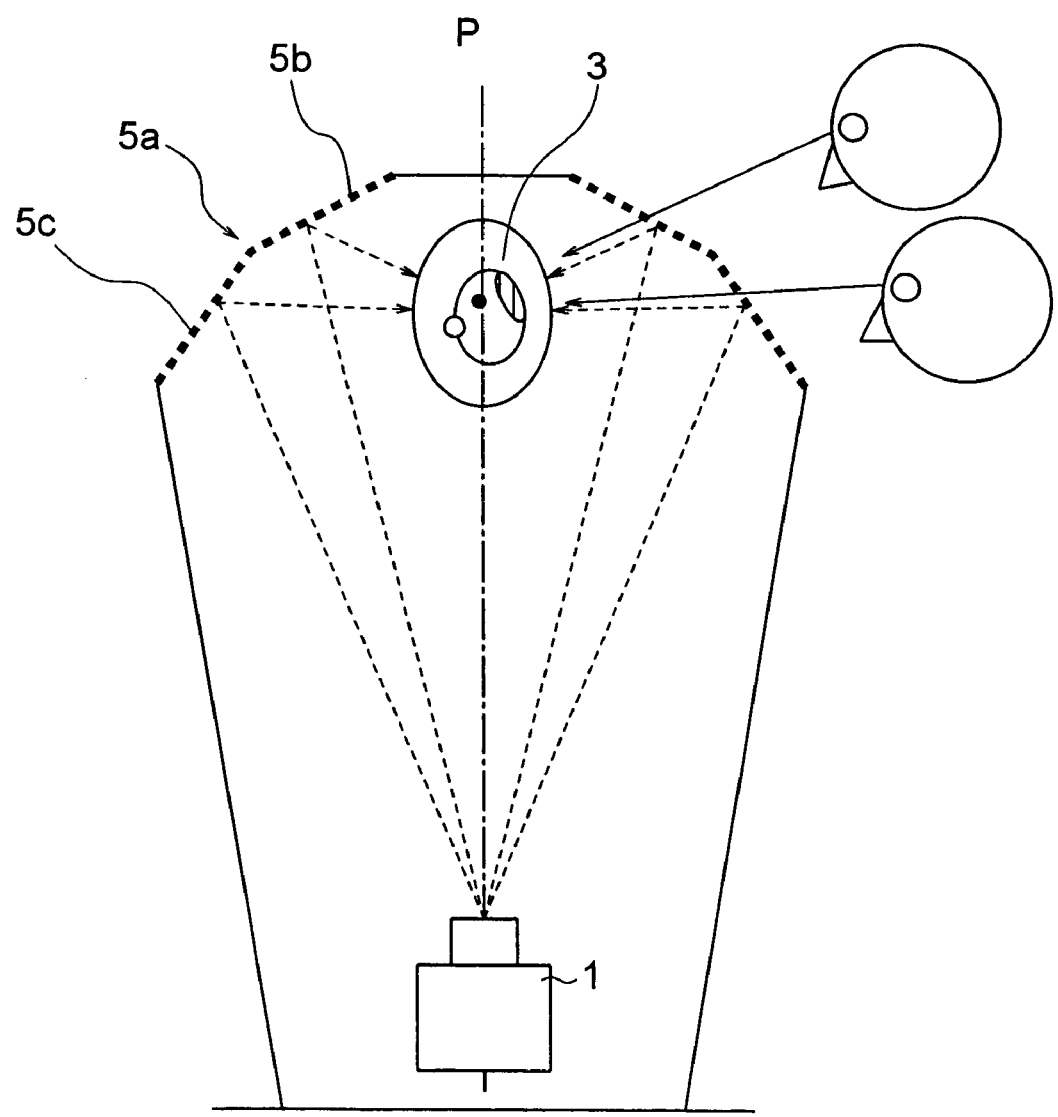
FIG. 39 is a schematic, cross sectional view showing a state, in which the display system according to the eighth embodiment is used.
Figure 40:
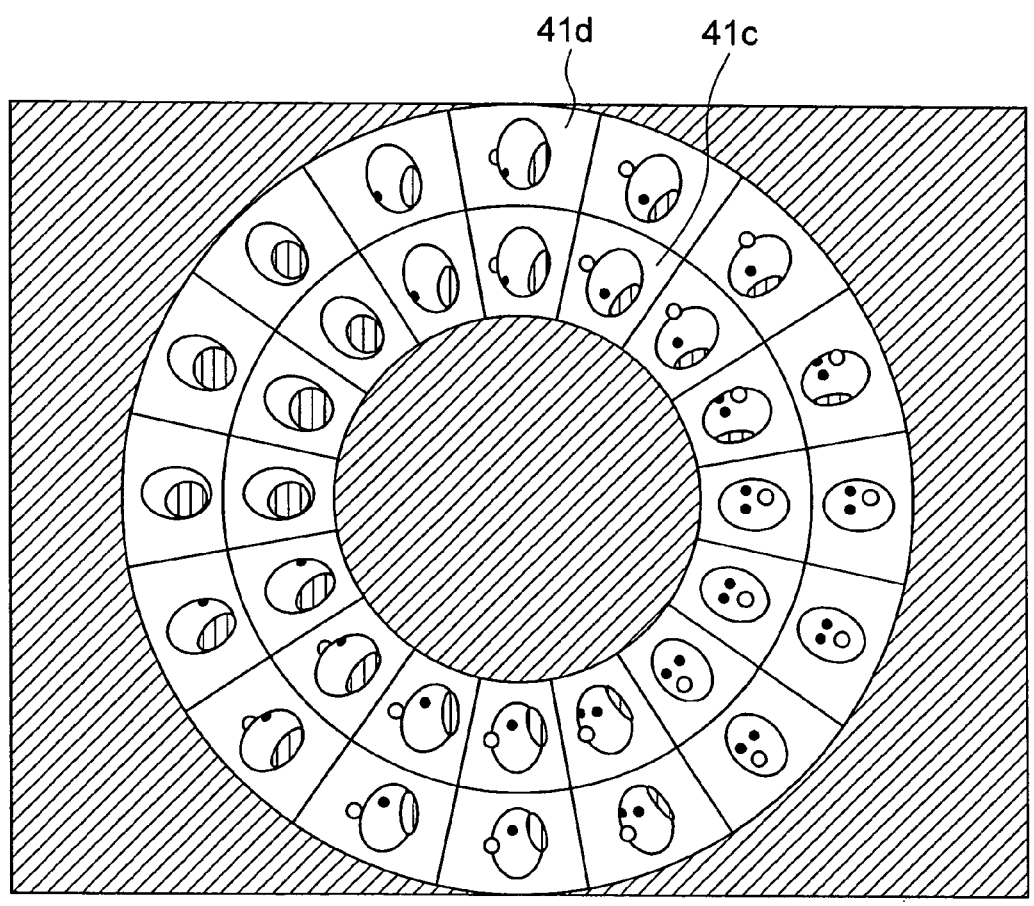
FIG. 40 is a schematic view showing projected images projected by an electronic projector in the display system according to the eighth embodiment.

Subsequently, an eighth embodiment will be described with reference to FIGS. 37 to 40. FIG. 37 is a perspective view showing an outline construction of the embodiment. FIG. 38 is a view showing a system configuration. FIG. 39 is a schematic, cross sectional view showing a state of use. FIG. 40 is a schematic view showing projected images projected by an electronic projector adopted in the embodiment. The embodiment adopts a sphere or a vertically long ellipsoid for a stereoscopic screen 3 and adopts a half mirror for polygonal mirrors 5a.

In FIG. 37, according to the embodiment, an electronic projector 1 is arranged on a central axis P below the stereoscopic screen 3, which is in the form of a sphere or a vertically long ellipsoid, and the polygonal mirrors 5a constructed in two upper and lower stages are arranged above the stereoscopic screen 3. The polygonal mirrors 5a are formed by half mirrors so that projected images projected by the electronic projector 1 are reflected to the stereoscopic screen by an inner surface thereof and images projected onto the stereoscopic screen 3 can be seen over the half mirrors from around the polygonal mirrors 5a.

In FIG. 38, the polygonal mirrors 5a are formed in a manner to cover an upper portion of the stereoscopic screen 3 by an umbrella. The polygonal mirrors 5a comprise a plurality of mirrors arranged on concentric circles centering on the central axis P in the same manner as in FIG. 1, but are different from those in FIG. 1 in being composed of mirror groups in two upper and lower stages, which are different from each other in angle. That is, the polygonal mirrors 5a comprise two mirror groups, that is, a first polygonal mirror group 5b formed inside and a second polygonal mirror group 5c formed outside thereof to be contiguous thereto.

The first polygonal mirror group 5b is arranged at an angle close to the horizontal and the second polygonal mirror group 5c is arranged at an angle close to the vertical. Such two angles are appropriately set according to a shape of the stereoscopic screen 3. According to the embodiment, since the stereoscopic screen 3 adopts a sphere, respective angles of mirrors of the polygonal mirrors 5a are set so as to make reflection toward a center of the central axis P. Consequently, images reflected by the first polygonal mirror group 5b are projected on an upper portion of a projected image surface 50 of the stereoscopic screen 3 and images reflected by the second polygonal mirror group 5c are projected on a central portion of the stereoscopic screen.

In FIG. 39, according to the embodiment, since half mirrors are adopted for the polygonal mirrors 5a, images displayed on the stereoscopic screen 3 can be seen on an extension of a projected light refracted to the stereoscopic screen 3. That is, the stereoscopic screen 3 is seen over the half mirrors (the polygonal mirrors 5a) whereby a projected light directed toward the stereoscopic screen 3 and a viewer's eyes can be made in accord with each other.

A directional reflection screen 11 and a visible field angle limiting filter 2, which are the same as those in the first embodiment, are stuck to the projected image surface 50 of the stereoscopic screen 3. However, what is different from the first embodiment is the directional reflection screen 11. Since the projected image surface 50 of the embodiment is defined by a curved surface, which has a center thereof projecting not only left and right but also vertically, a retroreflecting mirror sheet is adopted for both lengthwise and crosswise.

FIG. 40 shows projected images projected from the electronic projector 1. Corresponding to the polygonal mirrors 5a in two upper and lower stages, the projected images comprise first projected images 41c composed of a plurality of image segments arranged inside in a ring shape corresponding to the first polygonal mirror group 5b, and second projected images 41d composed of a plurality of image segments arranged outside in a ring shape corresponding to the second polygonal mirror group 5c.

In this manner, according to the embodiment, viewing is made possible with eyes, which are the same as a projected light directed toward the stereoscopic screen 3, by providing half mirrors on the polygonal mirrors 5. Also, the embodiment adopts the stereoscopic screen 3 also vertically defined by an arcuate surface and adopts a mirror sheet, which is retroreflective both up and down and left and right, for the projected image surface 50 instead of a simple corner mirror sheet. Thereby, by projecting images reflected by mirrors, which are arranged not only in a horizontal direction but also in a vertical direction, an image seen over an upper half mirror and an image seen over a lower half mirror can be projected so as to be mutually different. Accordingly, not only images, which are different 360 degrees in a horizontal direction can be seen but also images from above can be seen when seen from above.

INDUSTRIAL APPLICABILITY

The invention is applicable to various information display systems.

The invention claimed is:

1. A display system comprising
a mirror group including a stereoscopic screen having a visible field angle control function and formed around a central axis, and a plurality of mirrors arranged along a conical surface, which has the central axis in common to the stereoscopic screen, and
at least one electronic projector opposed to mirror surfaces of the mirrors constituting the mirror group, and arranged to project image segments different from each other to represent respective side surfaces of a body or the image segments different from each other onto the respective mirror surfaces,
wherein the at least one electronic projector are arranged to project the image segment onto predetermined at least one of the mirrors of the mirror group, and the mirrors are arranged on optical paths of optical systems in which the image segments emitted from the electronic projector are reflected by the mirror surfaces of the mirrors and projected onto the stereoscopic screen.

2. The display system according to claim 1, wherein the stereoscopic screen comprises a directional reflection screen.

3. The display system according to claim 2, wherein the directional reflection screen comprises a corner mirror sheet as a retroreflector for a horizontal incident light, and an anisotropic diffusion sheet for restricting a light from being converged vertically.

4. The display system according to claim 1, further comprising an auxiliary mirror positioned on a plane intersecting perpendicularly an extension of the central axis, wherein image segments emitted from the electronic projector are projected onto the stereoscopic screen through the auxiliary mirror and the mirror group.

5. The display system according to claim 1, wherein the image segments comprise image segments beforehand stored in a storage unit, or image segments transmitted from a camera system via a communication line.

6. The display system according to claim 1, wherein the image segments are projected on central positions of the mirror surfaces, and
the mirror surfaces are set in inclination and position relative to the conical surface so that lights reflected by the central points of the mirror surfaces are projected on a central point of the screen.

7. The display system according to claim 1, further comprising
a camera device or devices, a number of which is equal to that of the electronic projector or projectors, while the stereoscopic screen is capable of being replaced by an object to be picturized by the camera device or devices, and
so that the side surfaces of the object are picturized through the mirror group by the camera device or devices to create the image segments to be emitted from the electronic projector or projectors.

8. The display system according to claim 1, further comprising
a sensor part for detecting a direction or movement of a user,
wherein the image segments emitted from the at least one electronic projector are controlled on the basis of the direction or movement of the user detected by the sensor part.

9. The display system according to claim 1, wherein the stereoscopic screen comprises a semitransparent type screen that occupies a partial angular direction as viewed from the central axis, and the mirror group comprises a plurality of mirrors mounted in the partial angular direction of the conical surface to project the image segments onto the semitransparent type screen.

10. The display system according to claim 1, wherein in a case where each of the electronic projectors is arranged to project the image segments onto respective set of predetermined ones of the mirrors of the mirror group, the inclinations and positions of the mirrors of the respective set are set individually.

11. A display system comprising
a stereoscopic screen having a visible field angle control function and a shape of a sphere or a vertically elongated ellipsoid,
a mirror group comprising a plurality of half mirrors divided into at least two stages having different inclination angles to cover an upper portion of the stereoscopic screen, and
at least one electronic projector opposed to mirror surface of the mirrors constituting the mirror group, and arranged to project image segments different from each other onto the respective mirror surfaces,
wherein the at least one projector is arranged to project the image segments onto the mirrors of the mirror group, and
the mirrors are arranged on optical paths of optical systems in which the image segments emitted from the at least one projector are reflected by the mirror surfaces of the mirrors and projected onto the stereoscopic screen.

12. The display system according to claim 1, wherein the image segments emitted by the electronic projector or projectors are created by means of computer graphics.

13. The display system according to claim 11, further comprising
a camera device or devices, a number of which is equal to that of the electronic projector or projectors, while the stereoscopic screen is capable of being replaced by an object to be picturized by the camera device or devices, and
so that the side surfaces of the object are picturized through the mirror group by the camera device or devices to create the image segments to be emitted from the electronic projector or projectors.

14. The display system according to claim 11, wherein a first stage mirror group of one of the at least two stages having the inclination angles different from each other and a second stage mirror group positioned below the first stage mirror group and having inclination angles closer to the vertical in comparison with the first stage mirror group are used to project the images onto relatively upper and lower positions of the stereoscopic screen respectively.

* * * * *